United States Patent
Yamashita et al.

(10) Patent No.: US 7,253,220 B2
(45) Date of Patent: *Aug. 7, 2007

(54) CEMENT ADMIXTURE AND CEMENT COMPOSITION

(75) Inventors: Akihiko Yamashita, Ibaraki (JP); Hiromichi Tanaka, Yokohama (JP); Toru Uno, Yokohama (JP); Yoshiyuki Onda, Tokyo (JP); Tsuyoshi Hirata, Kobe (JP)

(73) Assignee: Nippon Shokubai Co., Ltd. (JP)

( * ) Notice: Subject to any disclaimer, the term of this patent is extended or adjusted under 35 U.S.C. 154(b) by 423 days.

This patent is subject to a terminal disclaimer.

(21) Appl. No.: 10/791,730

(22) Filed: Mar. 4, 2004

(65) Prior Publication Data

US 2004/0204517 A1    Oct. 14, 2004

(30) Foreign Application Priority Data

Apr. 8, 2003   (JP)  ............ 2003-104419

(51) Int. Cl.
 *C04B 24/26*   (2006.01)
(52) U.S. Cl. .............. 524/5; 524/4; 524/376; 524/377
(58) Field of Classification Search ........... 524/4–5, 524/376–377
See application file for complete search history.

(56) References Cited

U.S. PATENT DOCUMENTS

| | | | |
|---|---|---|---|
| 4,471,100 A | 9/1984 | Tsubakimoto et al. | |
| 5,362,323 A | 11/1994 | Koyata et al. | |
| 5,661,206 A | 8/1997 | Tanaka et al. | |
| 6,174,980 B1 | 1/2001 | Hirata et al. | |
| 6,388,038 B1 | 5/2002 | Hirata et al. | |
| 6,911,494 B2 * | 6/2005 | Yamashita et al. | 524/556 |
| 2003/0106464 A1 | 6/2003 | Yamashita et al. | |

FOREIGN PATENT DOCUMENTS

| | | |
|---|---|---|
| EP | 1 179 517 A2 | 2/2002 |
| JP | SHO-57-118058 | 7/1982 |
| JP | HEI-05-306152 | 11/1993 |
| JP | HEI-05-345647 | 12/1993 |
| JP | HEI-07-053249 | 2/1995 |
| JP | 7-215746 A | 8/1995 |
| JP | HEI-09-142905 | 6/1997 |
| JP | 2000-233957 | 8/2000 |
| JP | 2001-048620 | 2/2001 |
| JP | 2001-302306 | 10/2001 |
| JP | 2002-121055 | 4/2002 |
| JP | 2002-348160 A | 12/2002 |
| JP | 2003-12358 A | 1/2003 |
| JP | 2003-073157 | 3/2003 |
| JP | 2003-095722 | 4/2003 |
| JP | 2003-171156 | 6/2003 |
| JP | 2003-221266 | 8/2003 |
| WO | WO-00/48961 | 8/2000 |
| WO | WO-02/096823 A1 | 12/2002 |

* cited by examiner

*Primary Examiner*—Peter Szekely
(74) *Attorney, Agent, or Firm*—Connolly Bove Lodge & Hutz LLP

(57) ABSTRACT

The cement admixture of the present invention can improve the workability by displaying sufficient viscosity decreasing ability and initial dispersing ability even under a low temperature environment as well as high dispersing ability and dispersion retaining ability even in a high water reducing ratio range. The above-mentioned cement admixture comprises four components of a copolymer (A) containing a constituent unit (I) derived from the unsaturated (poly) alkylene glycol ether monomer (a) and a constituent unit (II) derived from a maleic acid monomer (b), a specific unsaturated (poly)alkylene glycol ether monomer (a), a non-polymerizable (poly)alkylene glycol (B) having no alkenyl group, and a polymer (C) having an oxyalkylene group or a polyoxyalkylene group and a carboxyl group, which is different from the copolymer (A).

22 Claims, No Drawings

US 7,253,220 B2

CEMENT ADMIXTURE AND CEMENT COMPOSITION

TECHNICAL FIELD

The present invention relates to cement admixture and cement composition.

BACKGROUND ART

A cement composition has been used widely for external wall materials of buildings and structural bodies of construction since it can provide a cement hardened product excellent in strength and durability. Examples of such a cement composition include a cement paste prepared by adding water to cement, a mortar prepared by admixing sand, which is a fine aggregate, therewith, and a concrete prepared by further admixing gravel, which is a coarse aggregate, therewith. In general, in order to improve the air entrainment and fluidity, cement admixtures are added. Recently, their importance tends to be highly regarded and technical innovations have been developed for them.

The functions of the cement admixtures are to assure sufficient dispersing ability for the cement composition even if water content is decreased, retain the fluidity and workability of the cement composition, and improve the durability and strength along with decrease of water as well as to give an excellent cement composition with stable dispersing ability with the lapse of time. In concrete industrial fields today, concrete provided with such functions has been desired. In order to satisfy such requirements, it becomes very important to decrease the unit water quantity and, also, to prevent the decrease of the fluidity.

Among various cement admixtures, especially polycarboxylic acid type cement dispersants are advantageous as compared with other cement dispersants such as naphthalene ones in terms of excellent dispersing property. With respect to such cement dispersants, Japanese Kokai Publication Sho-57-118058 and Hei-09-142905 disclose cement dispersants comprising copolymers prepared by using predetermined unsaturated polyalkylene glycol ether monomers and maleic acid monomers at predetermined ratios.

Further, Japanese Kokai Publication Hei-05-306152 and Hei-05-345647 disclose cement dispersants comprising copolymers prepared by using predetermined unsaturated polyalkylene glycol ether monomers and maleic acid monomers at predetermined ratios, and polycarboxylic acid type cement dispersants in combination.

However, these techniques do not completely solve decrease of dispersing ability with the lapse of time, and there was a room for contrivance to improve the workability of a cement composition in undertaking construction by giving sufficient fluidity to the cement composition. Further, in a high water reducing ratio range required for high strength concrete, the fluidity of the concrete is deteriorated and, especially, the viscosity is increased under high share condition, so that the pump load becomes extremely high at the time of pump transportation and it becomes difficult to carry out pump transportation. Therefore, there was a room for contrivance in order to decrease the viscosity of the concrete composition, and improve the workability.

In particular, in the case under low temperature environments in winter or the like, concrete temperature falls with the atmospheric temperature. Therefore, there are the problems of the remarkable decrease in the workability by high viscosity, of the increase in the additional amount needed by being insufficient initial dispersing ability of the cement dispersants, and of the decrease in productivity by taking long time for mixing. Accordingly, there was a room for contrivance to exhibit sufficient viscosity decreasing ability and initial dispersing ability even under a low temperature environment as well as a high dispersing ability and dispersion retaining ability even in a high water reducing ratio range.

Further, European Patent Publication No. 1179517 discloses cement dispersants comprising a copolymer, as an essential component, including constitutional unit derived from unsaturated (poly)alkylene glycol ether monomer and constitutional unit derived from (meth)acrylic acid (salt), and WO 02/096823 discloses cement admixtures comprising two polymers as essential constituents, namely a polymer (A1) comprising a constituent unit derived from an unsaturated (poly)alkylene glycol ether monomer and a constituent unit derived from an unsaturated monocarboxylic acid monomer, and a polymer (B1) containing an oxyalkylene group or polyoxyalkylene group and carboxyl group. These cement dispersants are capable of exhibiting high dispersing ability even in a slight amount of addition. However, together with the excellent dispersing ability and dispersion retaining ability even in a high water reducing ratio range, there was a room for contrivance to exhibit sufficient viscosity decreasing ability, and to improve the workability in executing cement composition.

BRIEF SUMMARY OF THE INVENTION

It is an object of the present invention, which has been made in view of the above-mentioned state of the art, to provide a cement admixture capable of sufficient viscosity decreasing ability and initial dispersing ability even under a low temperature environment as well as improving the workability by displaying high dispersing ability and dispersion retaining ability even in a high water reducing ratio range.

In the course of investigations made by them in search of cement admixtures, the present inventors found that a mixture comprising four components of a particular copolymer (A) containing a (poly)oxyalkylene group and carboxylic group, which is obtained by polymerization a particular unsaturated (poly)alkylene glycol ether monomer (a) and a maleic acid monomer (b), the particular unsaturated (poly) alkylene glycol ether monomer (a), and a non-polymerizable (poly)alkylene glycol (B) having no alkenyl group, and a polymer (C), which is different from the copolymer (A), having an oxyalkylene group or a polyoxyalkylene group and a carboxyl group is available as a cement admixture exhibiting excellent initial dispersing ability and viscosity decreasing ability even under a low temperature environment as well as high dispersing ability and dispersion retaining ability even in a high water reducing ratio range. Such findings have now led to completion of the present invention.

Therefore, the present invention is a cement admixture comprising four components of a copolymer (A), an unsaturated (poly)alkylene glycol ether monomer (a), a non-polymerizable (poly)alkylene glycol (B) having no alkenyl group, and a polymer (C) having an oxyalkylene group or a polyoxyalkylene group and a carboxyl group, which is different from the copolymer (A), at ratios of the unsaturated (poly)alkylene glycol ether monomer (a) to the copolymer (A) in a range of 1 to 100% by mass, the non-polymerizable (poly)alkylene glycol (B) having no alkenyl group to the copolymer (A) in a range of 1 to 50% by mass, and the polymer (C), which is different from the copolymer (A), having an oxyalkylene group or a polyoxyalkylene group and a carboxyl group to the copolymer (A) in a range of 1 to 10000% by mass, wherein the copolymer (A) contains a constituent unit (I) derived from the unsaturated (poly)alkylene glycol ether monomer (a) and a constituent unit (II) derived from a maleic acid monomer (b) at ratios of the constituent unit (I) and the constituent unit (II) in a range of 1% by mass or more, respectively, in the entire constituent units, and the unsaturated (poly)alkylene glycol ether monomer (a) is represented by the general formula (1):

$$Y^1O(R^1O)nR^2 \qquad (1)$$

(wherein $Y^1$ represents an alkenyl group containing 2 to 4 carbon atoms, $R^2$ represents a hydrogen atom or a hydrocarbon group containing 1 to 30 carbon atoms, $R^1O$ represents one or more species of oxyalkylene groups containing 2 to 18 carbon atoms, and n represents the average molar number of addition of the oxyalkylene groups and is a number of 1 to 500).

The present invention is also a cement admixture comprising five components of a copolymer (A1), a copolymer (A2), an unsaturated (poly)alkylene glycol ether monomer (a1), an unsaturated polyalkylene glycol ether monomer (a2), and a non-polymerizable (poly)alkylene glycol (B) having no alkenyl group at ratios of the total amount of the unsaturated (poly)alkylene glycol ether monomer (a1) and the unsaturated polyalkylene glycol ether monomer (a2) to the total amount of the copolymers (A1) and (A2) in a range of 1 to 100% by mass, the non-polymerizable (poly)alkylene glycol (B) having no alkenyl group to the total amount of the copolymers (A1) and (A2) in a range of 1 to 50% by mass, and the polymer (A2) to the copolymer (A1) in a range of 1 to 10000% by mass, wherein the copolymer (A1) contains a constituent unit (I') derived from the unsaturated (poly)alkylene glycol ether monomer (a1) and a constituent unit (II) derived from a maleic acid monomer (b) at ratios of the constituent unit (I') and the constituent unit (II) in a range of 1% by mass or more, respectively, in the entire constituent units, the unsaturated (poly)alkylene glycol ether monomer (a1) is represented by the general formula (2):

$$Y^2O(R^3O)m_1R^4 \qquad (2)$$

(wherein $Y^2$ represents an alkenyl group containing 2 to 4 carbon atoms, $R^4$ represents a hydrogen atom or a hydrocarbon group containing 1 to 30 carbon atoms, $R^3O$ represents one or more species of oxyalkylene groups containing 2 to 18 carbon atoms, and $m_1$ represents the average molar number of addition of the oxyalkylene groups and is a number of 1 to 100), the copolymer (A2) contains a constituent unit (I") derived from the unsaturated polyalkylene glycol ether monomer (a2) and a constituent unit (II) derived from a maleic acid monomer (b) at ratios of the constituent unit (I") and the constituent unit (II) in a range of 1% by mass or more, respectively, in the entire constituent units, and the unsaturated polyalkylene glycol ether monomer (a2) is represented by the general formula (3):

$$Y^3O(R^5O)m_2R^6 \qquad (3)$$

(wherein $Y^3$ represents an alkenyl group containing 2 to 4 carbon atoms, $R^6$ represents a hydrogen atom or a hydrocarbon group containing 1 to 30 carbon atoms, $R^5O$ represents one or more species of oxyalkylene groups containing 2 to 18 carbon atoms, and $m_2$ represents the average molar number of addition of the oxyalkylene groups and is a number of 6 to 500, in which $m_2-m_1 \geq 5$).

The present invention is also a cement composition comprising said cement admixture, cement and water.

DETAILED DESCRIPTION OF THE INVENTION

In the following, the present invention is described in detail.

The cement admixture of the present invention comprises four components of a copolymer (A), an unsaturated (poly)alkylene glycol ether monomer (a), a non-polymerizable (poly)alkylene glycol (B) having no alkenyl group and a polymer (C) having an oxyalkylene group or a polyoxyalkylene group and a carboxyl group, which is different from the copolymer (A), and these constituents each may comprise one single species or two or more species, and furthermore three or more species.

In the present invention, the synergic effects of the above-mentioned four components make it possible to improve the workability by exhibiting high dispersing ability and slump loss preventing ability as well as viscosity decreasing ability even in a high water reducing ratio range.

The above-mentioned copolymer (A) is the copolymer for cement admixture, and it can exhibit high cement dispersing ability in cement composition, and provide cement hardened product excellent in strength and durability. Such copolymer (A) contains a constituent unit (I) derived from the unsaturated (poly)alkylene glycol ether monomer (a) represented by the general formula (1):

$$Y^1O(R^1O)nR^2 \qquad (1)$$

(wherein $Y^1$ represents an alkenyl group containing 2 to 4 carbon atoms, $R^2$ represents a hydrogen atom or a hydrocarbon group containing 1 to 30 carbon atoms, $R^1O$ represents one or more species of oxyalkylene groups containing 2 to 18 carbon atoms, and n represents the average molar number of addition of the oxyalkylene groups and is a number of 1 to 500), and a constituent unit (II) derived from a maleic acid monomer (b). These constituent units (I) and (II) each may comprise one or two or more species. The above copolymer (A) may further contain one or two or more species of another or other copolymerizable monomer (c)-derived constituent unit (III). In addition, the constituent unit (I) is equivalent to the structure in which a polymerizable double bond of the monomer (a) represented by the general formula (1) is opened by polymerization reaction (namely, the structure in which the double bond (C=C) has become a single bond (—C—C)). The constituent unit (II) is equivalent to the structure in which a polymerizable double bond of the maleic acid monomer (b) is opened by polymerization reaction. The constituent unit (III) is equivalent to the structure in which a polymerizable double bond of the above another copolymerizable monomer (c) is opened by polymerization reaction.

In the above-mentioned copolymer (A), the constituent unit (I) and (II), respectively, account for 1% by mass or more relative to the all constituent units. When the proportion of constituent unit (I) is less than 1% by mass, the content of the unsaturated (poly)alkylene glycol ether monomer (a)-derived oxyalkylene group in the copolymer (A) is too low and, when the proportion of constituent unit (II) is less than 1% by mass, the content of the maleic acid monomer (b)-derived carboxyl group in the copolymer (A) is too low, so that, in either case, no sufficient dispersing ability may be exhibited. The proportion of the constituent unit (I) is preferably not less than 5% by mass, more preferably not less than 10% by mass, still more preferably not less than 20% by mass, most preferably not less than 40% by mass. Further, the proportion of the constituent unit (I) is preferably not more than 50 mole % in the entire constituent units, since the polymerizability of the unsaturated (poly)alkylene glycol ether monomer (a) is low, therefore the copolymer (A) with high dispersing ability in high yields can obtained. On the other hand, the proportion of the constituent unit (II) is preferably not less than 2% by mass, more preferably not less than 3% by mass, still more preferably not less than 4% by mass. The upper limit to the content of constituent unit (II) can be selected so that the number of milliequivalents of carboxyl groups contained in the copolymer (A) as determined on the unneutralized basis may be within the following preferable range. In addition, the total content (% by mass) of the constituent units (I) and (II) in the copolymer (A) is preferably 50 to 100% by mass, more preferably 70 to 100% by mass, relative to the whole copolymer (A).

The ratio of the each constituent unit giving the copolymer (A), which is the constituent unit (I)/the constituent unit (II)/the constituent unit (III), is preferably 1 to 99/1 to 99/0 to 70 (% by mass). More preferably 5 to 99/1 to 70/0 to 50 (% by mass), still more preferably 10 to 98/2 to 60/0 to 50 (% by mass), further more preferably 20 to 97/3 to 50/0 to 40 (% by mass), particular preferably 30 to 97/3 to 45/0 to 35 (% by mass), most preferably 40 to 96/4 to 40/0 to 30 (% by mass), always provided that the total amount of the constituent unit (I), (II) and (III) is 100% by mass. Setting as such a range, a cement admixture more excellent in various capabilities.

In the above copolymer (A), it is preferred that the number of milliequivalents of carboxyl groups contained in each gram of copolymer (A) (meq/g) as determined on the unneutralized basis be 0.2 to 5.0. It is thus preferred that the proportion of each constituent unit constituting the copolymer (A) be selected so that the number of milliequivalents of carboxyl groups in the copolymer (A) amount to a value within the above range. When the number of milliequivalents of carboxyl groups (meq/g) is more than 5.0, the slump-retaining ability may tend to decrease, and when it is less than 0.2, the initial dispersing ability may tend to decrease. It is more preferably not less than 0.3, still more preferably not less than 0.4. On the other hand, it is more preferably not more than 4.5, still more preferably not more than 4.0, especially preferably not more than 3.5. The range of the above number of milliequivalents (meq/g) is more preferably 0.3 to 4.5, still more preferably 0.3 to 4.0, especially preferably 0.4 to 3.5.

Since the copolymer (A) may contain another or other carboxyl group-containing constituent unit in addition to the carboxyl containing-constituent unit (II) derived from the maleic acid monomer (b), the above-mentioned number of milliequivalents of carboxyl groups is not limited to the case only where it is derived from the constituent unit (II). Further, in the copolymer (A), it is preferred that the number of milliequivalents of carboxyl groups originated in the constituent unit (II) is more than the one originated in the above another or other carboxyl-containing constituent unit.

The above term "number of milliequivalents of carboxyl groups contained in each gram of copolymer (A) (meq/g) as determined on the unneutralized basis" is used herein to include the case where the copolymer (A) is in a salt form. The methods of calculation are shown below for the case where it occurs as an acid and for the case where it occurs as a salt. While, in the following calculations, the constituent unit (II)-derived carboxyl groups alone are exemplified, if another carboxyl group-containing constituent unit is contained in the copolymer, this must be taken into consideration in calculating the number of milliequivalents of carboxyl groups.

CALCULATION EXAMPLE 1

When a copolymer with a monomer (a)/monomer (b) content ratio of 90/10 (% by mass) is obtained by using maleic acid as monomer (b), the number of milliequivalents of monomer (b)-derived carboxyl groups per gram of the above copolymer (meq/g) as determined on the unneutralized basis is $0.1/(0.9+0.1)/(116/2)\times 1000=1.72$, since the molecular weight of maleic acid is 116, maleic acid is divalent acid containing two carboxyl groups in a molecule.

CALCULATION EXAMPLE 2

When a copolymer with a monomer (a)/monomer (b) content ratio of 90/10 (% by mass) is obtained by using disodium maleate as monomer (b), the number of milliequivalents of monomer (b)-derived carboxyl groups per gram of the above copolymer (meq/g) as determined on the unneutralized basis is $(0.1\times 116/160)/(0.9+0.1\times 116/160)/(116/2)\times 1000=1.29$, since the molecular weight of disodium maleate is 160 and that of maleic acid is 116, maleic acid is divalent acid containing two carboxyl groups in a molecule. When maleic acid is used in carrying out polymerization and, after polymerization, the maleic acid-derived carboxylic groups are completely neutralized with sodium hydroxide, the same result as in this calculation example is obtained.

In addition to the monomer-based method of calculating the number of milliequivalents of carboxyl groups (meq/g), as mentioned above, the number can also be calculated by measuring the acid value of the above copolymer (A) while taking into consideration the counter ion species of the carboxyl groups in the copolymer (A).

In the present invention, a method for producing the copolymer (A) is not particularly limited and, for example, the copolymer can be produced by copolymerizing monomer components essentially comprising unsaturated (poly) alkylene glycol ether monomer (a) giving the constituent unit (I) and maleic acid monomer (b) giving the constituent unit (II). Further, for example, in place of the monomer (a), monomer before addition of alkylene oxide, that is, unsaturated alcohol such as (meth)allyl alcohol may be used. On that occasion, the copolymer (A) can be also produced by causing 1 to 500 moles, on average, of an alkyleneoxide to add to a copolymer obtained by copolymerization the monomer (b) and the above unsaturated alcohol in the presence of a polymerization initiator. At the time of copolymerization of the monomer components, if necessary, the above-mentioned other copolymerizable monomer (c) may further be copolymerized.

In the above-mentioned unsaturated (poly)alkylene glycol ether monomer (a), the oxyalkylene group(s) represented by $R^1O$ in the general formula (1), as mentioned above, maybe constituted of one or two or more oxyalkylene group species. The number of carbon atoms in the oxyalkylene group $R^1O$ is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition maybe of the random, block and/or alternating type, for instance. For securing a balance between the hydrophilicity and hydrophobicity, it is preferred that the oxyalkylene group comprises the oxyethylene group, with the oxyethylene group preferably accounting for at least 50 mole percent (mole %), more preferably at least 80 mole %, most preferably at least 90 mole %.

The average molar number n of addition of the oxyalkylene group represented by the above $R^1O$ is suitably a number of 1 to 500. When the average molar number n exceeds 500, sufficient copolymerizability may not be obtained. When it decreases, the hydrophilicity of the copolymer obtained tends to decrease, hence sufficient dispersing ability may not be obtained. Preferably, it is not less than 2, more preferably not less than 5, still more preferably not less than 10, in particular not less than 15, most preferably not less than 20. Preferably, it is not more than 300. The preferred range of the average molar number n of addition is 2 to 500, more preferably 5 to 500, further preferably 10 to 500, still more preferably 15 to 500, in particular 20to 300. The average molar number of addition means the average value for the molar number of the organic group(s) in question forming each mole of monomer by addition.

In the above general formula (1), $R^2$ represents a hydrogen atom or a hydrocarbon group containing 1 to 30 carbon atoms. The hydrocarbon group containing 1 to 30 carbon atoms is preferably a hydrocarbon group having no polymerizable double bond, for example, an alkyl group (aliphatic alkyl group or alicyclic alkyl group) containing 1 to 30 carbon atoms; a benzene ring-containing aromatic group containing 6 to 30 carbon atoms such as a phenyl group, an alkylphenyl group, a phenylalkyl group, an (alkyl) phenyl-substituted phenyl group or a naphthyl group. In the above $R^2$, with the increase in the number of carbon atoms in the hydrocarbon group, the hydrophobicity increases and the dispersing ability may decrease. Therefore, the number of carbon atoms in $R^2$ when this is a hydrocarbon group is preferably 1 to 22, more preferably 1 to 18, still more preferably 1 to 12, in particular 1 to 4. The case where $R^2$ is a hydrogen atom is most preferred.

In the above general formula (1), the alkenyl group represented by $Y^1$ is an alkenyl group containing 2 to 4 carbon atoms. Suitable as the above $Y^1$ are vinyl group, allyl group, methallyl group and 3-butenyl group. Among them, an alkenyl group containing 3 to 4 carbon atoms is preferred, and more preferably is allyl group or methallyl group.

The unsaturated (poly)alkylene glycol ether monomer (a) represented by the above general formula (1) can be produced, for example, by causing 1 to 500 moles of one alkylene oxide to add to a unsaturated alcohol such as allyl alcohol or methallyl alcohol. Suited for use as the above monomer (a) are (poly)ethylene glycol allyl ether, (poly)ethylene glycol methallyl ether, (poly)ethylene(poly)propylene glycol allyl ether, (poly)ethylene(poly)propylene glycol methallyl ether, (poly)ethylene(poly)butylene glycol allyl ether and (poly)ethylene(poly)butylene glycol methallyl ether. In the practice of the present invention, one or more of these can be used as monomer(s) (a) for providing the constituent unit (I).

In the present invention, two or more monomers differing in the average molar number n of addition of the oxyalkylene group can be used in combination as the unsaturated (poly)alkylene glycol ether monomer (a). Suitable are combination of two monomers (a) differing in n by not less than 5 (preferably differing in n by not less than 10, more preferably by not less than 20) and combinations of three or more monomers (a) differing in n by not less than 5 (preferably differing in n by not less than 10, more preferably by not less than 20) from one another. As regards the ranges of n's to be combined, the combination of a monomer (a) whose average molar number n of addition is 1 to 100 and a monomer (a) whose n is 6 to 500 (with the difference in n being preferably not less than 5, more preferably not less than 10, still more preferably not less than 20) and the combination of a monomer (a) whose average molar number n of addition is 1 to 40 and a monomer (a) whose n is 40 to 500 (with the difference n being preferably not less than 10, more preferably not less than 20) are appropriate. In addition, in the case two or more species of monomers (a) with different average molar number n of addition are used in combination, it is preferable to use the monomer (a) with a larger average molar number n of addition at a higher ratio (a ratio by mass) than the monomer (a) with a smaller average molar number n of addition. Further, in the case two species of monomers with different average molar number n of addition are used in combination, the composition ratio of the monomer (a) is preferably adjusted so that the average value of the average molar number n of addition of whole monomer (a) is a range of 10 to 150. More preferred is a range of 15 to 120, still more preferably a range of 20 to 100.

The maleic acid monomer (b) in the present invention is preferably the monomer, which is represented by the general formula (6):

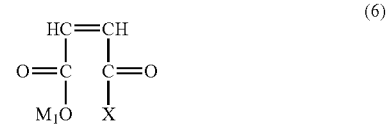

(6)

(wherein X represents —$OM_2$ or -Z-($R^{13}O$)r$R^{14}$, $M_1$ and $M_2$ may be the same or different and each represents a hydrogen atom, a monovalent metal, a divalent metal, an ammonium group or an organic ammonium group, -Z- represents —O— or —NH—, $R^{13}O$ represents one or more species of oxyalkylene groups containing 2 to 18 carbon atoms, $R^{14}$ represents a hydrogen atom, an alkyl group containing 1 to 30 carbon atoms, a phenyl group, an aminoalkyl group, an alkylphenyl group or a hydroxyalkyl group (the number of carbon atoms of the alkyl groups in the aminoalkyl group, the alkylphenyl group and the hydroxyalkyl group is 1 to 30), r represents the average molar number of addition of the oxyalkylene groups and is a number of 0 to 500, provided that the compound includes those having acid anhydride group (—CO—O—CO—) formed by bond of oxygen bonded to $M_1$ with carbon bonded to X, in which $M_1$ and X do not exit). In addition, the above-mentioned oxyalkylene group represented by $R^{13}O$ may be constituted of one or two or more oxyalkylene group species.

The above-mentioned maleic acid monomer (b) is not particularly limited, for example, maleic acid or its derivative, and the monomer (b) may be used singly or two or more may be used in combination. Suitable as such maleic acid derivative are maleic anhydride; half ester derived from maleic acid and alcohol containing 1 to 30 carbon atoms; half amide derived from maleic acid and amine containing 1 to 30 carbon atoms; half amide or half ester derived from maleic acid and amino alcohol containing 1 to 30 carbon atoms; half ester derived from maleic acid and the compound (J) which is an adduct of 1 to 500 moles of an alkylene oxide(s) containing 2 to 18 carbon atoms with alcohol containing 1 to 30 carbon atoms; half amide derived from maleic acid and a compound obtained by amination of hydroxyl group at one terminal in the above compound (J); half ester derived from maleic acid and glycol containing 2 to 18 carbon atoms or polyalkylene glycol, which is an adduct of 2 to 500 moles of an alkylene oxide(s) with such glycol; half amide derived from maleaminic acid and glycol containing 2 to 18 carbon atoms or polyalkylene glycol, which is an adduct of 2 to 500 moles of an alkylene oxide(s) with such glycol, and monovalent metal salt, divalent metal salt, ammonium salt, and organic ammonium salt thereof. Among them, the above-mentioned maleic acid monomer (b) comprises preferably at least one monomer selected from the group consisting of maleic acid, maleic acid salt, maleic anhydride and maleate. More preferably, it comprises essentially maleic acid or maleic acid salt. In addition, the organic ammonium is protonated organic amine, and suitable are alkanolammonium such as ethanolammonium, diethanolammonium and triethanolammonium; alkylammonium such as triethylammonium.

In the copolymer (A), another copolymerizable monomer (c) may be used in addition to the monomer constituent providing said essential constituent units, and such monomer (c) provides the constituent unit (III). The proportion of the constituent unit (III) derived from the above monomer (c) may be within the range that does not spoil the effect of the present invention, but preferably 0 to 50% by mass relative to all constituent units in the copolymer (A), still more preferably 0 to 30% by mass. The above-mentioned monomer (c) provides the constituent unit (III) is the monomer, which is copolymerizable with the monomer (a) and/or the monomer (b). Suitable as the monomer (c) are a (poly) alkylene glycol mono(meth)acrylic acid ester monomer (d), an unsaturated monocarboxylic acid monomer (e), an unsaturated (poly)alkylene glycol ether monomer (f), and the following, another or other monomer (g) may use one single specie or two or more species among these.

Unsaturated dicarboxylic acid such as fumaric acid, itaconic acid and citraconic acid, and monovalent metal salt, divalent metal salt, ammonium salt and organic ammonium salt of these; half ester and diester derived from unsaturated dicarboxylic acid such as fumaric acid, itaconic acid and citraconic acid, and alcohol containing 1 to 30 carbon atoms; half amide and diamide derived from the above-mentioned unsaturated dicarboxylic acid and amine containing 1 to 30 carbon atoms; half ester and diester derived from the above-mentioned unsaturated dicarboxylic acid and alkyl(amino)(poly)alkylene glycol, which is an adduct of 1 to 500 moles of an alkyleneoxide(s) containing 2 to 18 carbon atoms with the above-mentioned alcohol or amine; half ester and diester derived from the above-mentioned unsaturated dicarboxylic acid and glycol containing 2 to 18 carbon atom or polyalkylene glycol, which is an adduct of 2 to 500 moles of an alkylene oxide(s) with such glycol; ester derived from unsaturated monocarboxylic acid such as methyl (meth)acrylate, ethyl(meth)acrylate, propyl(meth)acrylate, glycidyl(meth)acrylate, methyl crotonate, ethyl crotonate and propyl crotonate, and alcohol containing 1 to 30 carbon atoms.

(Poly)alkylene glycol di(meth)acrylate such as triethylene glycol di(meth)acrylate, (poly)ethylene glycol di(meth)acrylate, polypropylene glycol di(meth)acrylate and (poly)ethylene glycol-(poly)propylene glycol di(meth)acrylate; multifunctional (meth)acrylate such as hexanediol di(meth)acrylate, trimethylolpropane tri(meth)acrylate and trimethylolpropane di(meth)acrylate; (poly)alkylene glycol dimaleate such as triethylene glycol dimaleate and polyethylene glycol dimaleate; unsaturated sulfonic acid and monovalent metal salt, divalent metal salt, ammonium salt and organic ammonium salt thereof for example vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropyl sulfophenyl ether, 3-(meth)acryloxy-2-hydroxypropyloxysulfobenzoate, 4-(meth)acryloxybutylsufonate, (meth)acrylamidomethylsulfonate, (meth)acrylamidoethylsulfonate, 2-methylpropanesulfonic acid (meth)acrylamide, and styrenesulfonic acid; amide derived from unsaturated monocarboxylic acid and amine containing 1 to 30 carbon atoms, for example methyl(meth)acrylamide; vinyl aromatic such as styrene, á-methylstyrene, vinyltoluene and p-methylstyrene; alkanediol mono(meth)acrylate such as 1,4-butanediolmono(meth)acrylate, 1,5-pentanediol mono(meth)acrylate and 1,6-hexanediol mono(meth)acrylate; diene such as butadiene, isoprene, 2-methyl-1,3-butadiene and 2-chloro-1,3-butadiene.

Unsaturated amide such as (meth)acrylamide, (meth)acrylalkylamide, N-methylol(meth)acrylamide and N,N-dimethyl(meth)acrylamide; unsaturated cyano compound such as (meth)acrylonitrile and á-chloroacrylonitrile; unsaturated ester such as vinyl acetate and vinyl propionate; unsaturated amine such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; divinyl aromatic such as divinylbenzene; cyanurate such as triallyl cyanurate; and siloxane derivative such as polydimethylsiloxanepropylaminomaleamidic acid, polydimethylsiloxaneaminopropyleneaminomaleamidic acid, polydimethylsiloxane-bis(propylaminomaleamidic acid), polydimethylsiloxane-bis(dipropyleneaminomaleamidic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis(1-propyl-3-methacrylate).

Among them, as for the another copolymerizable monomer (c) providing the constituent unit (III), the (poly) alkylene glycol mono(meth)acrylic acid ester monomer (d) such as 2-hydroxyethyl(meth)acrylate and 2-hydroxypropyl (meth)acrylate, the above-mentioned unsaturated monocarboxylic acid monomer (e), the unsaturated (poly)alkylene glycol ether monomer (f), or ester derived from unsaturated monocarboxylic acid and alcohol containing 1 to 30 carbon atoms is especially preferably used.

In the cement admixture of the present invention, two or more species of the copolymers (A) may be used in combination and three or more species and four or more species of the copolymers (A) may also be used preferably in combination. As the combinations of two or more species of copolymers (A), for example, the following combinations are possible: combinations of two or more species of copolymers (A) with different ratios (mass ratios or mole ratios) of the constituent unit (I) derived from an unsaturated (poly) alkylene glycol ether monomer (a) and the constituent unit (II) derived from maleic acid monomer (b); and combinations of two or more species of copolymers (A) with different average molar number n of addition of oxyalkylene group of the unsaturated (poly)alkylene glycol ether monomer (a) represented by the above-mentioned general formula (1) in the respective copolymers. In the case of combination two or more copolymers (A) differing in ratio (mass ratio) of the constituent unit (I) derived from the unsaturated (poly) alkylene glycol ether monomer (a) and the constituent unit (II) derived from the maleic acid monomer (b), the difference in the ratio of the constituent unit (II) derived from the maleic acid monomer (b) in each copolymers (A) is preferably at least 1% by mass or more. The difference is more preferably at least 2% by mass or more, still more preferably at least 3% by mass or more. Further, in the case of combination two or more copolymers (A), the difference in the number of milliequivalents of carboxyl groups contained in each gram of copolymer (A) (meq/g) as determined on the unneutralized basis is preferably at least 0.1 or more. The difference is more preferably at least 0.2 or more, still more preferably at least 0.3 or more.

In the cement admixture of the present invention, the content of the unsaturated (poly)alkylene glycol ether monomer (a) represented by the above-mentioned general formula (1) is properly 1 to 100% by mass in 100% by mass of the copolymer (A). When it is less than 1% by mass, the slump loss preventing ability and the viscosity decreasing ability cannot be sufficient. When it exceeds 100% by mass, the dispersing ability for cement may be deteriorated. It is preferably 2 to 100% by mass, more preferably 3 to 90% by mass, and further preferably 5 to 80% by mass. As the unsaturated (poly)alkylene glycol ether monomer (a), those same as or different from the unsaturated (poly)alkylene glycol ether monomer (a) used for polymerization of the copolymer (A), that is, the unsaturated (poly)alkylene glycol ether monomer (a) from which the constituent unit (I) of the copolymer (A) is derived, may be used. Further, two or more species of unsaturated (poly)alkylene glycol monomers (a) may be used.

In the present invention, the content of a non-polymerizable (poly)alkylene glycol (B) having no alkenyl group is suitably 1 to 50% by mass relative to 100% by mass of the copolymer (A). When it is less than 1% by mass, no sufficient viscosity decreasing ability may be obtained. When it exceeds 50% by mass, the dispersing ability for cement may be deteriorated. The content is preferably 2 to 50% by mass, more preferably 2 to 40% by mass, still more preferably 2.5 to 30% by mass.

The oxyalkylene group composing the non-polymerizable (poly)alkylene glycol (B) having no alkenyl group is preferably one or more species of oxyalkylene groups containing 2 to 18 carbon atoms, and the terminal group of the non-polymerizable (poly)alkylene glycol (B) having no alkenyl group is a hydrogen atom, an alkyl group or an (alkyl)phenyl group containing 1 to 30 carbon atoms. In addition, the oxyalkylene group may be constituted of one or two or more oxyalkylene group species.

The number of carbon atoms in the above oxyalkylene group is more preferably 2 to 8, still more preferably 2 to 4. Further, the non-polymerizable (poly)alkylene glycol (B) having no alkenyl group is preferably water soluble, and it is preferred that the oxyalkylene group comprises the oxyalkylene group containing 2 carbon atom, which is higher hydrophilic, namely oxyethylene group. More preferably, with the oxyethylene group accounting for at least 50 mole percent, still more preferably at least 90 mole percent. The repeating unit of the above-mentioned oxyalkylene group may be the same or different. When the oxyalkylene group is constituted of two or more oxyalkylene group species, the two or more oxyalkylene group species may be in any of the addition modes including the random, block, alternating, and other addition modes.

Further, the number of carbon atoms in the terminal group when this is a hydrocarbon group is preferably 1 to 22, more preferably 1 to 18, still more preferably 1 to 12, in particular 1 to 4. The case where the terminal group is a hydrogen atom is most preferred. The non-polymerizable (poly)alkylene glycol (B) having no alkenyl group, which is containing hydrogen atoms at both terminals is, for example, (poly)ethylene glycol, (poly)propylene glycol, (poly)ethylene(poly)propylene glycol and (poly)ethylene(poly)butylene glycol. Preferably, such non-polymerizable (poly)alkylene glycol (B) having no alkenyl group is (poly)alkylene glycol comprising oxyethylene group, which is higher hydrophilic, since the non-polymerizable (poly)alkylene glycol (B) having no alkenyl group is preferably water soluble. More preferably, with the oxyethylene group accounting for at least 50 mole percent, still more preferably at least 90 mole percent. Among them, (poly)ethylene glycol or (poly)propylene glycol is preferred, in particular (poly)ethylene glycol. In addition, the non-polymerizable (poly)alkylene glycol (B) having no alkenyl group may be used singly or two or more of them may be used in combination.

The weight-average molecular weight of the above non-polymerizable (poly)alkylene glycol (B) having no alkenyl group is preferably not less than 100 as determined be gel permeation chromatography (hereinafter referred to as "GPC") on the polyethylene glycol equivalent basis. More preferably, the molecular weight is not less than 500, still more preferably not less than 1000. On the other hand, the molecular weight is preferably not more than 200000. More preferably, the molecular weight is not more than 100000, still more preferably not more than 50000. The range of the molecular weight is preferably 100 to 200000, more preferably 500 to 100000, still more preferably 1000 to 50000.

In the method for producing the cement admixture of the present invention, the above-mentioned non-polymerizable (poly)alkylene glycol (B) having no alkenyl group may be added after the production of the above-mentioned copolymer (A), however at the time of producing the copolymer (A), copolymerization of a composition, as a raw material, containing the non-polymerizable (poly)alkylene glycol (B) having no alkenyl group in addition to the monomer constituents containing the above-mentioned unsaturated (poly)alkylene glycol ether monomer (a) and the above-mentioned maleic acid monomer (b) as essential constituents may be carried out. Accordingly, the cement admixture comprising the copolymer (A) and the non-polymerizable (poly)alkylene glycol (B) having no alkenyl group can be prepared. Thus, the method of producing for the cement admixture by copolymerization of a composition, as a raw material, containing a non-polymerizable (poly)alkylene glycol (B) having no alkenyl group in addition to the monomer constituents containing an unsaturated (poly)alkylene glycol ether monomer (a) and a maleic acid monomer (b) is also one preferred mode in the practice of the present invention.

The unsaturated (poly)alkylene glycol ether monomer (a) used in the present invention can be produced, for example, by causing 1 to 500 moles of at least one alkylene oxide to add to an unsaturated alcohol such as allyl alcohol or methallyl alcohol. At the addition reaction, when a compound containing an active hydrogen such as a saturated alcohol other than the above-mentioned unsaturated alcohol (for example, methanol or ethanol) or water exists in the reaction system, a composition which contains a (poly)alkylene glycol as a byproduct, can be obtained by using the above active hydrogen as a starting material, in addition to the main product monomer (a). In the present invention, without requiring removal of a (poly)alkylene glycol produced as a byproduct at the time of the production of the above-mentioned monomer (a), the copolymerization reaction of a composition containing the (poly)alkylene glycol as the byproduct in addition to the monomer (a), a main product, can be carried out to produce the copolymer (A). Accordingly, the cement admixture comprising the above-mentioned copolymer (A) and the non-polymerizable (poly) alkylene glycol (B) having no alkenyl group can be easily obtained. Thus, it is preferred that the above-mentioned composition containing a non-polymerizable (poly)alkylene glycol (B) having no alkenyl group in addition to the monomer constituents containing an unsaturated (poly)alkylene glycol ether monomer (a) and a maleic acid monomer (b) is preferably a composition containing a non-polymerizable (poly)alkylene glycol (B) having no alkenyl group produced as a byproduct at the time of the production of the monomer (a), and the cement admixture obtained by this production method is one of the preferred embodiment of the present invention.

When the above-mentioned (poly)alkylene glycol as a byproduct in the producing process of the monomer (a) is a (poly)alkylene glycol containing hydrogen atoms at both terminals, for example, (poly)ethylene glycol or (poly)ethylene(poly)propylene glycol, the molecular weight of the (poly)alkylene glycol obtained by using water containing two active hydrogen as a starting material is higher than that of the monomer (a) obtained by using an unsaturated alcohol containing one active hydrogen as a starting material. In this case, the molecular weight of the (poly)alkylene glycol is same or twice level of that of the monomer (a). Further, after the production of the copolymer (A), further, the non-polymerizable (poly)alkylene glycol (B) having no alkenyl group may be added and a non-polymerizable (poly)alkylene glycol (B) having no alkenyl group to be added may be the same as or different from the non-polymerizable (poly)alkylene glycol (B) having no alkenyl group contained as the byproduct.

At the time of producing the copolymer (A), as a raw material, a composition containing an oxyalkylene antifoaming (defoaming) agent in addition to the above-mentioned unsaturated (poly)alkylene glycol ether monomer (a), the above-mentioned maleic acid monomer (b), and the non-polymerizable (poly)alkylene glycol (B) having no alkenyl group may be subjected to copolymerization reaction to prepare a cement admixture comprising the copolymer (A), the non-polymerizable (poly)alkylene glycol (B) having no alkenyl group, and the oxyalkylene defoaming agent. If being mixed with the copolymer (A), an oxyalkylene defoaming agent with a high hydrophobicity is easy to be isolated and thus makes the storage property unstable. However, as described above, a cement admixture with excellent storage stability can be obtained by copolymerizing a composition, as a raw material, previously mixed with the oxyalkylene defoaming agent.

Suitable as the oxyalkylene antifoaming agent are polyoxyalkylene such as (poly)oxyethylene(poly)oxypropylene adduct; polyoxyalkylene alkyl ether such as diethylene glycol heptyl ether, polyoxyethylene oleyl ether, polyoxypropylene butyl ether, polyoxyethylenepolyoxypropylene 2-ethylhexyl ether, and higher ($C_{12}$-$C_{14}$) alcohol-oxyethyleneoxypropylene adduct; polyoxyalkylene (alkyl)aryl ether such as polyoxypropylene phenyl ether and polyoxyethylene nonylphenyl ether; acetylene ether produced by addition polymerization of an alkylene oxide onto an acetylene alcohol such as 2,4,7,9-tetramethyl-5-decyne-4,7-diol, 2,5-dimethyl-3-hexyne-2,5-diol or 3-methyl-1-butyn-3-ol; (poly)oxyalkylene fatty acid ester such as diethylene glycol oleate, diethylene glycol laurate and ethylene glycol distearate; (poly)oxyalkylenesorbitan fatty acid ester such as polyoxyethylenesorbitan monolaurate and polyoxyethylenesorbitan trioleate; (poly)oxyalkylene alkyl(aryl)ether sulfate ester salt such as polyoxypropylene methyl ether sulfate sodium salt and polyoxyethylene dodecylphenyl ether sulfate sodium salt; (poly)oxyalkylene alkylphosphate ester such as polyoxyethylene stearylphosphate; (poly)oxyalkylenealkylamine such as polyoxypropylenepolyoxyethylenelaurylamine (which is an adduct of 1 to 20 moles of a propylene oxide(s) and 1 to 20 moles of an ethylene oxide(s), etc.) and hardened beef tallow fatty acid-derived amine, which is an adduct of an alkylene oxide(s) (which is an adduct of 1 to 20 moles of a propylene oxide(s) and 1 to 20 moles of an ethylene oxide(s), etc.); polyoxyalkyleneamide, etc. The above oxyalkylene antifoaming agent may be used singly or two or more of them may be used in combination.

In the above-mentioned composition mixed with the oxyalkylene antifoaming agent, the mixing ratio of the oxyalkylene antifoaming agent is preferably 0.01 to 10% by mass relative to the total mass of whole monomers used for copolymerization reaction. More preferably is 0.05 to 5% by mass.

In the above-mentioned composition which comprising the unsaturated (poly)alkylene glycol ether monomer (a) and the non-polymerizable (poly)alkylene glycol (B) having no alkenyl group, used for copolymerization reaction, the proportion of the (poly)alkylene glycol (B) is preferably not more than 50% by mass relative to 100% by mass of the monomer (a). When the proportion exceeds 50% by mass, the monomer concentration may decrease during polymerization reaction, hence the molecular weight of the copolymer (A) may unfavorably decrease. More preferably is not more than 40% by mass, still more preferably not more than 30% by mass, particularly preferably not more than 20% by mass. On the other hand, the proportion is preferably not less than 0.5% by mass. For being less than 0.5% by mass, the proportion of the non-polymerizable (poly)alkylene glycol (B) having no alkenyl group obtained as a byproduct in the producing process of the monomer (a) must be decreased, in order to decrease it, a long time is needed for conducting dehydration process to remove an impurity comprising an active hydrogen such as water existing in various materials used for addition reaction of an alkylene oxide such as an unsaturated alcohol, at the wall face of the reaction apparatus or in the gas phase, from the reaction system and further, or purification process for removing non-polymerizable (poly)alkylene glycol (B) having no alkenyl group after completion of addition reaction of an alkylene oxide is required, hence the productivity of the monomer (a) may decrease. Thus, the proportion is more preferably not less than 1% by mass, still more preferably not less than 1.5% by mass, particularly preferably not less than 2% by mass. The preferable ranges of the proportion is 0.5 to 50% by mass, more preferably 1 to 40% by mass, still more preferably 1.5 to 30% by mass, particularly preferably 2 to 20% by mass.

In the method for producing the cement admixture of the present invention, as the above-mentioned unsaturated (poly)alkylene glycol ether monomer (a), it may be added after production of the copolymer (A). However, it is preferable to employ a method in which the polymerization reaction is stopped at the time when the unsaturated (poly)alkylene glycol ether monomer (a) still remains in an amount of 1 to 100% by mass relative to 100% by mass of the copolymer (A) at the time of production of the copolymer (A). Consequently, a cement admixture composition containing, in addition to the copolymer (A), the unsaturated (poly)alkylene glycol ether monomer (a) 1 to 100% by mass to the copolymer (A) can be prepared. When the ratio of the remaining unsaturated (poly)alkylene glycol ether monomer (a) is less than 1% by mass, the workability of a concrete composition probably becomes insufficient. When it exceeds 100% by mass, the dispersing ability for cement is probably deteriorated. It is more preferable that polymerization reaction is stopped at the time when the unsaturated (poly) alkylene glycol ether monomer (a) still remains in an amount of 2% or more by mass to the copolymer (A), still more preferably remains 3% or more by mass, particularly preferably remains 4% or more by mass, most preferably remains 5% or more by mass. On the other hand, more preferably remains 90% or less by mass, still more preferably remains 80% or less by mass, particularly preferably remains 70% or less by mass, most preferably remains 50% or less by mass. Further, as for the range of remaining amount of the monomer, it is preferable to stop at the time when the monomer (a) still remains in an amount of 2 to 100% by mass, more preferably remains 3 to 90% by mass, still more preferably remains 4 to 80% by mass, particularly preferably remains 5 to 70% by mass, most preferably remains 5 to 50% by mass.

In addition, after production of copolymer (A), the unsaturated (poly)alkylene glycol ether monomer (a) may be further added. The unsaturated (poly)alkylene glycol ether monomer (a) added and the unsaturated (poly)alkylene glycol ether monomer (a) used as monomer constituent for copolymerization reaction may be the same or different.

The preferred method for producing the copolymer (A) to obtain the cement mixture of the present invention comprises carrying out copolymerization reaction using a composition which comprises the non-polymerizable (poly)alkylene glycol (B) having no alkenyl group as a starting material, in addition to monomer composition comprising the unsaturated (poly)alkylene glycol ether monomer (a) and the maleic acid monomer (b), and stopping the polymerization reaction at the time when the unsaturated (poly)alkylene glycol ether monomer (a) still remains in an amount of 1 to 100% by mass relative to 100% by mass of the copolymer (A). In this manner, the composition which comprises three components of the copolymer (A), the unsaturated (poly) alkylene glycol ether monomer (a), and the non-polymerizable (poly)alkylene glycol (B) having no alkenyl group can be obtained, by further adding a polymer (C), which is different from the copolymer (A), having an oxyalkylene group or a polyoxyalkylene group and a carboxyl group, the cement admixture of the present invention can be obtained easily.

In the cement mixture of the present invention, the polymer (C) having an oxyalkylene group or a polyoxyalkylene group and a carboxyl group is different from the copolymer (A), and the polymer for cement admixture. Suitable as the polymer (C) is, for example, a polymer (as a matter of convenience, referred to "a copolymer (A')") differed from the copolymer (A) in acid value, molecular weight, structure of constituent unit, composition of constituent unit, etc.; a polymer (D) containing a constituent unit (IV) derived from a (poly)alkylene glycol mono(meth) acrylic acid ester monomer (d) and a constituent unit (V) derived from an unsaturated monocarboxylic acid monomer (e); a polymer (E) containing a constituent unit (VI) derived from an unsaturated (poly)alkylene glycol ether monomer (f) having an alkenyl group containing a different number of carbon atoms and a constituent unit (II) derived from a maleic acid monomer (b); a hydrophilic graft polymer obtained by graft polymerization of unsaturated carboxylic acid to polyether compound, as described in Japan Kokai Publication Hei-07-53645, Hei-08-208769, Hei-08-208770. Among them, the use of at least one (co)polymer selected from the group consisting of the above-mentioned copolymer (A'), polymer (D) and polymer (E). These copolymer (A'), polymer (D) and polymer (E) may be respectively used singly or two or more may be used in combination.

The copolymer (A') is suitably a copolymer having a different constituent unit or composition ratio of copolymer from the copolymer (A). The copolymer (A') is preferably a copolymer which contains a constituent unit (I) derived from an unsaturated (poly)alkylene glycol ether monomer (a) and a constituent unit (II) derived from a maleic acid monomer (b) at ratios of the constituent unit (I) and the constituent unit (II) in a range of 1% by mass or more, respectively, in the entire constituent units, and the unsaturated (poly)alkylene glycol ether monomer (a) is represented by the above-mentioned general formula (1), and a number of milliequivalents of carboxyl groups contained in each gram of copolymer (A') (meq/g) as determined on the unneutralized basis is 0.1 or more larger than the number of the copolymer (A). More preferably, a polymer having the above number of milliequivalents of carboxyl groups is 0.2 or more larger than the number in the case of the copolymer (A), still more preferably a polymer having the number is 0.3 or more larger. In the number of milliequivalents of carboxyl groups, a range of difference between the copolymer (A) and the copolymer (A') is preferably 0.1 to 4.9, more preferably 0.2 to 4.8, practically preferably 0.3 to 4.7.

In the cement admixture of the present invention, when the copolymer (A') are used as the polymer (C) having an oxyalkylene group or a polyoxyalkylene group and a carboxyl group, the embodiment, in which using a copolymer contains a constituent unit (I) derived from an unsaturated (poly)alkylene glycol ether monomer (a) and a constituent unit (II) derived from a maleic acid monomer (b), same as the copolymer (A), and be differed in composition ratio (mole ratio or mass ratio) of the copolymer (A') from the copolymer (A) so that the difference between the copolymer (A) and the copolymer (A') in the number of milliequivalents of carboxyl groups) may be within the above-mentioned preferable range.

Further, as particular preferable embodiment is mentioned the following.

That is, a cement admixture comprising five components of a copolymer (A1), a copolymer (A2), an unsaturated (poly)alkylene glycol ether monomer (a1), an unsaturated polyalkylene glycol ether monomer (a2), and a non-polymerizable (poly)alkylene glycol (B) having no alkenyl group at ratios of the total amount of the unsaturated (poly) alkylene glycol ether monomer (a1) and the unsaturated polyalkylene glycol ether monomer (a2) to the total amount of the copolymers (A1) and (A2) in a range of 1 to 100% by mass, the non-polymerizable (poly)alkylene glycol (B) having no alkenyl group to the total amount of the copolymers (A1) and (A2) in a range of 1 to 50% by mass, and the polymer (A2) to the copolymer (A1) in a range of 1 to 10000% by mass, wherein the copolymer (A1) contains a constituent unit (I') derived from the unsaturated (poly)alkylene glycol ether monomer (a1) and a constituent unit (II) derived from a maleic acid monomer (b) at ratios of the constituent unit (I') and the constituent unit (II) in a range of 1% by mass or more, respectively, in the entire constituent units, the unsaturated (poly)alkylene glycol ether monomer (a1) is represented by the general formula (2):

$$Y^2O(R^3O)m_1R^4 \qquad (2)$$

(wherein $Y^2$ represents an alkenyl group containing 2 to 4 carbon atoms, $R^4$ represents a hydrogen atom or a hydrocarbon group containing 1 to 30 carbon atoms, $R^3O$ represents one or more species of oxyalkylene groups containing 2 to 18 carbon atoms, and m1 represents the average molar number of addition of the oxyalkylene groups and is a number of 1 to 100), the copolymer (A2) contains a constituent unit (I") derived from the unsaturated polyalkylene glycol ether monomer (a2) and a constituent unit (II) derived from a maleic acid monomer (b) at ratios of the constituent unit (I") and the constituent unit (II) in a range of 1% by mass or more, respectively, in the entire constituent units, and the unsaturated polyalkylene glycol ether monomer (a2) is represented by the general formula (3):

$Y^3O(R^5O)m_2R^6$ (3)

(wherein $Y^3$ represents an alkenyl group containing 2 to 4 carbon atoms, $R^6$ represents a hydrogen atom or a hydrocarbon group containing 1 to 30 carbon atoms, $R^5O$ represents one or more species of oxyalkylene groups containing 2 to 18 carbon atoms, and $m_2$ represents the average molar number of addition of the oxyalkylene groups and is a number of 6 to 500, in which $m_2-m_1 \geqq 5$).

Each copolymer (A1) and (A2) may further contain one or two or more species of another or other copolymerizable monomer (c) (as mentioned above)-derived constituent unit (III). In addition, the constituent unit (I') is equivalent to the structure in which a polymerizable double bond of the monomer (a1) represented by the general formula (2) is opened by polymerization reaction, and the constituent unit (I") is equivalent to the structure in which a polymerizable double bond of the monomer (a2) represented by the general formula (3) is opened by polymerization reaction.

In the above-mentioned copolymer (A1) and (A2), the constituent unit (I') and (I"), and (II), respectively, account for 1% by mass or more relative to the entire constituent units. When the proportion of constituent unit (I') and (I") is less than 1% by mass, the content of the unsaturated (poly)alkylene glycol ether monomer (a1)-derived oxyalkylene group in the copolymer (A1) and the unsaturated polyalkylene glycol ether monomer (a2)-derived oxyalkylene group in the copolymer (A2) is too low and, when the proportion of constituent unit (II) is less than 1% by mass, the content of the maleic acid monomer (b)-derived carboxyl group in the copolymer (A1) and (A2) is too low, so that, in either case, no sufficient dispersing ability may be exhibited. The proportion of the constituent unit (I') and (I") is preferably not less than 2% by mass, more preferably not less than 5% by mass, still more preferably not less than 10% by mass, particularly preferably not less than 20% by mass, most preferably not less than 30% by mass. Further, the proportion of the constituent unit (I') and (I") is preferably not more than 50 mole % in the entire constituent units, respectively, since the polymerizability of the unsaturated (poly)alkylene glycol ether monomer (a1) and the unsaturated polyalkylene glycol ether monomer (a2) is low. On the other hand, the proportion of the constituent unit (II) is preferably not less than 2% by mass, more preferably not less than 3% by mass, still more preferably not less than 4% by mass. The upper limit to the content of constituent unit (II) can be selected so that the number of milliequivalents of carboxyl groups contained in the copolymer (A1) and (A2) as determined on the unneutralized basis maybe within the following preferably range. In addition, the total content (% by mass) of the constituent units (I') and (I"), and (II) in the copolymer (A1) and (A2) is preferably 50 to 100% by mass, more preferably 70 to 100% by mass, relative to the whole copolymer (A1) and (A2).

The ratio of the each constituent unit giving the copolymer (A1), which is the constituent unit (I')/the constituent unit (II)/the constituent unit (III), is preferably 1 to 99/1 to 99/0 to 70 (% by mass). More preferably 5 to 99/1 to 70/0 to 50 (% by mass), still more preferably 10 to 98/2 to 60/0 to 50 (% by mass), further more preferably 20 to 97/3 to 50/0 to 40 (% by mass), particular preferably 30 to 97/3 to 45/0 to 35 (% by mass), most preferably 40 to 96/4 to 40/0 to 30 (% by mass), always provided that the total amount of the constituent unit (I'), (II) and (III) is 100% by mass. Setting as such a range, a cement admixture more excellent in various capabilities.

The ratio of the each constituent unit giving the copolymer (A2), which is the constituent unit (I")/the constituent unit (II)/the constituent unit (III), is preferably 1 to 99/1 to 99/0 to 70 (% by mass). More preferably 5 to 99/1 to 70/0 to 50 (% by mass), still more preferably 10 to 98/2 to 60/0 to 50 (% by mass), further more preferably 20 to 97/3 to 50/0 to 40 (% by mass), particular preferably 30 to 97/3 to 45/0 to 35 (% by mass), most preferably 40 to 96/4 to 40/0 to 30 (% by mass), always provided that the total amount of the constituent unit (I"), (II) and (III) is 100% by mass. Setting as such a range, a cement admixture more excellent in various capabilities.

In the above copolymer (A1) and (A2), it is preferred that the number of milliequivalents of carboxyl groups contained in each gram of copolymer (A1) and (A2) (meq/g) as determined on the unneutralized basis be 0.2 to 5.0. It is thus preferred that the proportion of each constituent unit constituting the copolymer (A1) and (A2) be selected so that the number of milliequivalents of carboxyl groups in the copolymer (A1) and (A2) amount to a value within the above range. When the number of milliequivalents of carboxyl groups (meq/g) is more than 5.0, the slump-retaining ability may tend to decrease, and when it is less than 0.2, the initial dispersing ability may tend to decrease. It is more preferably not less than 0.3, still more preferably not less than 0.4. On the other hand, it is more preferably not more than 4.5, still more preferably not more than 4.0, especially preferably not more than 3.5. The range of the above number of milliequivalents (meq/g) is more preferably 0.3 to 4.5, still more preferably 0.3 to 4.0, especially preferably 0.4 to 3.5.

Since the copolymer (A1) and (A2) may respectively contain another or other carboxyl group-containing constituent unit in addition to the carboxyl containing-constituent unit (II) derived from the maleic acid monomer (b), the above-mentioned number of milliequivalents of carboxyl groups is not limited to the case only where it is derived from the constituent unit (II). Further, in the copolymer (A1) and (A2), it is preferred that the number of milliequivalents of carboxyl groups originated in the constituent unit (II) is more than the one originated in the above another or other carboxyl-containing constituent unit.

Further, the methods of calculation of the number of milliequivalents of carboxyl groups in the copolymers (A1) and (A2) are the same as the case of the copolymer (A), if another carboxyl group-containing constituent unit (e.g. the constituent unit (V) derived from the unsaturated monocarboxylic acid monomer (e), etc.) in addition to the constituent unit (II) is contained in the copolymer, this must be taken into consideration in calculating the number of milliequivalents of carboxyl groups.

In addition to the monomer-based method of calculating the number of milliequivalents of carboxyl groups (meq/g), as mentioned above, the number can also be calculated by measuring the acid value of the above copolymer (A1) and (A2) while taking into consideration the counter ion species of the carboxyl groups in the copolymer (A1) and (A2).

In the present invention, a method for producing the copolymer (A1) is not particularly limited and, for example, the copolymer (A1) can be produced by copolymerizing monomer components essentially comprising unsaturated (poly)alkylene glycol ether monomer (a1) giving the constituent unit (I') and maleic acid monomer (b) giving the constituent unit (II). By the same method, the copolymer (A2) can be produced by copolymerizing monomer components essentially comprising unsaturated polyalkylene glycol ether monomer (a2) giving the constituent unit (I'') and maleic acid monomer (b) giving the constituent unit (II). Further, for example, in place of the monomer (a1) or (a2), monomer before addition of alkylene oxide, that is, unsaturated alcohol such as (meth)allyl alcohol may be used. On that occasion, the copolymer (A1) and (A2) can be also produced by causing an alkyleneoxide to add to a copolymer obtained by copolymerization the monomer (b) and the above unsaturated alcohol in the presence of a polymerization initiator. At the time of copolymerization of the monomer components, if necessary, the above-mentioned other copolymerizable monomer (c) may further be copolymerized.

The oxyalkylene group(s) represented by $R^3O$ in the general formula (2) in the above-mentioned unsaturated (poly)alkylene glycol ether monomer (a1), and the oxyalkylene group(s) represented by $R^5O$ in the general formula (3) in the above-mentioned unsaturated polyalkylene glycol ether monomer (a2) may be constituted of one or two or more oxyalkylene group species. The number of carbon atoms in the oxyalkylene group(s) is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition may be of the random, block and/or alternating type, for instance. For securing a balance between the hydrophilicity and hydrophobicity, it is preferred that the oxyalkylene group comprises the oxyethylene group, with the oxyethylene group preferably accounting for at least 50 mole percent (mole %), more preferably at least 80 mole %, most preferably at least 90 mole %.

The average molar number $m_1$ of addition of the oxyalkylene group represented by the above $R^3O$, and the average molar number $m_2$ of addition of the oxyalkylene group represented by the above $R^5O$ is suitably that $m_2$ is larger than $m_1$, $m_1$ is a number of 1 to 100, and $m_2$ is a number of 6 to 500, in which $m_2-m1 \geq 5$. The value of $(m_2-m1)$ is preferably not less than 10, since the dispersing ability and slump loss preventing ability can be improved when the difference between $m_2$ and m1 is large. More preferably not less than 15, still more preferably not less than 20, in particular not less than 25. In addition, it is preferred to make the value of $(m_2-m1)$ be larger when m1 is larger. Therefore, when m1 is 10 or more, the value of $(m_2-m1)$ is also preferably 10 or more; when m1 is 15 or more, the value of $(m_2-m1)$ is also preferably 15 or more; when m1 is 20 or more, the value of $(m_2-m1)$ is also preferably 20 or more; when m1 is 25 or more, the value of $(m_2-m1)$ is also preferably 25 or more. The value of m1 is suitably 1 to 100, preferably 2 to 100, more preferably 2 to 80, still more preferably 3 to 60, especially preferably 5 to 50, most preferably 5 to 40. On the other hand, the value of $m_2$ is suitably 6 to 500. However, when it is smaller, dispersing ability may decrease with decrease of hydrophilicity, on the contrary, when it is larger, yield may be insufficient with decrease of reactivity, therefore, it is preferably 10 to 500, more preferably 15 to 300, still more preferably 20 to 250, especially preferably 30 to 200, most preferably 40 to 200. Suitable combination of m1 and $m_2$ is a combination in which m1 is a number of 5 to 40, and $m_2$ is a number of 40 to 200, and $m_2-m1 \geq 5$. Further, two or more species of the constituent unit (I') or (I'') may be used in combination, for example, in the case of using one species of the constituent unit (I') and two species the constituent unit (I''), a combination in which $m_1$ is a number of 1 to 20, one of $m_2$ is a number of 20 to 50, and the another $m_2$ is a number of 50 to 300 is exemplified. The average molar number of addition means the average value for the molar number of the organic group(s) in question forming each mole of monomer by addition.

In the above general formula (2) and (3), $R^4$ and $R^6$ represents a hydrogen atom or a hydrocarbon group containing 1 to 30 carbon atoms, respectively. The hydrocarbon group containing 1 to 30 carbon atoms is preferably a hydrocarbon group having no polymerizable double bond, for example, an alkyl group (aliphatic alkyl group or alicyclic alkyl group) containing 1 to 30 carbon atoms; a benzene ring-containing aromatic group containing 6 to 30 carbon atoms such as a phenyl group, an alkylphenyl group, a phenylalkyl group, an (alkyl)phenyl-substituted phenyl group or a naphthyl group. In the above $R^4$ and $R^6$, with the increase in the number of carbon atoms in the hydrocarbon group, the hydrophobicity increases and the dispersing ability may decrease. Therefore, the number of carbon atoms in $R^4$ and/or $R^6$ when this is a hydrocarbon group is preferably 1 to 22, more preferably 1 to 18, still more preferably 1 to 12, in particular 1 to 4. The case where $R^4$ and/or $R^6$ is a hydrogen atom is especially preferred, most preferably where the both of $R^4$ and $R^6$ is a hydrogen atom.

The alkenyl group represented by $Y^2$ in the above general formula (2) and the alkenyl group represented by $Y^3$ in the above general formula (3) is respectively an alkenyl group containing 2 to 4 carbon atoms such as vinyl group, allyl group, methallyl group and 3-butenyl group. Among them, an alkenyl group containing 3 to 4 carbon atoms is preferred, and more preferably is allyl group or methallyl group. The numbers of carbon atoms in $Y^2$ and $Y^3$ may be the same or different.

The unsaturated (poly)alkylene glycol ether monomer (a1) represented by the above general formula (2) and the unsaturated polyalkylene glycol ether monomer (a2) represented by the above general formula (3) can be produced, for example, by causing alkylene oxide to add to an unsaturated alcohol such as allyl alcohol or methallyl alcohol. Suited for use as the above monomers (a1) and (a2) are (poly)ethylene glycol (meth)allyl ether, (poly)ethylene glycol (meth)allyl ether, and (poly)ethylene(poly)propylene glycol (meth)allyl ether. In the practice of the present invention, one or more of these can be used as monomer(s) (a1) for providing the constituent unit (I') and monomer(s) (a2) for providing the constituent unit (I'').

In the present invention, when the copolymer (A1) and (A2) are used, the total amount (content) of the unsaturated (poly)alkylene glycol ether monomer (a1) and the unsaturated polyalkylene glycol ether monomer (a2) is suitably 1 to 100% by mass relative to the total amount of the copolymers (A1) and (A2). When it is not more than 1% by mass, slump loss preventing ability and viscosity decreasing ability may not be sufficient, when it exceeds 100% by mass, dispersing ability for cement may be deteriorated. It is preferably 2 to 100% by mass, more preferably 3 to 90% by mass, still more preferably 5 to 80% by mass. As the monomers (a1) and (a2), those same as or different from the unsaturated (poly) alkylene glycol ether monomer (a1) and the unsaturated polyalkylene glycol ether monomer (a2) used for polymerization of the copolymer (A1) and (A2),respectively, that is, the unsaturated (poly)alkylene glycol ether monomer (a1) from which the constituent unit (I') of the copolymer (A1) is derived, and the unsaturated polyalkylene glycol ether monomer (a2) from which the constituent unit (I") of the copolymer (A2) is derived, may be used. Further, two or more species of the monomers (a1) and (a2) may be used, respectively.

In the present invention, when the copolymer (A1) and (A2) are used, the content of the non-polymerizable (poly) alkylene glycol (B) having no alkenyl group is suitably 1 to 50% by mass relative to 100% by mass of the total of the copolymer (A1) and (A2). When it is less than 1% by mass, no sufficient viscosity decreasing ability may be obtained. When it exceeds 50% by mass, the dispersing ability for cement may be deteriorated. The content is preferably 1.5 to 50% by mass, more preferably 2 to 40% by mass, still more preferably 2.5 to 30% by mass. While, the preferable structure and weight-average molecular weight of the non-polymerizable (poly)alkylene glycol (B) having no alkenyl group are as described above.

In the method for producing the cement admixture of the present invention, the above-mentioned non-polymerizable (poly)alkylene glycol (B) having no alkenyl group may be added after the production of the above-mentioned copolymer (A1) and (A2), however at the time of producing the copolymer (A1), copolymerization of a composition, as a raw material, containing the non-polymerizable (poly)alkylene glycol (B) having no alkenyl group in addition to the monomer constituents containing the above-mentioned unsaturated (poly)alkylene glycol ether monomer (a1) and the above-mentioned maleic acid monomer (b) as essential constituents may be carried out. Accordingly, a composition comprising the copolymer (A1) and the non-polymerizable (poly)alkylene glycol (B) having no alkenyl group can be prepared. As the same, at the time of producing the copolymer (A2), copolymerization of a composition, as a raw material, containing the non-polymerizable (poly)alkylene glycol (B) having no alkenyl group in addition to the monomer constituents containing the above-mentioned unsaturated polyalkylene glycol ether monomer (a2) and the above-mentioned maleic acid monomer (b) as essential constituents may be carried out. Accordingly, a composition comprising the copolymer (A2) and the non-polymerizable (poly)alkylene glycol (B) having no alkenyl group can be prepared. By mixing these compositions, a composition comprising the copolymer (A1), the copolymer (A2), and the non-polymerizable (poly)alkylene glycol (B) having no alkenyl group can be prepared.

The unsaturated (poly)alkylene glycol ether monomer (a1) used in the present invention can be produced, for example, by causing 1 to 100 moles of at least one alkylene oxide to add to an unsaturated alcohol such as allyl alcohol or methallyl alcohol, and the unsaturated polyalkylene glycol ether monomer (a2) can be produced, for example, by causing 6 to 500 moles of at least one alkylene oxide to add to an unsaturated alcohol such as allyl alcohol or methallyl alcohol. At the addition reaction, when a compound containing an active hydrogen such as a saturated alcohol other than the above-mentioned unsaturated alcohol (for example, methanol or ethanol) or water exists in the reaction system, a composition which contains a (poly)alkylene glycol as a byproduct, can be obtained by using the above active hydrogen as a starting material, in addition to the main product monomer (a1) or (a2). In the present invention, without requiring removal of a (poly)alkylene glycol produced as a byproduct at the time of the production of the above-mentioned monomer (a1) or (a2), the copolymerization reaction of a composition containing the (poly)alkylene glycol as the byproduct in addition to the monomer (a1) or (a2), a main product, can be carried out to produce the copolymer (A1) and (A2). Accordingly, the composition comprising the copolymer (A1) and the non-polymerizable (poly)alkylene glycol (B) having no alkenyl group, and the composition comprising the copolymer (A2) and the non-polymerizable (poly)alkylene glycol (B) having no alkenyl group can be easily obtained, and by mixing these compositions, a composition comprising the copolymer (A1), the copolymer (A2), and the non-polymerizable (poly)alkylene glycol (B) having no alkenyl group can be prepared. The cement admixture obtained by such method is also one of the preferred embodiments in the present invention.

When the above-mentioned (poly)alkylene glycol as a byproduct in the producing process of the monomer (a1) or (a2) is a (poly)alkylene glycol containing hydrogen atoms at both terminals, for example, (poly)ethylene glycol or (poly) ethylene(poly)propylene glycol, the molecular weight of the (poly)alkylene glycol obtained by using water containing two active hydrogen as a starting material is higher than that of the monomer (a1) or (a2) obtained by using an unsaturated alcohol containing one active hydrogen as a starting material. In this case, the molecular weight of the (poly)alkylene glycol is same or twice level of that of the monomer (a1) or (a2). Further, after the production of the copolymer (A1) or (A2), further, the non-polymerizable (poly)alkylene glycol (B) having no alkenyl group may be added and a non-polymerizable (poly)alkylene glycol (B) having no alkenyl group to be added may be the same as or different from the non-polymerizable (poly)alkylene glycol (B) having no alkenyl group contained as the byproduct.

At the time of producing the copolymer (A1), as a raw material, a composition containing an oxyalkylene antifoaming (defoaming) agent (oxyalkylene type antifoaming agent) in addition to the above-mentioned unsaturated (poly) alkylene glycol ether monomer (a1), the above-mentioned maleic acid monomer (b), and the non-polymerizable (poly) alkylene glycol (B) having no alkenyl group may be subjected to copolymerization reaction to prepare a cement admixture comprising the copolymer (A1), the non-polymerizable (poly)alkylene glycol (B) having no alkenyl group, and the oxyalkylene defoaming agent. As the same, at the time of producing the copolymer (A2), as a raw material, a composition containing an oxyalkylene antifoaming (defoaming) agent in addition to the above-mentioned unsaturated polyalkylene glycol ether monomer (a2), the above-mentioned maleic acid monomer (b), and the non-polymerizable (poly)alkylene glycol (B) having no alkenyl group may be subjected to copolymerization reaction to prepare a cement admixture comprising the copolymer (A2), the non-polymerizable (poly)alkylene glycol (B) having no alkenyl group, and the oxyalkylene defoaming agent. If being mixed with the copolymer (A1) and (A2), an oxyalkylene defoaming agent with a high hydrophobicity is easy to be isolated and thus makes the storage property unstable. However, as described above, a cement admixture with excellent storage stability can be obtained by copolymerizing a composition, as a raw material, previously mixed with the oxyalkylene defoaming agent. The example of the oxyalkylene defoaming agent used is same as the described above, and two or more species of the oxyalkylene defoaming agent may be used in combination.

In the above-mentioned composition mixed with the oxyalkylene antifoaming agent, the mixing ratio of the oxyalkylene antifoaming agent is preferably 0.01 to 10% by mass relative to the total mass of whole monomers used for copolymerization reaction. More preferably is 0.05 to 5% by mass.

In the above-mentioned composition which comprising the unsaturated (poly)alkylene glycol ether monomer (a1) and the non-polymerizable (poly)alkylene glycol (B) having no alkenyl group, used for copolymerization reaction, and the above-mentioned composition which comprising the unsaturated polyalkylene glycol ether monomer (a2) and the non-polymerizable (poly)alkylene glycol (B) having no alkenyl group, used for copolymerization reaction, the proportion of the (poly)alkylene glycol (B) having no alkenyl group is preferably not more than 50% by mass relative to 100% by mass of the monomer (a1) or (a2), respectively. When the proportion exceeds 50% by mass, the monomer concentration may decrease during polymerization reaction, hence the molecular weight of the copolymer (A1) and (A2) may unfavorably decrease. More preferably is not more than 40% by mass, still more preferably not more than 30% by mass, particularly preferably not more than 20% by mass. On the other hand, the proportion is preferably not less than 0.5% by mass, respectively. For being less than 0.5% by mass, the proportion of the non-polymerizable (poly)alkylene glycol (B) having no alkenyl group obtained as a byproduct in the producing process of the monomer (a1) or (a2) must be decreased, in order to decrease it, a long time is needed for conducting dehydration process to remove an impurity comprising an active hydrogen such as water existing in various materials used for addition reaction of an alkylene oxide such as an unsaturated alcohol, at the wall face of the reaction apparatus or in the gas phase, from the reaction system and further, or purification process for removing non-polymerizable (poly)alkylene glycol (B) having no alkenyl group after completion of addition reaction of an alkylene oxide is required, hence the productivity of the monomers (a1) and (a2) may decrease. Thus, the proportion is more preferably not less than 1% by mass, still more preferably not less than 2% by mass, particularly preferably not less than 2.5% by mass. The preferable ranges of the proportion is 0.5 to 50% by mass, more preferably 1 to 40% by mass, still more preferably 2 to 30% by mass, particularly preferably 2.5 to 20% by mass.

In the method for producing the cement admixture of the present invention, as the above-mentioned unsaturated (poly)alkylene glycol ether monomer (a1) and the above-mentioned unsaturated polyalkylene glycol ether monomer (a2), it may be added after production of the copolymer (A1) and (A2), respectively. However, it is preferable to employ a method in which the polymerization reaction is stopped at the time when the unsaturated (poly)alkylene glycol ether monomers (a1) and (a2) respectively still remains in an amount of 1 to 100% by mass to the copolymer (A1) or (A2) at the time of production of the copolymer (A1) or (A2). Consequently, a composition containing, in addition to the copolymer (A1), the unsaturated (poly)alkylene glycol ether monomer (a1) 1 to 100% by mass to the copolymer (A1), and a composition containing, in addition to the copolymer (A2), the unsaturated polyalkylene glycol ether monomer (a2) 1 to 100% by mass to the copolymer (A2) can be prepared, respectively. When the ratio of the remaining monomer (a1) or (a2) is less than 1% by mass, the workability of a concrete composition probably becomes insufficient. When it exceeds 100% by mass, the dispersing ability for cement is probably deteriorated. In the case of copolymer (A1), it is more preferable that polymerization reaction is stopped at the time when the unsaturated (poly)alkylene glycol ether monomer (a1) still remains in an amount of 2% or more by mass to the copolymer (A1), still more preferably remains 3% or more by mass, particularly preferably remains 4% or more by mass, most preferably remains 5% or more by mass. On the other hand, more preferably remains 90% or less by mass, still more preferably remains 80% or less by mass, particularly preferably remains 70% or less by mass, most preferably remains 50% or less by mass. Further, as for the range of remaining amount of the monomer, it is preferable to stop at the time when the monomer (a1) still remains in an amount of 2 to 100% by mass, more preferably remains 3 to 90% by mass, still more preferably remains 4 to 80% by mass, particularly preferably remains 5 to 70% by mass, most preferably remains 5 to 50% by mass. In the case of copolymer (A2), the preferred embodiment is same as the case of the copolymer (A1)

In addition, after production of copolymer (A1), the unsaturated (poly)alkylene glycol ether monomer (a1) may be further added. The unsaturated (poly)alkylene glycol ether monomer (a1) added and the unsaturated (poly)alkylene glycol ether monomer (a1) used as monomer constituent for copolymerization reaction may be the same or different. As the same, after production of copolymer (A2), the unsaturated polyalkylene glycol ether monomer (a2) may be further added. The unsaturated (poly)alkylene glycol ether monomer (a2) added and the unsaturated (poly)alkylene glycol ether monomer (a2) used as monomer constituent for copolymerization reaction may be the same or different.

The preferred method for producing the copolymer (A1) to obtain the cement mixture of the present invention comprises carrying out copolymerization reaction using a composition which comprises the non-polymerizable (poly)alkylene glycol (B) having no alkenyl group as a starting material, in addition to monomer composition comprising the unsaturated (poly)alkylene glycol ether monomer (a1) and the maleic acid monomer (b), and stopping the polymerization reaction at the time when the unsaturated (poly)alkylene glycol ether monomer (a1) still remains in an amount of 1 to 100% by mass to the copolymer (A1) In this manner, the composition which comprises three components of the copolymer (A1), the unsaturated (poly)alkylene glycol ether monomer (a1), and the non-polymerizable (poly)alkylene glycol (B) having no alkenyl group can be obtained. As the same, the preferred method for producing the copolymer (A2) to obtain the cement mixture of the present invention comprises carrying out copolymerization reaction using a composition which comprises the non-polymerizable (poly)alkylene glycol (B) having no alkenyl group as a starting material, in addition to monomer composition comprising the unsaturated polyalkylene glycol ether monomer (a2) and the maleic acid monomer (b), and stopping the polymerization reaction at the time when the unsaturated polyalkylene glycol ether monomer (a2) still remains in an amount of 1 to 100% by mass to the copolymer (A2). In this manner, the composition which comprises three components of the copolymer (A2), the unsaturated polyalkylene glycol ether monomer (a2), and the non-polymerizable (poly)alkylene glycol (B) having no alkenyl group can be obtained. By mixing these compositions, a composition comprising five components of the copolymer (A1), the copolymer (A2), the monomer (a1), the monomer (a2) and the non-polymerizable (poly)alkylene glycol (B) having no alkenyl group can be prepared. The cement admixture obtained by such method is also one of the preferred embodiments in the present invention.

In the case of two or more unsaturated (poly)alkylene glycol ether monomer (a) differing in the average molar number n of addition of the oxyalkylene group can be used in combination as the unsaturated (poly)alkylene glycol ether monomer (a), the following composition is especially preferred. In the following composition, even if comprising no polymer (C), high dispersing ability and dispersion retaining ability even in a high water reducing ratio range can be exhibited, and further the increase in viscosity and the decrease in the easiness of mixing can be prevented.

That is, a cement admixture comprising four components of a copolymer (A3), an unsaturated (poly)alkylene glycol ether monomer (a1), an unsaturated polyalkylene glycol ether monomer (a2), and a non-polymerizable (poly)alkylene glycol (B) having no alkenyl group at ratios of the total amount of the unsaturated (poly)alkylene glycol ether monomer (a1) and the unsaturated polyalkylene glycol ether monomer (a2) to the copolymer (A3) in a range of 1 to 100% by mass, the non-polymerizable (poly)alkylene glycol (B) having no alkenyl group to the copolymer (A3) in a range of 1 to 50% by mass, wherein the copolymer (A3) contains a constituent unit (I') derived from the unsaturated (poly)alkylene glycol ether monomer (a1), a constituent unit (I") derived from the unsaturated polyalkylene glycol ether monomer (a2), and a constituent unit (II) derived from a maleic acid monomer (b) at ratios of the constituent unit (I'), the constituent unit (I") and the constituent unit (II) in a range of 1% by mass or more, respectively, in the entire constituent units, the unsaturated (poly)alkylene glycol ether monomer (a1) is represented by the above-mentioned general formula (2), the unsaturated polyalkylene glycol ether monomer (a2) is represented by the above-mentioned general formula (3).

The above copolymer (A3) may further contain the above-mentioned other copolymerizable monomer (c)-derived constituent unit (III), and the constituent unit (III) may be one species or two or more species.

In the above-mentioned copolymer (A3), the constituent unit (I') and (I"), and (II), respectively, account for 1% by mass or more relative to the entire constituent units. When the proportion of constituent unit (I') and (I") is less than 1% by mass, the content of the unsaturated (poly)alkylene glycol ether monomer (a1)-derived oxyalkylene group and the unsaturated polyalkylene glycol ether monomer (a2)-derived oxyalkylene group in the copolymer (A3) is too low and, when the proportion of constituent unit (II) is less than 1% by mass, the content of the maleic acid monomer (b)-derived carboxyl group in the copolymer (A3) is too low, so that, in either case, no sufficient dispersing ability may be exhibited. The proportion of the constituent unit (I') is preferably not less than 2% by mass, more preferably not less than 3% by mass, still more preferably not less than 4% by mass, most preferably not less than 5% by mass. On the other hand, the proportion of the constituent unit (I") is preferably not less than 5% by mass, more preferably not less than 10% by mass, still more preferably not less than 15% by mass, particularly preferably not less than 20% by mass, most preferably not less than 30% by mass. Further, the proportion of the constituent unit (I') and (I") is preferably not more than 50 mole % in the entire constituent units, since the polymerizability of the unsaturated (poly)alkylene glycol ether monomer (a1) and the unsaturated polyalkylene glycol ether monomer (a2) is low. On the other hand, the proportion of the constituent unit (II) is preferably not less than 2% by mass relative to the entire constituent units, respectively, more preferably not less than 3% by mass, still more preferably not less than 4% by mass. The upper limit to the content of constituent unit (II) can be selected so that the number of milliequivalents of carboxyl groups contained in the copolymer (A3) as determined on the unneutralized basis may be within the following preferable range. In addition, the total content (% by mass) of the constituent units (I') and (I"), and (II) in the copolymer (A3) is preferably 50 to 100% by mass, more preferably 70 to 100% by mass, relative to the whole copolymer (A3).

The ratio of the each constituent unit giving the copolymer (A3), which is the constituent unit (I')/the constituent unit (I")/the constituent unit (II)/the constituent unit (III), is preferably 1 to 98/1 to 98/1 to 98/0 to 70 (% by mass) Since the content of the constituent unit (I") is preferably larger than the content of the constituent unit (I'), more preferably 2 to 94/5 to 97/1 to 50/0 to 50 (% by mass), still more preferably 3 to 88/10 to 95/2 to 45/0 to 40 (% by mass), further more preferably 4 to 82/15 to 93/3 to 40/0 to 30 (% by mass), particular preferably 5 to 77/20 to 92/3 to 35/0 to 30 (% by mass), most preferably 5 to 66/30 to 91/4 to 30/0 to 30 (% by mass), always provided that the total amount of the constituent unit (I'), (I"), (II) and (III) is 100% by mass. Setting as such a range, a cement admixture more excellent in various capabilities.

In the above copolymer (A3), it is preferred that the number of milliequivalents of carboxyl groups contained in each gram of copolymer (A3) (meq/g) as determined on the unneutralized basis be 0.2 to 5.0. It is thus preferred that the proportion of each constituent unit constituting the copolymer (A3) be selected so that the number of milliequivalents of carboxyl groups in the copolymer (A3) amount to a value within the above range. When the number of milliequivalents of carboxyl groups (meq/g) is more than 5.0, the slump-retaining ability may tend to decrease, and when it is less than 0.2, the initial dispersing ability may tend to decrease. It is more preferably not less than 0.3, still more preferably not less than 0.4. On the other hand, it is more preferably not more than 4.5, still more preferably not more than 4.0, especially preferably not more than 3.5. The range of the above number of milliequivalents (meq/g) is more preferably 0.3 to 4.5, still more preferably 0.3 to 4.0, especially preferably 0.4 to 3.5.

Since the copolymer (A3) may contain another or other carboxyl group-containing constituent unit in addition to the carboxyl containing-constituent unit (II) derived from the maleic acid monomer (b), the above-mentioned number of milliequivalents of carboxyl groups is not limited to the case only where it is derived from the constituent unit (II). Further, in the copolymer (A3), it is preferred that the number of milliequivalents of carboxyl groups originated in the constituent unit (II) is more than the one originated in the above another or other carboxyl-containing constituent unit.

Further, the method of calculation of the number of milliequivalents of carboxyl groups in the copolymer (A3) is the same as the case of the copolymer (A), if another carboxyl group-containing constituent unit (e.g. the constituent unit (V) derived from an unsaturated monocarboxylic acid monomer (e), etc.) in addition to the constituent unit (II) is contained in the copolymer, this must be taken into consideration in calculating the number of milliequivalents of carboxyl groups. In addition to the monomer-based method of calculating the number of milliequivalents of carboxyl groups (meq/g), as mentioned above, the number can also be calculated by measuring the acid value of the above copolymer (A3) while taking into consideration the counter ion species of the carboxyl groups in the copolymer (A3).

In the present invention, when the copolymer (A3) is used, the total amount (content) of the unsaturated (poly) alkylene glycol ether monomer (a1) and the unsaturated polyalkylene glycol ether monomer (a2) is suitably 1 to 100% by mass relative to 100% by mass of the copolymer (A3). When it is not more than 1% by mass, slump loss preventing ability and viscosity decreasing ability may not be sufficient, when it exceeds 100% by mass, dispersing ability for cement may be deteriorated. It is preferably 2 to 100% by mass, more preferably 3 to 90% by mass, still more preferably 5 to 80% by mass. As the monomers (a1) and (a2), those same as or different from the unsaturated (poly) alkylene glycol ether monomer (a1) and the unsaturated polyalkylene glycol ether monomer (a2) used for polymerization of the copolymer (A3), that is, the unsaturated (poly)alkylene glycol ether monomer (a1) from which the constituent unit (I') of the copolymer (A3) is derived, and the unsaturated polyalkylene glycol ether monomer (a2) from which the constituent unit (I") of the copolymer (A3) is derived, may be used. Further, two or more species of the monomers (a1) and (a2) may be used, respectively.

In the present invention, when the copolymer (A3) is used, the content of the non-polymerizable (poly)alkylene glycol (B) having no alkenyl group is suitably 1 to 50% by mass relative to 100% by mass of the copolymer (A3). When it is less than 1% by mass, no sufficient viscosity decreasing ability may be obtained. When it exceeds 50% by mass, the dispersing ability for cement may be deteriorated. The content is preferably 1.5 to 50% by mass, more preferably 2 to 40% by mass, still more preferably 2.5 to 30% by mass. While, the preferable structure and weight-average molecular weight of the non-polymerizable (poly)alkylene glycol (B) having no alkenyl group are as described above.

In the method for producing the cement admixture of the present invention, the above-mentioned non-polymerizable (poly)alkylene glycol (B) having no alkenyl group may be added after the production of the above-mentioned copolymer (A3), however at the time of producing the copolymer (A3), copolymerization of a composition, as a raw material, containing the non-polymerizable (poly)alkylene glycol (B) having no alkenyl group in addition to the monomer constituents containing the above-mentioned unsaturated (poly) alkylene glycol ether monomer (a1), the above-mentioned unsaturated polyalkylene glycol ether monomer (a2) and the above-mentioned maleic acid monomer (b) as essential constituents may be carried out. Accordingly, a cement admixture comprising the copolymer (A3) and the non-polymerizable (poly)alkylene glycol (B) having no alkenyl group can be prepared.

The unsaturated (poly)alkylene glycol ether monomer (a1) used in the present invention can be produced, for example, by causing 1 to 100 moles of at least one alkylene oxide to add to an unsaturated alcohol such as allyl alcohol or methallyl alcohol, and the unsaturated polyalkylene glycol ether monomer (a2) can be produced, for example, by causing 6 to 500 moles of at least one alkylene oxide to add to an unsaturated alcohol such as allyl alcohol or methallyl alcohol. At the addition reaction, when a compound containing an active hydrogen such as a saturated alcohol other than the above-mentioned unsaturated alcohol (for example, methanol or ethanol) or water exists in the reaction system, a composition which contains a (poly)alkylene glycol as a byproduct, can be obtained by using the above active hydrogen as a starting material, in addition to the main product monomer (a1) or (a2). In the present invention, without requiring removal of a (poly)alkylene glycol produced as a byproduct at the time of the production of the above-mentioned monomers (a1) and (a2), the copolymerization reaction of a composition containing the (poly) alkylene glycol as the byproduct in addition to the monomers (a1) and (a2), a main product, can be carried out to produce the copolymer (A3) Accordingly, the composition comprising the copolymer (A3) and the non-polymerizable (poly)alkylene glycol (B) having no alkenyl group can be easily obtained. The cement admixture obtained by such method is also one of the preferred embodiments in the present invention.

When the above-mentioned (poly)alkylene glycol as a byproduct in the producing process of the monomers (a1) and (a2) is a (poly)alkylene glycol containing hydrogen atoms at both terminals, for example, (poly)ethylene glycol or (poly)ethylene (poly)propylene glycol, the molecular weight of the (poly)alkylene glycol obtained by using water containing two active hydrogen as a starting material is higher than that of the monomers (a1) and (a2) obtained by using an unsaturated alcohol containing one active hydrogen as a starting material. In this case, the molecular weight of the (poly)alkylene glycol is same or twice level of that of the monomers (a1) and (a2). Further, after the production of the copolymer (A3), further, the non-polymerizable (poly)alkylene glycol (B) having no alkenyl group may be added and a non-polymerizable (poly)alkylene glycol (B) having no alkenyl group to be added may be the same as or different from the non-polymerizable (poly)alkylene glycol (B) having no alkenyl group contained as the byproduct.

At the time of producing the copolymer (A3), as a raw material, a composition containing an oxyalkylene antifoaming (defoaming) agent in addition to the above-mentioned unsaturated (poly)alkylene glycol ether monomer (a1), the above-mentioned unsaturated polyalkylene glycol ether monomer (a2), the above-mentioned maleic acid monomer (b), and the non-polymerizable (poly)alkylene glycol (B) having no alkenyl group may be subjected to copolymerization reaction to prepare a cement admixture comprising the copolymer (A3), the non-polymerizable (poly)alkylene glycol (B) having no alkenyl group, and the oxyalkylene defoaming agent. If being mixed with the copolymer (A3), an oxyalkylene defoaming agent with a high hydrophobicity is easy to be isolated and thus makes the storage property unstable. However, as described above, a cement admixture with excellent storage stability can be obtained by copolymerizing a composition, as a raw material, previously mixed with the oxyalkylene defoaming agent. The example of the oxyalkylene defoaming agent used is same as the described above, and two or more species of the oxyalkylene defoaming agent may be used in combination.

In the above-mentioned composition mixed with the oxyalkylene antifoaming agent, the mixing ratio of the oxyalkylene antifoaming agent is preferably 0.01 to 10% by mass relative to the total mass of whole monomers used for copolymerization reaction. More preferably is 0.05 to 5% by mass.

In the above-mentioned composition which comprising the unsaturated (poly)alkylene glycol ether monomer (a1), the unsaturated polyalkylene glycol ether monomer (a2) and the non-polymerizable (poly)alkylene glycol (B) having no alkenyl group, used for copolymerization reaction, the proportion of the (poly)alkylene glycol (B) having no alkenyl group is preferably not more than 50% by mass relative to 100% by mass of the total amount of the monomers (a1) and (a2). When the proportion exceeds 50% by mass, the monomer concentration may decrease during polymerization reaction, hence the molecular weight of the copolymer (A3) may unfavorably decrease. More preferably is not more than 40% by mass, still more preferably not more than 30% by mass, particularly preferably not more than 20% by mass. On the other hand, the proportion is preferably not less than 0.5% by mass. For being less than 0.5% by mass, the proportion of the non-polymerizable (poly)alkylene glycol (B) having no alkenyl group obtained as a byproduct in the producing process of the monomers (a1) and (a2) must be decreased, in order to decrease it, a long time is needed for conducting dehydration process to remove an impurity comprising an active hydrogen such as water existing in various materials used for addition reaction of an alkylene oxide such as an unsaturated alcohol, at the wall face of the reaction apparatus or in the gas phase, from the reaction system and further, or purification process for removing non-polymerizable (poly)alkylene glycol (B) having no alkenyl group after completion of addition reaction of an alkylene oxide is required, hence the productivity of the monomers (a1) and (a2) may decrease. Thus, the proportion is more preferably not less than 1% by mass, still more preferably not less than 2% by mass, particularly preferably not less than 2.5% by mass. The preferable ranges of the proportion is 0.5 to 50% by mass, more preferably 1 to 40% by mass, still more preferably 2 to 30% by mass, particularly preferably 2.5 to 20% by mass.

In the method for producing the cement admixture of the present invention, as the above-mentioned unsaturated (poly)alkylene glycol ether monomer (a1) and the above-mentioned unsaturated polyalkylene glycol ether monomer (a2), it may be added after production of the copolymer (A3). However, it is preferable to employ a method in which the polymerization reaction is stopped at the time when the monomers (a1) and (a2) still remain in a total amount of 1 to 100% by mass relative to 100% by mass of the copolymer (A3) at the time of production of the copolymer (A3). Consequently, a composition containing the unsaturated (poly)alkylene glycol ether monomer (a1) and the unsaturated polyalkylene glycol ether monomer (a2), and the total amount of the monomers (a1) and (a2) is 1 to 100% by mass to the copolymer (A3), in addition to the copolymer (A3). When the total amount of the remaining monomers (a1) and (a2) is less than 1% by mass relative to the copolymer (A3), the workability of a concrete composition probably becomes insufficient. When it exceeds 100% by mass, the dispersing ability for cement is probably deteriorated. It is more preferable that polymerization reaction is stopped at the time when the monomers (a1) and (a2) still remains in an total amount of 2% or more by mass to the copolymer (A3), still more preferably remains 3% or more by mass, particularly preferably remains 4% or more by mass, most preferably remains 5% or more by mass. On the other hand, more preferably remains 90% or less by mass, still more preferably remains 80% or less by mass, particularly preferably remains 70% or less by mass, most preferably remains 50% or less by mass. Further, as for the range of remaining total amount of the monomers, it is preferable to stop at the time when the monomers (a1) and (a2) still remain in a total amount of 2 to 100% by mass, more preferably remains 3 to 90% by mass, still more preferably remains 4 to 80% by mass, particularly preferably remains 5 to 70% by mass, most preferably remains 5 to 50% by mass.

In addition, after production of copolymer (A3), the unsaturated (poly)alkylene glycol ether monomer (a1) and/or the unsaturated polyalkylene glycol ether monomer (a2) may be further added. The unsaturated (poly)alkylene glycol ether monomer (a1) and/or the unsaturated polyalkylene glycol ether monomer (a2) added, and the unsaturated (poly)alkylene glycol ether monomer (a1) and the unsaturated polyalkylene glycol ether monomer (a2) used as monomer constituents for copolymerization reaction may be the same or different.

The preferred method for producing the copolymer (A3) to obtain the cement mixture of the present invention comprises carrying out copolymerization reaction using a composition which comprises the non-polymerizable (poly)alkylene glycol (B) having no alkenyl group as the starting material, in addition to monomer composition comprising the unsaturated (poly)alkylene glycol ether monomer (a1), the unsaturated polyalkylene glycol ether monomer (a2) and the maleic acid monomer (b), and stopping the polymerization reaction at the time when the unsaturated (poly)alkylene glycol ether monomer (a1) and the unsaturated polyalkylene glycol ether monomer (a2) still remain in a total amount of 1 to 100% by mass relative to 100% by mass of the copolymer (A3). In this manner, the composition which comprises four components of the copolymer (A3), the unsaturated (poly)alkylene glycol ether monomer (a1), the unsaturated polyalkylene glycol ether monomer (a2) and the non-polymerizable (poly)alkylene glycol (B) having no alkenyl group can be obtained. The cement admixture obtained by such method is also one of the preferred embodiments in the present invention.

In addition, the preferable examples of each constituent unit constituting the copolymer (A3) and the monomer providing such constituent unit are the same as the one in the copolymer (A1) or (A2), as described above.

In the present invention, as the polymer (C), which is different from the copolymer (A), having an oxyalkylene group or a polyoxyalkylene group and a carboxyl group, the polymer (D) is preferably used as mentioned above. The polymer (D) is the polymer containing a constituent unit (IV) derived from a (poly)alkylene glycol mono(meth)acrylic acid ester monomer (d) and a constituent unit (V) derived from an unsaturated monocarboxylic acid monomer (e) at ratios of the constituent units (IV) and (V) in a range of 1% by mass or more, respectively, in the entire constituent units, and the (poly)alkylene glycol mono(meth)acrylic acid ester monomer (d) is represented by the general formula (4):

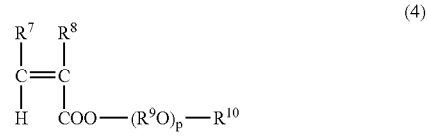

(4)

(wherein $R^7$ and $R^8$ are the same or different and each represents a hydrogen atom or a methyl group, $R^{10}$ represents a hydrogen atom or a hydrocarbon group containing 1 to 30 carbon atoms, $R^9O$ represents one or more species of oxyalkylene groups containing 2 to 18 carbon atoms, and p represents the average molar number of addition of the oxyalkylene groups and is a number of 1 to 500). In the above polymer (D), it is preferred that the number of milliequivalents of carboxyl groups contained in each gram of polymer (D) (meq/g) as determined on the unneutralized basis be 0.3 to 3.5, as mentioned below.

The polymer (D) is the polymer containing the constituent unit (IV) derived from a (poly)alkylene glycol mono(meth)

acrylic acid ester monomer (d) represented by the general formula (4) and the constituent unit (V) derived from an unsaturated monocarboxylic acid monomer (e), however, the polymer(D) may further contain one two or more species of another or other copolymerizable monomer (e.g. the above-mentioned monomer (g))-derived constituent unit. These constituent units in the polymer (D) may comprise one or two or more species. In addition, the constituent unit (IV) is equivalent to the structure in which a polymerizable double bond of the monomer (d) represented by the general formula (4) is opened by polymerization reaction. The constituent unit (V) is equivalent to the structure in which a polymerizable double bond of the unsaturated monocarboxylic acid monomer (e) is opened by polymerization reaction.

The ratio of the each constituent unit giving the polymer (D), which is the constituent unit (IV)/the constituent unit (V), is preferably 1 to 99/99 to 1 (% by mass). More preferably 10 to 98/90 to 2 (% by mass), still more preferably 30 to 97/70 to 3 (% by mass), particular preferably 40 to 97/60 to 3 (% by mass), most preferably 50 to 96/50 to 4 (% by mass). Further, the total content (% by mass) of the constituent units (IV) and (V) in the polymer (D) is preferably 50 to 100% by mass, more preferably 70 to 100% by mass, relative to the whole polymer (D). The upper limit to the content of constituent unit (V) can be selected so that the number of milliequivalents of carboxyl groups contained in the polymer (D) as determined on the unneutralized basis may be within the following preferable range.

In order to obtain high dispersing ability, it is preferred that the number of milliequivalents of carboxyl groups contained in each gram of polymer (D) (meq/g) as determined on the unneutralized basis be 0.3 to 3.5. It is thus preferred that the proportion of each constituent unit constituting the polymer (D) be selected so that the number of milliequivalents of carboxyl groups in the polymer (D) amount to a value within the above range. The number of milliequivalents of carboxyl groups in the polymer (D) is more preferably 0.3 to 3.0, still more preferably 0.4 to 2.5. In addition, since the polymer (D) may respectively contain another or other carboxyl group-containing constituent unit such as the constituent unit (II) derived from the maleic acid monomer (b), in addition to the constituent unit (V) derived from an unsaturated monocarboxylic acid monomer (e) the above-mentioned number of milliequivalents of carboxyl groups is not limited to the case only where it is derived from the constituent unit (V).

The above term "number of milliequivalents of carboxyl groups contained in each gram of polymer (D) (meq/g) as determined on the unneutralized basis" is used herein to include the case where the polymer (D) is in a salt form. The methods of calculation are same as the case of the copolymer (A) for the case where it occurs as an acid and for the case where it occurs as a salt. If another carboxyl group-containing constituent unit (e.g. the constituent unit (II) derived from the maleic acid monomer (b), etc.) in addition to the constituent unit (V) is contained in the polymer, this must be taken into consideration in calculating the number of milliequivalents of carboxyl groups. In addition to the monomer-based method of calculating the number of milliequivalents of carboxyl groups (meq/g), as mentioned above, the number can also be calculated by measuring the acid value of the above polymer (D) while taking into consideration the counter ion species of the carboxyl groups in the polymer (D).

In the present invention, a method for producing the polymer (D) is not particularly limited and, for example, the polymer can be produced by polymerizing monomer components essentially comprising the (poly)alkylene glycol mono(meth)acrylic acid ester monomer (d) giving the constituent unit (IV) and the unsaturated monocarboxylic acid monomer (e) giving the constituent unit (V). Further, for example, the polymer can be obtained by direct esterification of an alkoxypolyalkylene glycol having a hydrocarbon group containing 1 to 30 carbon atoms at the one of terminal group to at least a part of the carboxylic group in a polymer obtained by polymerization of the monomer component containing (meth)acrylic acid monomer, that is, acrylic acid, methacrylic acid or crotonic acid as essential component.

In the above-mentioned the (poly)alkylene glycol mono(meth)acrylic acid ester monomer (d), the number of carbon atoms in the oxyalkylene group $R^9O$ in the general formula (4) is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition maybe of the random, block and/or alternating type, for instance. For securing a balance between the hydrophilicity and hydrophobicity, it is preferred that the oxyalkylene group comprises the oxyethylene group, with the oxyethylene group preferably accounting for at least 50 mole percent (mole %), more preferably at least 80 mole %, most preferably at least 90 mole %.

The average molar number p of addition of the oxyalkylene group represented by the above $R^9O$ is suitably a number of 1 to 500. When the average molar number p exceeds 500, sufficient copolymerizability may not be obtained. When it decreases, the hydrophilicity of the polymer obtained tends to decrease, hence sufficient dispersing ability may not be obtained. Preferably, it is 2 to 500, more preferably 2 to 300, still more preferably 3 to 300, in particular 4 to 300, most preferably 4 to 200.

In the above general formula (4), $R^{10}$ represents a hydrogen atom or a hydrocarbon group containing 1 to 30 carbon atoms, and preferably the hydrocarbon group containing 1 to 30 carbon atoms. Suitable as the hydrocarbon group containing 1 to 30 carbon atoms is the same in the above-mentioned $R^2$. In the above $R^{10}$, with the increase in the number of carbon atoms in the hydrocarbon group, the hydrophobicity increases and the dispersing ability may decrease. Therefore, the number of carbon atoms in $R^{10}$ when this is a hydrocarbon group is preferably 1 to 22, more preferably 1 to 18, still more preferably 1 to 12, in particular 1 to 5.

Suitable as the monomer (d) are, for example, (meth)acrylic acid- or crotonic acid-$C_{2-18}$ alkylene oxide adduct; esterification product derived from (meth)acrylic acid or crotonic acid on one hand and, on the other, alkoxypolyalkylene glycol obtained by addition of an alkylene oxide(s) containing 2 to 18 carbon atoms to any of saturated aliphatic alcohol containing 1 to 30 carbon atoms, such as methanol, ethanol, 2-propanol, 1-butanol, 1-pentanol, 1-hexanol, octanol, 2-ethyl-1-hexanol, nonyl alcohol, lauryl alcohol, cetyl alcohol and stearyl alcohol, unsaturated aliphatic alcohols containing 3 to 30 carbon atoms, such as crotyl alcohol and oleyl alcohol, alicyclic alcohols containing 3 to 30 carbon atoms, such as cyclohexanol, and aromatic alcohols containing 6 to 30 carbon atoms, such as phenol, phenylmethanol (benzyl alcohol), methylphenol (cresol), dimethylphenol (xylenol) and nonylphenol. As specific examples of the monomer (d), for example, various polyalkylene glycol mono(meth)acrylates (corresponding to the case where, in the above general formula (4), p is not less than 2 and $R^{10}$ is a hydrogen atom) such as polyethylene glycol mono (meth)acrylate, polypropylene glycol mono(meth)acrylate and polybutyleneglycol mono(meth)acrylate; various alkoxypolyalkylene glycol mono(meth)acrylates such as methoxypolyethylene glycol mono(meth)acrylate, methoxypolyethylenepolypropylene glycol mono(meth)acrylate and methoxypolyethylenepolybutylene glycol mono(meth)acrylate; and the like. In the polymer (D), the (poly)alkylene glycol mono(meth)acrylic acid ester monomer (d) giving the constituent unit (IV) may be used singly or or two or more of them may be used in combination.

The unsaturated monocarboxylic acid monomer (e) providing the constituent unit (V) is preferably (meth)acrylic acid monomer, for example, acrylic acid, methacrylic acid and crotonic acid, and monovalent metal salt, divalent metal salt, ammonium salt and organic ammonium salt of these. From the point of copolymerizability, (meth)acrylic acid or its salt is more preferable. In addition, as the monovalent metal, alkali metal such as sodium and potassium is preferable; as divalent metal, alkaline earth metal such as calcium and magnesium is preferable. The organic ammonium is protonated organic amine, and suitable are alkanolammonium such as ethanolammonium, diethanolammonium and triethanolammonium; alkylammonium such as triethylammonium. The monomer (e) may be used singly or two or more may be used in combination.

In the present invention, as the polymer (C), which is different from the copolymer (A), having an oxyalkylene group or a polyoxyalkylene group and a carboxyl group, the polymer (E) is also preferably used as mentioned above. The polymer (E) is the polymer containing a constituent unit (VI) derived from an unsaturated (poly)alkylene glycol ether monomer (f) and a constituent unit (II) derived from a maleic acid monomer (b) at ratios of the constituent units (VI) and (II) in a range of 1% by mass or more, respectively, in the entire constituent units, and the unsaturated (poly)alkylene glycol ether monomer (f) is represented by the general formula (5):

$$Y^4O(R^{11}O)qR^{12} \tag{5}$$

(wherein $Y^4$ represents an alkenyl group containing 5 to 8 carbon atoms, $R^{12}$ represents a hydrogen atom or a hydrocarbon group containing 1 to 30 carbon atoms, $R^{11}O$ represents one or more species of oxyalkylene groups containing 2 to 18 carbon atoms, and q represents the average molar number of addition of the oxyalkylene groups and is a number of 1 to 500).

The polymer (E) is the polymer containing a constituent unit (VI) derived from an unsaturated (poly)alkylene glycol ether monomer (f) and a constituent unit (II) derived from a maleic acid monomer (b), however, the polymer (E) may further contain one two or more species of another or other copolymerizable monomer(e.g. the above-mentioned monomer (g))-derived constituent unit. These constituent units in the polymer (E) may comprise one or two or more species. In addition, the constituent unit (VI) is equivalent to the structure in which a polymerizable double bond of the monomer (f) represented by the general formula (5) is opened by polymerization reaction.

In the above-mentioned polymer (E), the constituent unit (VI) and (II), respectively, account for 1% by mass or more relative to the all constituent units. When the proportion of constituent unit (VI) is less than 1% by mass, the content of the unsaturated (poly)alkylene glycol ether monomer (f)-derived oxyalkylene group in the polymer (E) is too low and, when the proportion of constituent unit (II) is less than 1% by mass, the content of the maleic acid monomer (b)-derived carboxyl group in the polymer (E) is too low, so that, in either case, no sufficient dispersing ability may be exhibited. Further, the proportion of the constituent unit (VI) is preferably not more than 50 mole % in the entire constituent units, since the polymerizability of the unsaturated (poly)alkylene glycol ether monomer (f) is low, therefore the polymer (E) with high dispersing ability in high yields can obtained. On the other hand, the upper limit to the content of constituent unit (II) can be selected so that the number of milliequivalents of carboxyl groups contained in the polymer (E) as determined on the unneutralized basis may be within the following preferable range. In addition, the total content (% by mass) of the constituent units (VI) and (II) in the polymer (E) is preferably 50 to 100% by mass, more preferably 70 to 100% by mass, relative to the whole polymer (E).

In order to obtain high dispersing ability, it is preferred that the number of milliequivalents of carboxyl groups contained in each gram of polymer (E) (meq/g) as determined on the unneutralized basis be 0.3 to 3.5. It is thus preferred that the proportion of each constituent unit constituting the polymer (E) be selected so that the number of milliequivalents of carboxyl groups in the polymer (E) amount to a value within the above range. The number of milliequivalents of carboxyl groups in the polymer (E) is more preferably 0.3 to 3.0, still more preferably 0.4 to 2.5. In addition, since the polymer (E) may respectively contain another or other carboxyl group-containing constituent unit such as the constituent unit (V) derived from an unsaturated monocarboxylic acid monomer (e), in addition to the constituent unit (II) derived from the maleic acid monomer (b), the above-mentioned number of milliequivalents of carboxyl groups in the polymer (E) is not limited to the case only where it is derived from the constituent unit (II).

The above term "number of milliequivalents of carboxyl groups contained in each gram of polymer (E) (meq/g) as determined on the unneutralized basis" is used herein to include the case where the polymer (E) is in a salt form. The methods of calculation are same as the case of the copolymer (A) for the case where it occurs as an acid and for the case where it occurs as a salt. In addition to the monomer-based method of calculating the number of milliequivalents of carboxyl groups (meq/g), as mentioned above, the number can also be calculated by measuring the acid value of the above polymer (E) while taking into consideration the counter ion species of the carboxyl groups in the polymer (E).

In the present invention, a method for producing the polymer (E) is not particularly limited and, for example, the polymer can be produced by polymerizing monomer components essentially comprising the unsaturated (poly)alkylene glycol ether monomer (f) giving the constituent unit (VI) and the maleic acid monomer (b) giving the constituent unit (II). Further, for example, in place of the monomer (f), monomer before addition of alkylene oxide, that is, unsaturated alcohol such as 3-methyl-3-buten-1-ol may be used. On that occasion, the Polymer (E) can be also produced by causing 1 to 500 moles, on average, of an alkyleneoxide to add to a copolymer obtained by copolymerization, the monomer (b) and the above-mentioned unsaturated alcohol in the presence of a polymerization initiator. At the time of copolymerization of the monomer components, if necessary, another or other copolymerizable monomer may further be copolymerized.

In the above-mentioned the unsaturated (poly)alkylene glycol ether monomer (f), the number of carbon atoms in the oxyalkylene group $R^{11}O$ in the general formula (5) is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition maybe of the random, block and/or alternating type, for instance. For securing a balance between the hydrophilicity and hydrophobicity, it is preferred that the oxyalkylene group comprises the oxyethylene group, with the oxyethylene group preferably accounting for at least 50 mole percent (mole %), more preferably at least 80 mole %, most preferably at least 90 mole %.

The average molar number q of addition of the oxyalkylene group represented by the above $R^{11}O$ is suitably a number of 1 to 500. When the average molar number p exceeds 500, sufficient copolymerizability may not be obtained. When it decreases, the hydrophilicity of the polymer obtained tends to decrease, hence sufficient dispersing ability may not be obtained. Preferably, it is 2 to 500, more preferably 2 to 300, still more preferably 3 to 300, in particular 4 to 300, most preferably 4 to 200.

In the above general formula (5), $R^{12}$ represents a hydrogen atom or a hydrocarbon group containing 1 to 30 carbon atoms. Suitable as the hydrocarbon group containing 1 to 30 carbon atoms is the same in the above-mentioned $R^2$. In the above $R^{12}$, with the increase in the number of carbon atoms in the hydrocarbon group, the hydrophobicity increases and the dispersing ability may decrease. Therefore, the number of carbon atoms in $R^{12}$ when this is a hydrocarbon group is preferably 1 to 22, more preferably 1 to 18, still more preferably 1 to 12, in particular 1 to 5. The case where $R^{12}$ is a hydrogen atom is most preferred.

In the above general formula (5), the alkenyl group represented by $Y^4$ is an alkenyl group containing 5 to 8 carbon atoms, however, the number of the carbon atom is preferably 5, for example 3-methyl-3-butetyl group, 3-methyl-2-butetyl group, 2-methyl-3-butetyl group, 2-methyl-2-butetyl group and 1,1-dimethyl-2-propenyl group. Among them, 3-methyl-3-butetyl group is especially preferred.

The unsaturated (poly)alkylene glycol ether monomer (f) represented by the above general formula (5) can be produced, for example, by causing 1 to 500 moles of alkylene oxide to add to an unsaturated alcohol such as 3-methyl-3-buten-1-ol. Suited for use as the above monomer (f) are (poly)ethylene glycol 3-methyl-3-butenyl ether, (poly)ethylene(poly)propylene glycol 3-methyl-3-butenyl ether, and (poly)ethylene(poly)butylene glycol 3-methyl-3-butenyl ether. In the practice of the present invention, one or more of these can be used as monomer(s) (f) for providing the constituent unit (VI).

In addition, the preferable examples of each constituent unit constituting the polymer (E) and the monomer providing such constituent unit are the same as the one in the copolymer (A) or polymer (D), as described above.

In the present invention, the copolymer (A), (A1), (A2), (A3), polymer (D) and (E) may be respectively produced by (co)polymerization of the monomer components containing the above-mentioned monomers using a polymerization initiator. In the present invention, the species and the amounts used of the monomers to be contained in the monomer components are appropriately set so as to give the constituent units composing these (co)polymer as described above.

The above-mentioned (co) polymerization can be carried out in the manner of conventional polymerization such as solution polymerization or bulk polymerization. The solution polymerization can be carried out either batchwise or continuously. Suited for use as the solvent on that occasion are not particularly limited, for example, water; alcohol such as methyl alcohol, ethyl alcohol and isopropyl alcohol; aromatic or aliphatic hydrocarbon such as benzene, toluene, xylene, cyclohexane and n-hexane; ester compound such as ethyl acetate; ketone compound such as acetone and methyl ethyl ketone; cyclic ether compound such as tetrahydrofuran and dioxane. In view of the solubilities of the starting monomers and the polymer obtained, at least one solvent selected from the group consisting of water and lower alcohol containing 1 to 4 carbon atoms is preferably used. Among them, water is more preferably used as solvent, since the process of removing solvent can be omitted.

In carrying out an aqueous polymerization, use is made, as a radical polymerization initiator, a water-soluble polymerization initiator, for example, a persulfate salt such as ammonium persulfate, sodium persulfate or potassium persulfate; hydrogen peroxide; or a water-soluble azo-initiator, for example an azoamidine compound such as 2,2'-azobis-2-methylpropionamidine hydrochloride, a cyclic azoamidine compound such as 2,2'-azobis-2-(2-imidazolin-2-yl) propane hydrochloride, or an azonitrile compound such as 2-carbamoylazoisobutyronitrile. On that occasion, an accelerator (reducing agent) may be used combinedly, for example an alkali metal sulfite such as sodium hydrogen sulfite, a metabisulfite, sodium hypophosphate, an Fe(II) salt such as Mohr's salt, sodium hydroxymethanesulfinate dihydrate, hydroxylamine hydrochloride, thiourea, L-ascorbic acid (salt) or erythorbic acid (salt). Among them, combination of hydrogen peroxide and organic reducing agent is preferred. Suited for use as the organic reducing agent are L-ascorbic acid (salt), L-ascorbate, erythorbic acid (salt) and erythorbate. The above radical polymerization initiator or accelerator (reducing agent) may be used singly or two or more of them may be used in combination, respectively.

In carrying out the solution polymerization using a lower alcohol, aromatic hydrocarbon, aliphatic hydrocarbon, ester compound or ketone compound as the solvent, or the bulk polymerization, a peroxide such as benzoyl peroxide or lauroyl peroxide; a hydroperoxide such as t-butyl hydroperoxide or cumene hydroperoxide; or an azo compound such as azobisisobutyronitrile, for instance, is used as the polymerization initiator. On that occasion, an accelerator such as an amine compound may be used in combination. Further, when a mixed solvent composed of water and a lower alcohol is used, an appropriate polymerization initiators or polymerization initiator-accelerator combination can be selected from among the above-mentioned various radical polymerization initiators or radical polymerization initiator-accelerator combinations. The polymerization temperature may appropriately be selected depending on the solvent and polymerization initiator employed. Generally, the polymerization is carried out at 0 to 150° C.

With respect to the above-mentioned copolymerization, the amount of the entire monomer components to be used is preferably 30% by mass or more in the entire raw materials including other raw materials. When it is so lower than the amount, the polymerization ratio and the productivity possibly become insufficient. Particularly, in the case of producing the copolymer (A), (A1), (A2), (A3) and polymer (E), the polymerizability of the unsaturated (poly)alkylene glycol ether monomer is low, therefore, the amount of the entire monomer components to be used is more preferably 40 to 99% by mass in the entire raw materials including other raw materials. It is still more preferably 50 to 99% by mass, particularly preferably 55 to 95% by mass, and most preferably 60 to 90% by mass.

In the above-mentioned copolymerization, an injection method of each monomer to a reaction vessel is not particularly restricted but includes, for example, a method comprising injecting the whole monomers to a reaction vessel collectively at the initial stage; a method comprising injecting the whole monomers to a reaction vessel divisionally or continuously; and a method comprising injecting part of monomers to a reaction vessel at the initial stage and then injecting the remnant to are action vessel divisionally or continuously. Specifically, as preferred injection method of producing the copolymer (A), there may be mentioned the following methods (1) to (3).

(1) A method comprising injecting the whole monomer (a) and monomer (b) to a reaction vessel continuously.
(2) A method comprising injecting part of monomer (a) to a reaction vessel at the initial stage and then injecting the remnant of monomer (a) and whole monomer (b) to a reaction vessel continuously.
(3) A method comprising injecting part of monomer (a) and part of monomer (b) to a reaction vessel at the initial stage, and then injecting the remnant of monomer (a) and the remnant of monomer (b) to a reaction vessel in several portions, respectively by turns.

Further, by varying the injection speed of each monomer to a reaction vessel continuously or gradationally and changing the mass ratio of each injected monomer per time continuously or gradationally, a copolymer mixture containing constituent unit (I) and (II) differing in the content in the copolymer (A) may be synthesized in the polymerization reaction system. In addition, a radical polymerization initiator may be placed in a reaction vessel at the initial stage, or may be added dropwise to a reaction vessel, and these methods may be used combinedly according to need. Preferred injection methods of producing the copolymer (A1), (A2) and (A3) are same as the case of producing the copolymer (A).

In the above-mentioned copolymerization, for controlling the molecular weight of the product copolymer (A), (A1), (A2), (A3), polymer (D) and (E) a chain transfer agent may be used. Suitable as the chain transfer agent are conventional hydrophilic chain transfer agent, for example, thiol chain transfer agent such as mercaptoethanol, thioglycerol, thioglycolic acid, 3-mercaptopropionic acid, thiomalic acid and 2-mercaptoethane sulfonic acid; secondary alcohol such as isopropyl alcohol; lower oxide such as phosphorous acid, hypophosphorous acid and salt thereof (for example, sodium hypophosphorate and potassium hypophosphorate), sulfurous acid, hydrogen sulfite, (meth)bisulfurous acid and salt thereof (for example, sodium sulfite, sodium hydrogen sulfite, sodium dithionite and sodium (meth)bisulfite), and salt thereof. Further, the use of hydrophobic chain transfer agent is effective for improvement in cement composition viscosity. Suitable as the hydrophobic chain transfer agent are thiol chain transfer agent having a hydrocarbon group containing 3 or more carbon atoms such as butanethiol, octanethiol, decanethiol, dodecanethiol; hexadecanethiol, octadecanethiol, cyclohexyl mercaptan, thiophenol, thioglycolic octyl, and 3-mercaptopropionic octyl. It is also possible to use two or more chain transfer agents combinedly and to use a hydrophilic chain transfer agent and hydrophobic chain transfer agent combinedly. Further, the molecular weight of the copolymer (A), (A1), (A2), (A3), polymer (D) and (E) can also be controlled effectively by using, a monomer highly active in chain transfer, for example (meth) allylsulfonic acid (or a salt thereof).

For obtaining the (co)polymer with a predetermined molecular weight with good reproducibility in the above polymerization, it is necessary that the polymerization reaction proceed in a stable manner. Therefore, in the case of solution polymerization, the dissolved oxygen concentration in the solvent employed at 25° C. is preferably not more than 5 ppm, more preferably 0.01 to 4 ppm, still more preferably 0.01 to 2 ppm, most preferably 0.01 to 1 ppm. When the addition of the monomers to the solvent is followed by purging with nitrogen or the like, it is preferable that the dissolved oxygen concentration in the system, including the monomers, be within the above range.

The adjustment of the dissolved oxygen concentration in the above solvent may be carried out in the polymerization vessel or by using the solvent adjusted in advance with respect to the dissolved oxygen content. Suitable as the method of eliminating oxygen in solvents are the following methods (1) to (5):

(1) A closed vessel containing the solvent is charged with an inert gas such as nitrogen, under pressure, and the pressure within the closed vessel is then reduced to thereby reduce the partial pressure of oxygen in the solvent. The pressure within the closed vessel may be reduced in a nitrogen stream.
(2) The gaseous phase in a vessel containing the solvent is replaced with an inert gas such as nitrogen, and the liquid phase is stirred vigorously for a sufficiently long period of time.
(3) The solvent placed in a vessel is bubbled with an inert gas such as nitrogen, for a sufficiently long period of time.
(4) The solvent is once boiled and then cooled in an inert gas (e.g. nitrogen) atmosphere.
(5) The relevant piping is provided with a static mixer, and the solvent is admixed with an inert gas such as nitrogen, in the course of transfer to the polymerization vessel through the piping.

The copolymer (A), (A1), (A2), (A3), polymer (D) and (E) prepared by the above-mentioned copolymerization may be used as it is as an essential component of the cement admixture of the present invention. However, it is preferable to adjust its pH in a range of a weakly acidic range in state of an aqueous solution in terms of handling convenience. The range of pH is more preferably 4 or more, further preferably 5 or more, particularly preferably 6 or more. On the other hand, the copolymerization reaction may be carried out at pH 7 or more. In such a case, the polymerization ratio is decreased and, also, the dispersing ability is deteriorated because of insufficient copolymerization; therefore, the copolymerization reaction is preferably carried out at a pH in a range from acidic to neutral condition. The pH is more preferably in a range of less than 6, further preferably less than 5.5, and particularly preferably less than 5. Accordingly, it is preferable to adjust pH to be higher by adding an alkaline substance after the copolymerization reaction is carried out at a low pH. As a preferable embodiment, practically, the following methods can be exemplified: after the copolymerization reaction is carried out at pH less than 6, the pH is adjusted to be 6 or more by adding an alkaline substance; after the copolymerization reaction is carried out at pH less than 5, the pH is adjusted to be 5 or more by adding an alkaline substance; and after the copolymerization reaction is carried out at pH less than 5, the pH is adjusted to be 6 or more by adding an alkaline substance. The pH adjustment may be carried out by using, for example, inorganic salt such as hydroxide and carbonate of monovalent metal or divalent metal; ammonia; alkaline substance such as organic amine and the like. Further, in the case pH has to be decreased, particularly in the case pH adjustment is required at the time of polymerization, for example, pH can be adjusted by using an acidic substance such as phosphoric acid, sulfuric acid, nitric acid, alkyl phosphate, alkyl sulfate, alkyl sulfonic acid, (alkyl)benzenesulfonic acid and the like. Among these acidic substances, phosphoric acid is preferable since it has a pH buffering function. In addition, on completion of the reaction, the concentration adjustment may be carried out if necessary.

The weight-average molecular weight of the copolymer (A), (A1), (A2), (A3),polymer (D) and (E) is preferably 1000 to 500000 as determined by GPC on the polyethylene glycol equivalent basis. More preferably 5000 to 300000, still more preferably 10000 to 150000. By using copolymer or polymer having such a weight-average molecular weight range, it becomes possible to obtain cement admixture capable of manifesting higher level of dispersing ability.

The ratio of the above-mentioned copolymer (A) and the polymer (C) having an oxyalkylene group or a polyoxyalkylene group and a carboxyl group, that is, the mass ratio (% by mass) of the polymer (C) to the copolymer (A) on the basis of solid matters (non-volatile components) is properly in a range of 1 to 10000% by mass. The mass proportion varies depending on the performance balance of the polymer used in combination, however, preferably 5 to 2000% by mass, more preferably 10 to 1000% by mass, still more preferably 25 to 400% by mass.

Similarly, the ratio of the above-mentioned copolymer (A1) and the copolymer (A2), that is, the mass ratio (% by mass) of the copolymer (A2) to the copolymer (A1) on the basis of solid matters (non-volatile components) is properly in a range of 1 to 10000% by mass. The mass proportion varies depending on the performance balance of the polymer used in combination, however, preferably 5 to 2000% by mass, more preferably 10 to 1000% by mass, still more preferably 25 to 400% by mass.

The cement admixture of the present invention comprises, as essential constituents, four components of the copolymer (A), the unsaturated (poly)alkylene glycol ether monomer (a), the non-polymerizable (poly)alkylene glycol (B) having no alkenyl group, and the polymer (C), which is different from the copolymer (A), having an oxyalkylene group or a polyoxyalkylene group and a carboxyl group, or five components of the copolymer (A1), the copolymer (A2), the unsaturated (poly)alkylene glycol ether monomer (a1), the unsaturated polyalkylene glycol ether monomer (a2), and the non-polymerizable (poly)alkylene glycol (B) having no alkenyl group. The cement admixture may be used, in the form of an aqueous solution, or in the form of a powder prepared by neutralizing with the hydroxide of a divalent metal such as calcium or magnesium to give a polyvalent metal salt, followed by drying, or by being carried on an inorganic powder such as a fine silicic powder, followed by drying, or drying and solidifying it in a thin film-like state on a support by using a drum type drying apparatus, a disk type drying apparatus or a belt type drying apparatus and then crushing the resulting dried product. In addition, the composition containing three components of the copolymer (A), the unsaturated (poly)alkylene glycol ether monomer (a) and the non-polymerizable (poly)alkylene glycol (B) having no alkenyl group, and the polymer (C), which is different from the copolymer (A), having an oxyalkylene group or a polyoxyalkylene group and a carboxyl group are respectively powdered by the above-mentioned method, and then these composition can be mixed to use, or the one in the form of a solution and the another in the form of a powder can be respectively mixed at mixing of cement composition. It is also possible to previously mix the cement admixture of the present invention with a cement composition containing such as a dry mortar containing no water and to use the composition as a premixed product for plastering, floor finishing, grout and the like. Further, it is also possible to mix the polymer (C) having an oxyalkylene group or a polyoxyalkylene group and a carboxyl group in the form of a solution or powder, at the mixing a cement composition, with the cement composition containing the premixed product previously mixed the powdered composition containing three components of the copolymer (A), the unsaturated (poly)alkylene glycol ether monomer (a) and the non-polymerizable (poly)alkylene glycol (B) having no alkenyl group.

The cement admixture of the present invention can be used in various hydraulic material, namely in cement composition such as cement and gypsum, etc., or the other hydraulic material. Preferred examples of the hydraulic composition comprising a hydraulic material, water and the cement admixture of the present invention, if necessary together with a fine aggregate (e.g. sand) or a coarse aggregate (e.g. crushed stone), are cement paste, mortar, concrete and plaster and the like Among the hydraulic compositions mentioned above, cement composition in which cement is used as the hydraulic material is in commonest use, and the cement composition comprises the cement admixture of the present invention, cement and water. Such cement composition is also one of the present invention.

In the above cement composition, cement is not particularly limited. Suited for use are portland cement species (ordinary, high-early-strength, ultra high-early-strength, moderate heat, sulfate persisting, and low alkali grade thereof), various blended cement species (blast furnace slag cement, silica cement, fly ash cement), white portland cement, alumina cement, ultra rapid hardening cement (one clinker ultra rapid hardening cement, two clinker ultra rapid hardening cement, magnesium phosphate cement), grouting cement, oil-well cement, lower calorific value cement (lower calorific value blast furnace slag cement, fly ash-mixed lower calorific value blast furnace slag cement, high belite cement), ultrahigh strength cement, cement-based hardening material, and economical cement (cement produced by using at least one of municipal refuse incineration as hand sewage sludge incineration ash as a material). Fine powders such as blast furnace slag, fly ash, cinder ash, clinker ash, husk ash, silica fume, silica powder and limestone powder, and gypsum may further be added. Usable as the aggregate are gravel, crushed stone, water granulated blast furnace slag, recycled concrete aggregate and, further, fireproof aggregates such as silica stone-based, clay-based, zircon-based, high alumina, silicon carbide-based, graphite-based, chrome-based, chrome-magnesite, and magnesia-based ones.

As for the unit water amount, the amount of cement and the water/cement ratio in each cubic meter of the above cement composition, the unit water amount of 100 to 185 kg/m³, the amount of cement as used of 200 to 800 kg/m³, and the water/cement ratio (mass ratio) of 0.1 to 0.7 are preferred. More preferably, the unit water amount of 120 to 175 kg/m³, the amount of cement as used of 250 to 800 kg/m³, and the water/cement ratio (mass ratio) of 0.2 to 0.65 are recommended for wide use in poor to rich mixtures. The cement admixture of the present invention can be used in a high water reducing ratio range, namely a range where a water/cement ratio (by mass) is low, such as 0.15 to 0.5% by mass (preferably 0.15 to 0.4% by mass). Further, it can be used effectively for high strength concrete with a high unit cement amount and low water/cement ratio and poor concrete with the unit cement amount of 300 kg/m³ or lower.

The amount of addition of the cement admixture of the present invention in the above cement composition, when it is used in mortar or concrete, for instance, in which hydraulic cement is used, is preferably 0.01 to 10.0% by mass based on the mass of cement calculated on the solid content basis. Consequently, various favorable effects, such as reduction in unit water amount, increase in strength and improvement in durability, are realized. When the above addition amount is lower than 0.01%, the performance characteristics may not become sufficient. Conversely, when it exceeds 10.0%, the effects will substantially reach the peak and this may be disadvantageous from the economical viewpoint. The range of the addition level is more preferably 0.02 to 5.0% by mass, still more preferably 0.05 to 3.0% by mass, particularly preferably 0.1 to 2.0% by mass.

Since the above-mentioned cement composition is excellent in the pump transportation and is provided with remarkably improved workability for execution, and has high fluidity, it is effective in ready mixed concrete, concrete for secondary concrete products (precast concrete), centrifugal molded concrete, vibrating compacted concrete, steam cured concrete, concrete for spraying and the like and, further, it is effective also in mortar and concrete species required to have high fluidity, such as medium flowing concrete (concrete showing a slump value of 22 to 25 cm), high flowing concrete (concrete showing a slump value of not less than 25 cm and a slump flow value of 50 to 70 cm), self-filling concrete and self-leveling materials.

The cement admixture of the present invention may be used in combination with one or two or more conventional cement dispersants. Suited for combined use as the conventional cement dispersant is a sulfonic acid type dispersant (S) containing a sulfonic acid group in the molecule. By using the sulfonic acid type dispersant (S) containing a sulfonic acid group in the molecule in combination, a cement admixture showing a stable dispersing ability not depending on a cement brand or lot number, can be obtained. The sulfonic acid type dispersant (S) exhibits dispersing ability for cement due to the mainly sulfonic acid group-induced electrostatic repulsion. Various conventional sulfonic acid type dispersant may be used but a compound containing an aromatic group in the molecule is preferred. Specifically, there may be mentioned (poly)alkyl aryl sulfonic acid salt such as naphthalenesulfonic acid-formaldehyde condensate, methylnaphthalenesulfonic acid-formaldehyde condensate, and anthracenesulfonic acid-formaldehyde condensate; melamine formalin resin sulfonic acid salt such as melamine sulfonic acid-formaldehyde condensate; aromatic aminosulfonic acid salt such as aminoarylsulfonic acid-phenol-formaldehyde condensate; ligninsulfonic acid salt such as ligninsulfonic acid salt and modified ligninsulfonic acid salt; polystyrenesulfonic acid salt, and like sulfonic acid dispersant. When the water/cement ratio in concrete is high, ligninsulfonic acid salt dispersant is preferably used. On the other hand, when the water/cement ratio in concrete is at middle level, required to have higher dispersion ability, the dispersant such as (poly)alkyl aryl sulfonic acid salt, melamine formalin resin sulfonic acid salt, aromatic aminosulfonic acid salt or polystyrenesulfonic acid salt dispersants are preferably used. Further, two or more sulfonic acid dispersants (S) containing a sulfonic acid group in the molecule may be used in combination.

The cement admixture of the present invention may preferably contain an oxycarboxylic acid compound (K). Therefore, the cement additive can demonstrate more excellent dispersion relating ability even under high temperature. Suitable as the oxycarboxylic acid compound (K) used in the present invention are preferably oxycarboxylic acid or its salt containing 4 to 10 carbon atoms, for example, gluconic acid, glucoheptonic acid, arabonic acid, malic acid, citric acid, and inorganic or organic salts thereof such as sodium, potassium, calcium, magnesium, ammonium and triethanolammonium salt, and one or two or more of these can be used. Among them, gluconic acid or its salt is preferably used. The oxycarboxylic acid compound (K) may be used singly or two or more of them may be used in combination. In particular, when using the concrete with poor mixture, ligninsulfonic acid salt dispersant as the sulfonic acid type dispersant (S), and gluconic acid or its salt as the oxycarboxylic acid compound (K) are preferably used.

In the case of using the cement admixture of the present invention and the sulfonic acid type dispersant (S) in combination, the ratio of the total amount of the copolymer (A) and the polymer (C) having an oxyalkylene group or a polyoxyalkylene group and a carboxyl group in the cement admixture, and the sulfonic acid type dispersant (S), namely ((the copolymer (A)+the polymer (C))/the sulfonic acid type dispersant (S)) (% by mass) on the basis of solid content, is preferably 1 to 99/99 to 1, more preferably 5 to 95/95 to 5, still more preferably 10 to 90/90 to 10, particular preferably 20 to 80/80 to 20. In the case of using the cement admixture of the present invention and the oxycarboxylic acid compound (K) in combination, the ratio of the total amount of the copolymer (A) and the polymer (C) having an oxyalkylene group or a polyoxyalkylene group and a carboxyl group in the cement admixture, and the oxycarboxylic acid compound (K), namely ((the copolymer (A)+the polymer (C))/the oxycarboxylic acid compound (K)) (% by mass) on the basis of solid content, is preferably 1 to 99/99 to 1, more preferably 5 to 95/95 to 5, still more preferably 10 to 90/90 to 10, particular preferably 20 to 80/80 to 20. Further, in the case of using the three components of the cement admixture of the present invention, the sulfonic acid type dispersant (S) and the oxycarboxylic acid compound (K), in combination, the ratio of the total amount of the copolymer (A) and the polymer (C) having an oxyalkylene group or a polyoxyalkylene group and a carboxyl group in the cement admixture, the sulfonic acid type dispersant (S) and the oxycarboxylic acid compound (K), namely ((the copolymer (A)+the polymer (C))/the sulfonic acid type dispersant(S)/the oxycarboxylic acid compound (K)) (% by mass) on the basis of solid content, is preferably 1 to 98/1 to 98/1 to 98, more preferably 5 to 90/5 to 90/5 to 90, still more preferably 10 to 90/5 to 85/5 to 85, particular preferably 20 to 80/10 to 70/10 to 70.

The cement composition may further comprise one or more of other known cement additives (ingredients) such as listed below under (1) to (12):

(1) Water-soluble polymeric substance: unsaturated carboxylic acid polymer such as polyacrylic acid (sodium salt) polymethacrylic acid (sodium salt), polymaleic acid (sodium salt), and acrylic acid-maleic acid copolymer sodium salt; nonionic cellulose ether such as methylcellulose, ethylcellulose, hydroxymethylcellulose, hydroxyethylcellulose, carboxymethylcellulose, carboxyethylcellulose and hydroxypropylcellulose; polysaccharide derivative derived from alkylated or hydroxyalkylated derivative of polysaccharide, such as methylcellulose, ethylcellulose, hydroxyethylcellulose and hydroxypropylcellulose, by substitution of a part or all of hydroxyl hydrogen atoms with a hydrophobic substituent comprising a hydrocarbon chain containing 8 to 40 carbon atoms as a partial structure and an ionic hydrophilic substituent containing a sulfonic acid group or a salt thereof as a partial structure; yeast glucan, xanthan gum, â-1,3-glucan (linear or branched, e.g. curdlan, paramylon, pachyman, scleroglucan, rhamnalan) and like polysaccharides produced by microbial fermentation; polyacrylamide; polyvinyl alcohol; starch; starch phosphoric acid ester; sodium alginate; gelatin; amino-containing acrylic acid copolymer and quaternization product derived therefrom.

(2) Polymer emulsion: copolymer of various vinyl monomer such as alkyl(meth)acrylate.

(3) Setting Retarder other than the oxycarboxylic acid compound (K): monosaccharide such as glucose, fructose, galactose, saccharose, xylose, apiose, ribose and invert sugar, oligosaccharide such as disaccharide and trisaccharide, such oligosaccharideasdextrin, polysaccharidesuchasdextran, and other saccharide such as molasse containing these; sugar alcohol such as sorbitol; magnesium silicofluoride; phosphoric acid and salt thereof, or borate ester; aminocarboxylic acid and salt thereof; alkalisoluble protein; humic acid; tannic acid; phenol; polyhydric alcohol such as glycerol; phosphonic acid and derivative thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid), and alkali metal or alkaline earth metal salt thereof, etc.

(4) High-early-strength agent/accelerator: soluble calcium salt such as calcium chloride, calcium nitrite, calcium nitrate, calcium bromide and calcium iodide; chloride such as iron chloride and magnesium chloride; sulfate salt; potassium hydroxide; sodium hydroxide; carbonate salt; thiosulfate salt; formic acid and formate salt such as calcium formate; alkanolamine; alumina cement; calcium aluminosilicate, etc.

(5) Oxyalkylene antifoaming agent (6) antifoaming agent other than Oxyalkylene antifoaming agent: mineral oil-based antifoaming agent such as kerosene, liquid paraffin; fat- or oil-based antifoaming agent such as animal or vegetable oil, sesame oil, castor oil, alkylene oxide adduct derived therefrom; fatty acid-based antifoaming agent such as oleic acid, stearic acid, and alkylene oxide adduct derived therefrom; fatty acid ester-based antifoaming agent such as glycerol monoricinolate, alkenylsuccinic acid derivative, sorbitol monolaurate, sorbitol trioleate, natural wax; alcohol antifoaming agent such as octyl alcohol, hexadecyl alcohol, acetylene alcohol, glycol; amide antifoaming agent such as acrylate polyamine; phosphate ester antifoaming agent such as tributyl phosphate, sodium octylphosphate; metal salt antifoaming agent such as aluminum stearate, calcium oleate; silicone antifoaming agent such as diemthylsilicone oil, silicone paste, silicone emulsion, organic group-modified polysiloxane (organosiloxane such as dimethylpolysiloxane), fluorosilicone oil, etc.

(7) Air-entraining (AE) agent: resin soap, saturated or unsaturated fatty acid, sodium hydroxystearate, lauryl sulfate, ABS (alkylbenzenesulfonate), LAS (linear alkylbenzenesulfonate), alkanesulfonate, polyoxyethylene alkyl(phenyl) ether, polyoxyethylene alkyl(phenyl) ether sulfate ester or salt thereof, polyoxyethylene alkyl(phenyl) ether phosphate ester or salt thereof, proteinic material, alkenylsulfosuccinate, á-olefinsulfonate, etc.

(8) Other surfactant: polyalkylene oxide derivative derived from aliphatic monohydric alcohol containing 6to 30 carbon atoms within the molecule, such as octadecyl alcohol and stearyl alcohol, alicyclic monohydric alcohol containing 6 to 30 carbon atoms within the molecule, such as abietyl alcohol, monofunctional mercaptan containing 6 to 30 carbon atoms within the molecule, such as dodecylmercaptan, alkylphenols containing 6 to 30 carbon atoms within the molecule, such as nonylphenol, amine containing 6 to 30 carbon atoms within the molecule, such as dodecylamine, or carboxylic acid containing 6 to 30 carbon atoms within the molecule, such as lauric acid and stearic acid, by addition of not less than 10 moles of an alkylene oxide such as ethylene oxide and/or propylene oxide; alkyldiphenyl ether sulfonic acid salt in which two sulfo-containing phenyl groups, which may optionally have an alkyl group or alkoxy group as a substituent, is bonded via ether bonding; various anionic surfactant; various cationic surfactant such as alkylamine acetate and alkyltrimethylammonium chloride; various nonionic surfactant; various amphoteric surfactant, etc.

(9) Waterproofing agent: fatty acid (salt), fatty acid ester, fat and oil, silicone, paraffin, asphalt, wax, etc.

(10) Corrosion inhibitor: nitrite salt, phosphate salt, zinc oxide, etc.

(11) Cracking reducing agent: polyoxyalkyl ether etc.

(12) Expansive additive: ettringite, coal-derived, etc.

As other conventional cement additive (ingredient), it may be mentioned cement wetting agent, thickening agent, segregation reducing agent, flocculant, drying shrinkage reducing agent, strength increasing agent, self-leveling agent, colorant, antifungal agent and so on. It is also possible to combinedly use a plurality of the cement additives (constituents) mentioned above.

The following combinations (1) to (4) of constituents other than cement and water in the above cement composition may be mentioned as particularly preferred embodiments:

(1) Combination of <1> a cement admixture of the present invention and <2> an oxyalkylene antifoaming agent as two essential constituents. Use able as the oxyalkylene antifoaming agent are polyoxyalkylene, polyoxyalkylene alkyl ether, polyoxyalkylene acetyl ether and polyoxyalkylene alkyl amine. Among them, polyoxyalkylene alkyl amine is particularly preferred. The proportion of the oxyalkylene antifoaming agent <2> is preferably 0.01 to 20% by mass relative to the cement admixture <1>.

(2) Combination of <1> a cement admixture of the present invention and <2> a material segregation reducing agent as two essential constituents. Usable as the material separation reducing agent are various thickening agents such as nonionic cellulose ether, and compound containing, as partial structure, a hydrophobic substituent comprising a hydrocarbon chain containing 4 to 30 carbon atoms and a polyoxyalkylene chain resulting from addition of 2 to 300 moles, on average, of an alkylene oxide(s) containing 2 to 18 carbon atoms, among others. The mixing ratio, by mass, between the cement admixture <1> and material segregation reducing agent <2> is preferably 10/90 to 99.99/0.01, more preferably 50/50 to 99.9/0.1. A cement composition containing this combination is suited for use as high flowing concrete, self-filling concrete and self-leveling composition.

(3) Combination of <1> a cement admixture of the present invention and <2> an accelerator two essential constituents. Usable as the accelerator are soluble calcium salt such as calcium chloride, calcium nitrite, calcium nitrate; chloride such as iron chloride and magnesium chloride; thiosulfate salt; formic acid and formate salt such as calcium formate. The mixing ratio, by mass, between the cement admixture <1> and the accelerator <2> is preferably 10/90 to 99.99/0.01, more preferably 20/80 to 99/1.

(4) Combination of <1> a cement admixture of the present invention, <2> an oxyalkylene antifoaming agent, and <3> an air-entraining agent as three essential constituents. Useable as the oxyalkylene antifoaming agent are polyoxyalkylene, polyoxyalkylene alkyl ether, polyoxyalkylene acetyl ether and polyoxyalkylene alkylamine. Among them, polyoxyalkyenealkyl amine is particularly preferred. The proportion of the oxyalkylene antifoaming agent <2> is preferably 0.01 to 20% by mass relative to the cement admixture <1>. The proportion of the air-entraining agent <3> is preferably 0.001 to 2% by mass relative to cement.

Having the above-mentioned constitutions, the cement admixture of the present invention exhibits high dispersing ability and dispersion retaining ability even in a high water reducing ratio range and, also, sufficient viscosity decreasing ability and initial dispersing ability even under a low temperature environment, so that the workability can be improved. In addition, the cement composition containing the cement admixture of the present invention shows excellent fluidity and the problems on the quality control can be solved.

BEST MODE FOR CARRYING OUT THE INVENTION

The present invention is more specifically described below by way of the Examples. It must be noted, however, that the invention is not limited to these Examples alone. In the Examples, "part(s)" means "part (s) by mass" and "%" denotes "% by mass", unless otherwise specified.

In the Production Examples, production amount of the (poly)alkylene glycol obtained as a byproduct at the time of producing the unsaturated polyalkylene glycol ether monomer were determined by the following conditions.

<Determination Conditions of Production Amount of Polyalkylene Glycol>
Apparatus: product of Shimadzu Corp., LC-10
Detector: differential refractometer (RI) detector (HITACHI 3350 RI MONITOR) (product of Hitachi Corp.)
Eluent: species: deionized water
   flow rate: 1.5 ml/min
   Column: species: product of Showa Denko Corp., Shodex GF-310 (4.6×300 mm)
   temperature: 40° C.

In the Production Examples, the conversion of each starting monomer and weight-average molecular weight of copolymer obtained was determined by the following conditions.

<Determination Conditions of Conversion of Starting Monomer>
Apparatus: product of JASCO Corp., Borwin
Detector: differential refractometer (RI) detector (HITACHI 3350 RI MONITOR) (product of Hitachi Corp.)
Eluent: species: acetonitrile/0.1 % deionized water solution of phosphoric acid (50/50% by volume)
   flow rate: 1.0 ml/min
Column: species: product of Tosoh Corp., ODS-120T+ODS-80Ts (each 4.6×250 mm)
   temperature: 40° C.

<Weight-average Molecular Weight Determination Conditions of Copolymer>
Apparatus: Waters LCM1 (product of Waters Corp.)
Detector: differential refractometer (RI) detector (Waters 410) (product of Waters Corp.)
Eluent: species: acetonitrile/0.05 M deionized water solution of sodium acetate (40/60% by volume), adjusted to pH 6.0 with acetic acid
   flow rate: 0.6 ml/min
Column: species: product of Tosoh Corp., TSK-GEL G4000SWXL+G3000SWXL+G2000SWXL+GUARD COLUMN (each 7.8×300 mm, 6.0×40 mm)
   temperature: 40° C.
Calibration curve: polyethylene glycol standards

PRODUCTION EXAMPLE 1

A stainless-made high-pressure reaction vessel equipped with a thermometer, a stirrer, and nitrogen and alkylene oxide inlet tube was charged with 982 parts of methallyl alcohol (2-methyl-2-propene-1-ol) as an unsaturated alcohol and 3.5 parts of sodium hydroxide as a catalyst for addition reaction. Reaction vessel inside was purged with nitrogen with stirring and then heated to 150° C. in a nitrogen atmosphere. Then, under safe pressure, maintaining the temperature at 150° C., 6279 parts of ethylene oxide was introduced to the reaction vessel. The temperature was maintained at 150° C. until the alkylene oxide addition reaction was completed to drive the reaction to completion. The obtained reaction product (hereinafter referred to as "M-1") includes non-polymerizable polyalkylene glycol (polyethylene glycol) having no alkenyl group as a byproduct, and an unsaturated polyalkylene glycol ether monomer (hereinafter referred to as "MAL-10") derived from methallyl alcohol by addition of 10 moles, on average, of ethylene oxide. The production amount of polyethylene glycol was 4.0% by mass relative to the unsaturated polyalkylene glycol ether monomer.

PRODUCTION EXAMPLES 2 TO 6

The same procedure as in Production Example 1 was followed except that the species and used amount of unsaturated alcohol, sodium hydroxide as the catalyst for addition reaction, and alkylene oxide were changed as shown in Table 1, to perform alkylene oxide addition reaction to the unsaturated alcohol, to give reaction products (M-2) to (M-6) which included an unsaturated polyalkylene glycol ether monomer and a non-polymerizable polyalkylene glycol having no alkenyl group. Furthermore, all of alkylene oxide addition reactions were performed at 150° C. The production amount (% by mass) of the non-polymerizable polyalkylene glycol having no alkenyl group as a byproduct relative to the unsaturated polyalkylene glycol ether monomer in obtained reaction product is shown in Table 1.

TABLE 1

| | Abbreviation of Reaction Product | Abbreviation of unsaturated polyalkylene glycol ether monomer | Unsaturated alcohol | | Ethylene oxide | | | Sodium hydroxide | Byproduct polyalkylene glycol (non-polymerizable polyalkylene glycol having no alkenyl group) | |
|---|---|---|---|---|---|---|---|---|---|---|
| | | | Species | Used amount (parts) | Used amount (parts) | Average molar number of addition | | Used amount (parts) | Species | Production amount (%) |
| Produciton Ex. 1 | M-1 | MAL-10 | Methallyl alcohol | 982 | 6279 | 10 | | 3.5 | Polyethylene glycol | 4.0 |
| Produciton Ex. 2 | M-2 | MAL-100 | Methallyl alcohol | 98 | 6390 | 100 | | 3.1 | Polyethylene glycol | 6.4 |
| Produciton Ex. 3 | M-3 | AL-25 | Allyl alcohol | 316 | 6145 | 25 | | 3.1 | Polyethylene glycol | 2.3 |
| Produciton Ex. 4 | M-4 | AL-75 | Allyl alcohol | 105 | 6195 | 75 | | 3.1 | Polyethylene glycol | 3.2 |
| Produciton Ex. 5 | M-5 | MAL-50 | Methallyl alcohol | 196 | 6310 | 50 | | 3.1 | Polyethylene glycol | 5.0 |
| Produciton Ex. 6 | M-6 | AL-50 | Allyl alcohol | 158 | 6154 | 50 | | 3.1 | Polyethylene glycol | 2.5 |

PRODUCTION EXAMPLE 7

Production of Copolymer (A-1)

A glass-made reaction vessel equipped with a thermometer, a stirrer, a dropping funnel, a nitrogen inlet tube, and a reflux condenser was charged with 297.8 parts of deionized water, 416.0 parts of the reaction product (M-1) obtained in Production Example 1 (containing 400 parts of MAL-10 and 16.0 parts of polyethylene glycol), and 103.6 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 1.306 parts of hydrogen peroxide and 24.81 parts of deionized water was added thereto. Then, 28.6 parts of 2-hydroxyethyl acrylate was added dropwise to the reaction vessel over 1 hour, and at the same time, an aqueous solution prepared by dissolving 1.691 parts of erythorbic acid in 32.1 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A-1).

PRODUCTION EXAMPLE 8

Production of Copolymer (A-2)

A glass-made reaction vessel equipped with a thermometer, a stirrer, a dropping funnel, a nitrogen inlet tube, and a reflux condenser was charged with 273.0 parts of deionized water, 425.6 parts of the reaction product (M-2) obtained in Production Example 2 (containing 400 parts of MAL-100 and 25.6 parts of polyethyleneglycol), and 21.8 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.189 parts of hydrogen peroxide and 3.59 parts of deionized water was added thereto. Then, an aqueous solution prepared by dissolving 0.245 parts of L-ascorbic acid in 4.65 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A-2).

PRODUCTION EXAMPLE 9

Production of Copolymer (A-3)

A glass-made reaction vessel equipped with a thermometer, a stirrer, a dropping funnel, a nitrogen inlet tube, and a reflux condenser was charged with 85.4 parts of deionized water, 409.2 parts of the reaction product (M-3) obtained in Production Example 3 (containing 400 parts of AL-25 and 9.2 parts of polyethylene glycol), and 63.4 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 2.720 parts of hydrogen peroxide and 51.68 parts of deionized water was added thereto. Then, 12.5 parts of 2-hydroxyethyl acrylate was added dropwise to the reaction vessel over 1 hour, and at the same time, an aqueous solution prepared by dissolving 3.52 parts of erythorbic acid in 66.9 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A-3).

PRODUCTION EXAMPLE 10

Production of Copolymer (A-4)

A glass-made reaction vessel equipped with a thermometer, a stirrer, a dropping funnel, a nitrogen inlet tube, and a reflux condenser was charged with 140.3 parts of deionized water, 412.8 parts of the reaction product (M-4) obtained in Production Example 4 (containing 400 parts of AL-75 and 12.8 parts of polyethylene glycol), and 28.7 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.997 parts of hydrogen peroxide and 18.93 parts of deionized water was added thereto. Then, an aqueous solution prepared by dissolving 1.291 parts of L-ascorbic acid in 24.52 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A-4).

PRODUCTION EXAMPLE 11

Production of Copolymer (A-5)

A glass-made reaction vessel equipped with a thermometer, a stirrer, a dropping funnel, a nitrogen inlet tube, and a reflux condenser was charged with 278.5 parts of deionized water, 420 parts of the reaction product (M-5) obtained in Production Example 5 (containing 400 parts of MAL-50 and 20 parts of polyethylene glycol), and 41.4parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.363 parts of hydrogen peroxide and 6.89 parts of deionized water was added thereto. Then, an aqueous solution prepared by dissolving 0.470 parts of L-ascorbic acid in 8.92 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A-5).

PRODUCTION EXAMPLE 12

Production of Copolymer (A-6)

A glass-made reaction vessel equipped with a thermometer, a stirrer, a dropping funnel, a nitrogen inlet tube, and a reflux condenser was charged with 285.1 parts of deionized water, 420 parts of the reaction product (M-5) obtained in Production Example 5 (containing 400 parts of MAL-50 and 20 parts of polyethylene glycol), and 34.1 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.458 parts of hydrogen peroxide and 8.70 parts of deionized water was added thereto. Then, 23.5 parts of 2-hydroxyethyl acrylate was added dropwise to the reaction vessel over 1 hour, and at the same time, an aqueous solution prepared by dissolving 0.593 parts of L-ascorbic acid in 11.26 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A-6).

PRODUCTION EXAMPLE 13

Production of Copolymer (A-7)

A glass-made reaction vessel equipped with a thermometer, a stirrer, a dropping funnel, a nitrogen inlet tube, and a reflux condenser was charged with 125.8 parts of deionized water, 410 parts of the reaction product (M-6) obtained in Production Example 6 (containing 400 parts of AL-50 and 10 parts of polyethyleneglycol), and 41.4 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 1.453 parts of hydrogen peroxide and 27.61 parts of deionized water was added thereto. Then, an aqueous solution prepared by dissolving 1.882 parts of L-ascorbic acid in 35.76 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A-7).

PRODUCTION EXAMPLE 14

Production of Copolymer (A-8)

A glass-made reaction vessel equipped with a thermometer, a stirrer, a dropping funnel, a nitrogen inlet tube, and a reflux condenser was charged with 116.2 parts of deionized water, 410 parts of the reaction product (M-6) obtained in Production Example 6 (containing 400 parts of AL-50 and 10 parts of polyethylene glycol), and 34.1 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 1.834 parts of hydrogen peroxide and 34.84 parts of deionized water was added thereto. Then, 23.5 parts of 2-hydroxyethyl acrylate was added dropwise to the reaction vessel over 1 hour, and at the same time, an aqueous solution prepared by dissolving 2.375 parts of L-ascorbic acid in 45.12 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A-8).

PRODUCTION EXAMPLE 15

Production of Polymer (D-1)

A glass-made reaction vessel equipped with a thermometer, a stirrer, a dropping funnel, a nitrogen inlet tube, and a reflux condenser was charged with 1698 parts of deionized water, the reaction vessel inside was purged with nitrogen with stirring, and then heated to 80° C. in a nitrogen atmosphere. Then, an aqueous solution of a monomer mixture was prepared by mixing 1848 parts of methoxypolyethylene glycol monomethacrylate (the average molar number of addition of the ethyleneoxide is 25), 152 parts of methacrylic acid, 500 parts of deionized water and further uniformly admixing therewith 11.9 parts of 3-mercaptopropionic acid as a chain transfer agent. This aqueous monomer mixture solution and 184 parts of a 10% aqueous solution of ammonium persulfate were respectively added dropwise over 4 hours. After completion of the dropping, 46 parts of a 10% aqueous solution of ammonium persulfate was further added dropwise over 1 hour. Thereafter, the temperature was further maintained at 80° C. for 1 hour to drive the polymerization reaction to completion. The reaction mixture was then neutralized to pH 7 with an aqueous solution of sodium hydroxide at a temperature not higher than the polymerization reaction temperature to give an aqueous solution containing Polymer (D-1).

PRODUCTION EXAMPLE 16

Production of Polymer (D-2)

A glass-made reaction vessel equipped with a thermometer, a stirrer, a dropping funnel, a nitrogen inlet tube, and a reflux condenser was charged with 1698 parts of deionized water, the reaction vessel inside was purged with nitrogen with stirring, and then heated to 80° C. in a nitrogen atmosphere. Then, an aqueous solution of a monomer mixture was prepared by mixing 1668 parts of methoxypolyethylene glycol monomethacrylate (the average molar number of addition of the ethyleneoxide is 25), 332 parts of methacrylic acid, 500 parts of deionized water and further uniformly admixing therewith 16.7 parts of 3-mercaptopropionic acid as a chain transfer agent. This aqueous monomer mixture solution and 184 parts of a 10% aqueous solution of ammonium persulfate were respectively added dropwise over 4 hours. After completion of the dropping, 46 parts of a 10% aqueous solution of ammonium persulfate was further added dropwise over 1 hour. Thereafter, the temperature was further maintained at 80° C. for 1 hour to drive the polymerization reaction to completion. The reaction mixture was then neutralized to pH 7 with an aqueous solution of sodium hydroxide at a temperature not higher than the polymerization reaction temperature to give an aqueous solution containing Polymer (D-2).

PRODUCTION EXAMPLE 17

Production of Polymer (E-1)

A glass-made reaction vessel equipped with a thermometer, a stirrer, a dropping funnel, a nitrogen inlet tube, and a reflux condenser was charged with 1291 parts of deionized water, 1812 parts of unsaturated polyalkylene glycol ether derived from 3-methyl-3-buten-1-ol by addition of 50 moles, on average, of ethylene oxide, and 188 parts of maleic acid, the reaction vessel inside was purged with nitrogen with stirring, and then heated to 60° C. in a nitrogen atmosphere. Then, 50 parts of a 15% aqueous solution of NC-32W (product of Nippo Kagaku Corp., 2,2'-azobis-2-methylpropionamidine hydrochloride, purity 87%) was added, and the temperature was maintained at 60° C. for 7 hours and then raised to 80° C. and stirring was then continued for 1 hour, and thereafter the polymerization reaction was finished. The reaction mixture was then neutralized to pH 7 with an aqueous solution of sodium hydroxide at a temperature not higher than the polymerization reaction temperature to give an aqueous solution containing Polymer (E-1).

PRODUCTION EXAMPLE 18

Production of Comparative Copolymer (CA-1)

A glass-made reaction vessel equipped with a thermometer, a stirrer, a dropping funnel, a nitrogen inlet tube, and a reflux condenser was charged with 276.4 parts of deionized water, and 425.6 parts of the reaction product (M-2) obtained in Production Example 2 (containing 400 parts of MAL-100 and 25.6 parts of polyethylene glycol), the reaction vessel inside was purged with nitrogen with stirring, and then heated to 65° C. in a nitrogen atmosphere. Maintaining the temperature in the vessel at 65° C., an aqueous hydrogen peroxide solution composed of 0.474 parts of hydrogen peroxide and 9.01 parts of deionized water was added thereto. Then, 43.8 parts of acrylic acid was added dropwise to the reaction vessel over 3 hours, and at the same time, an aqueous solution prepared by dissolving 0.614 parts of L-ascorbic acid and 1.851 parts of 3-mercaptopropionic acid in 11.67 parts of deionized water was added dropwise over 3.5 hours. Thereafter, the temperature was further maintained at 65° C. for 1 hour, and thereafter the polymerization reaction was finished. The reaction mixture was then neutralized to pH 7 with an aqueous solution of sodium hydroxide at a temperature not higher than the polymerization reaction temperature to give an aqueous solution containing Comparative copolymer (CA-1), which is equivalent to Polymer (A-5) according to Production Example 23 of WO02/096823.

PRODUCTION EXAMPLE 19

Production of Comparative Copolymer (CA-2)

A glass-made reaction vessel equipped with a thermometer, a stirrer, a dropping funnel, a nitrogen inlet tube, and a reflux condenser was charged with 268.6 parts of deionized water, and 425.6 parts of the reaction product (M-2) obtained in Production Example 2 (containing 400 parts of MAL-100 and 25.6 parts of polyethylene glycol), the reaction vessel inside was purged with nitrogen with stirring, and then heated to 65° C. in a nitrogen atmosphere. Maintaining the temperature in the vessel at 65° C., an aqueous hydrogen peroxide solution composed of 0.213 parts of hydrogen peroxide and 4.05 parts of deionized water was added thereto. Then, 16.1 parts of acrylic acid was added dropwise to the reaction vessel over 3 hours, and at the same time, an aqueous solution prepared by dissolving 0.276 parts of L-ascorbic acid and 0.665 parts of 3-mercaptopropionic acid in 5.24 parts of deionized water was added dropwise over 3.5 hours. Thereafter, the temperature was further maintained at 65° C. for 1 hour, and thereafter the polymerization reaction was finished. The reaction mixture was then neutralized to pH 7 with an aqueous solution of sodium hydroxide at a temperature not higher than the polymerization reaction temperature to give an aqueous solution containing Comparative copolymer (CA-2), which is equivalent to Polymer (A-8) according to Production Example 26 of WO02/096823.

PRODUCTION EXAMPLE 20

Production of Copolymer (A3-1)

A glass-made reaction vessel equipped with a thermometer, a stirrer, a dropping funnel, a nitrogen inlet tube, and a reflux condenser was charged with 281.5 parts of deionized water, 99.8 parts of the reaction product (M-1) obtained in Production Example 1 (containing 96.0 parts of MAL-10 and 3.8 parts of polyethylene glycol), 319.2 parts of the reaction product (M-2) obtained in Production Example 2 (containing 300 parts of MAL-100 and 19.2 parts of polyethylene glycol), and 60.9 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.530 parts of hydrogen peroxide and 10.07 parts of deionized water was added thereto. Then, an aqueous solution prepared by dissolving 0.687 parts of erythorbic acid in 13.04 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A3-1).

PRODUCTION EXAMPLE 21

Production of Copolymer (A3-2)

A glass-made reaction vessel equipped with a thermometer, a stirrer, a dropping funnel, a nitrogen inlet tube, and a reflux condenser was charged with 322.4parts of deionized water, 156.0 parts of the reaction product (M-1) obtained in Production Example 1 (containing 150.0 parts of MAL-10 and 6.0 parts of polyethylene glycol), 319.2 parts of the reaction product (M-2) obtained in Production Example 2 (containing 300 parts of MAL-100 and 19.2 parts of polyethylene glycol), and 69.2 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.822 parts of hydrogen peroxide and 15.62 parts of deionized water was added thereto. Then, 18.2parts of acrylic acid was added dropwise to other reaction vessel over 1 hour, and at the same time, an aqueous solution prepared by dissolving 1.065 parts of L-ascorbic acid in 20.23 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A3-2).

PRODUCTION EXAMPLE 22

Production of Copolymer (A3-3)

A glass-made reaction vessel equipped with a thermometer, a stirrer, a dropping funnel, a nitrogen inlet tube, and a reflux condenser was charged with 333.8 parts of deionized water, 178.3 parts of the reaction product (M-1) obtained in Production Example 1 (containing 171.4 parts of MAL-10 and 6.9 parts of polyethylene glycol), 319.2 parts of the reaction product (M-2) obtained in Production Example 2 (containing 300 parts of MAL-100 and 19.2 parts of polyethylene glycol), and 62.1 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.721 parts of hydrogen peroxide and 13.71 parts of deionized water was added thereto. Then, 14.3 parts of 2-hydroxyethyl acrylate was added dropwise to the reaction vessel over 1 hour, and at the same time, an aqueous solution prepared by dissolving 0.934 parts of erythorbic acid in 17.75 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A3-3).

PRODUCTION EXAMPLE 23

Production of Copolymer (A3-4)

A glass-made reaction vessel equipped with a thermometer, a stirrer, a dropping funnel, a nitrogen inlet tube, and a reflux condenser was charged with 154.4 parts of deionized water, 89.1 parts of the reaction product (M-3) obtained in Production Example 3 (containing 85.7 parts of AL-25 and 3.4 parts of polyethylene glycol), 319.2 parts of the reaction product (M-2) obtained in Production Example 2 (containing 300 parts of MAL-100 and 19.2 parts of polyethylene glycol), and 31.1 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.556 parts of hydrogen peroxide and 10.57 parts of deionized water was added thereto. Then, an aqueous solution prepared by dissolving 0.720 parts of erythorbic acid in 13.69 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A3-4).

PRODUCTION EXAMPLE 24

Production of Copolymer (A3-5)

A glass-made reaction vessel equipped with a thermometer, a stirrer, a dropping funnel, a nitrogen inlet tube, and a reflux condenser was charged with 201.2 parts of deionized water, 167.4 parts of the reaction product (M-3) obtained in Production Example 3 (containing 163.6 parts of AL-25 and 3.8 parts of polyethylene glycol), 309.6 parts of the reaction product (M-4) obtained in Production Example 4 (containing 300 parts of AL-75 and 9.6 parts of polyethylene glycol), and 59.3 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 2.018 parts of hydrogen peroxide and 8.07 parts of deionized water was added thereto. Then, an aqueous solution prepared by dissolving 2.614 parts of L-ascorbic acid in 14.81 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A3-5).

PRODUCTION EXAMPLE 25

Production of Copolymer (A-9)

A glass-made reaction vessel equipped with a thermometer, a stirrer, a dropping funnel, a nitrogen inlet tube, and a reflux condenser was charged with 242.2 parts of deionized water, 312.0 parts of the reaction product (M-1) obtained in Production Example 1 (containing 300.0 parts of MAL-10 and 12.0 parts of polyethylene glycol), and 145.0 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 1.248 parts of hydrogen peroxide and 23.72 parts of deionized water was added thereto. Then, an aqueous solution prepared by dissolving 1.617 parts of erythorbic acid in 30.72 parts of deionized water was added dropwise over 1 hour. Thereafter, the temperature was further maintained at 65° C. for 1 hour, and thereafter the polymerization reaction was finished. The polymerizable component concentration (%by mass concentration of all monomer components relative to all raw materials) was 60%. The reaction mixture was then neutralized to pH 7 with an aqueous solution of sodium hydroxide at a temperature not higher than the polymerization reaction temperature to give an aqueous solution containing Copolymer (A-9).

PRODUCTION EXAMPLE 26

Production of Copolymer (A-10)

A glass-made reaction vessel equipped with a thermometer, a stirrer, a dropping funnel, a nitrogen inlet tube, and a reflux condenser was charged with 131.2 parts of deionized water, 306.9 parts of the reaction product (M-3) obtained in Production Example 3 (containing 300.0 parts of AL-25 and 6.9 parts of polyethylene glycol), and 65.0parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 2.228 parts of hydrogen peroxide and 8.91 parts of deionized water was added thereto. Then, an aqueous solution prepared by dissolving 2.886 parts of L-ascorbic acid in 16.35 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give an aqueous solution containing Copolymer (A-10).

In each Production Example, the conversion (%) of each starting monomer, and analysis result of the (co)polymer contained in the aqueous (co)polymer solution obtained, namely the composition ratio of (co) polymer (% by mass), amount of the constituent unit derived from unsaturated (poly)alkylene glycol ether monomer (mole %), the carboxylic acid content (meq/g) on the basis of the unneutralized (co)polymer, weight-average molecular weight, the content of unsaturated polyalkylene glycol ether monomer (a) relative to the neutralized (co)polymer (% by mass), and the content of non-polymerizable (poly)alkylene glycol (B) having no alkenyl group relative to the neutralized (co) polymer (% by mass) are shown in Table 2.

As the same, in each Production Example, the conversion (%) of each startingmonomer, and analysis result of the copolymer contained in the aqueous copolymer solution obtained, namely the composition ratio of copolymer (% by mass), total amount of the constituent unit derived from unsaturated (poly)alkylene glycol ether monomers (monomer (a1) and (a2)) (mole %), the carboxylic acid content (meq/g) on the basis of the unneutralized copolymer, weight-average molecular weight, the total content of the unsaturated (poly)alkylene glycol ether monomer (a1) and the unsaturated polyalkylene glycol ether monomer (a2) relative to the neutralized copolymer (% by mass), and the content of non-polymerizable (poly)alkylene glycol (B) having no alkenyl group relative to the neutralized copolymer (% by mass) are shown in Table 3.

TABLE 2

|  | Copolymer (Polymer) | Conversion (%) of each starting monomer AO monomer/MA/ other | Composition ratio of copolymer (% by mass) AO monomer/MA/ other | Amount of constituent unit derived from AO monomer (mole %) | Carboxylic acid content (meq/g) on the basis of unneutralized copolymer | Weight average molecular weight | AO monomer content (%) *1 | Polyalkylene glycol (B) content (%) *2 |
|---|---|---|---|---|---|---|---|---|
| Produciton Ex. 7 | Copolymer(A-1) | 89.5/89.7/HEA 98.4 | 74.7/19.4/HEA 5.9 | 40.1 | 3.34 | 16500 | 8.2 | 3.1 |
| Produciton Ex. 8 | Copolymer(A-2) | 80.7/77.0/0.0 | 95.0/5.0/0.0 | 33.3 | 0.85 | 34800 | 22.3 | 7.4 |
| Produciton Ex. 9 | Copolymer(A-3) | 70.0/69.0/HEA 97.8 | 83.3/13.0/HEA 3.7 | 33.4 | 2.25 | 15300 | 34.0 | 2.6 |
| Produciton Ex. 10 | Copolymer(A-4) | 61.0/59/0/0.0 | 93.5/6.5/0.0 | 33.3 | 1.12 | 23500 | 58.4 | 4.8 |
| Produciton Ex. 11 | Copolymer(A-5) | 89.2/87.2/0.0 | 90.8/9.2/0.0 | 33.5 | 1.59 | 30500 | 10.6 | 4.9 |
| Produciton Ex. 12 | Copolymer(A-6) | 90.8/90.5/HEA 98.5 | 87.0/7.4/HEA 5.6 | 25.5 | 1.28 | 33000 | 8.6 | 4.7 |
| Produciton Ex. 13 | Copolymer(A-7) | 65.0/64.5/0.0 | 90.7/9.3/0.0 | 33.3 | 1.61 | 22000 | 47.2 | 3.4 |
| Produciton Ex. 14 | Copolymer(A-8) | 68.0/67.0/HEA 98.0 | 85.6/7.2/HEA 7.2 | 23.3 | 1.24 | 25500 | 39.2 | 3.1 |
| Produciton Ex. 15 | Polymer (D-1) | 100.0/0.0/MAA 100.0 | 92.4/0.0/MAA 7.6 | — | 0.89 | 31000 | — | — |
| Produciton Ex. 16 | Polymer (D-2) | 100.0/0.0/MAA 100.0 | 83.4/0.0/MAA 16.6 | — | 1.93 | 24000 | — | — |
| Produciton Ex. 17 | Polymer (E-1) | 90.0/90.1/0.0 | 90.6/9.4/0.0 | 32.7 | 1.62 | 27000 | — | — |
| Produciton Ex. 18 | Comparative Copolymer (CA-1) | 94.3/0.0/AA 96.8 | 89.9/0.0/AA 10.1 | 12.5 | 1.40 | 54000 | 5.3 | 5.9 |
| Produciton Ex. 19 | Comparative Copolymer (CA-2) | 80.2/0.0/AA 94.0 | 95.5/0.0/AA 4.5 | 25.4 | 0.63 | 48000 | 23.3 | 7.5 | note:
Each of "*1" and "*2" means the content (% by mass) of each compound relative to the neutralized copolymer.

TABLE 3

|  | Copolymer | Conversion (%) of each starting monomer AO monomer 1/AO monomer 2/MA/ other | Composition ratio of copolymer (% by mass) AO monomer 1/AO monomer 2/MA/ other | Total amount of constituent unit derived from AO monomer (mole %) | Carboxylic acid content (meq/g) on the basis of unneutralized copolymer | Weight average molecular weight | AO monomer content (%) *1 | Polyalkylene glycol (B) content (%) *2 |
|---|---|---|---|---|---|---|---|---|
| Produciton Ex. 20 | Copolymer (A3-1) | 91.5/81.0/89.6/0.0 | 22.8/63.0/14.2/0.0 | 32.4 | 2.44 | 30500 | 16.1 | 5.7 |
| Produciton Ex. 21 | Copolymer (A3-2) | 94.6/89.5/92.0/ AA 98.0 | 29.8/56.4/9.5/ AA 4.3 | 33.3 | 2.24 | 34500 | 7.9 | 5.0 |
| Produciton Ex. 22 | Copolymer (A3-3) | 89.5/80.2/90.5/ HEA 98.5 | 33.1/51.8/12.1/ HEA 3.0 | 36.8 | 2.09 | 31000 | 15.9 | 5.4 |
| Produciton Ex. 23 | Copolymer (A3-4) | 76.0/85.5/88.0/0.0 | 18.7/73.5/7.8/0.0 | 32.5 | 1.35 | 29000 | 17.8 | 5.9 |
| Produciton Ex. 24 | Copolymer (A3-5) | 71.5/63.0/64.3/0.0 | 34.0/54.9/11.1/0.0 | 32.4 | 1.91 | 26300 | 44.0 | 3.7 |
| Produciton Ex. 25 | Copolymer (A-9) | 92.5/0.0/87.3/0.0 | 68.7/0.0/31.3/0.0 | 33.2 | 5.40 | 17300 | 5.0 | 2.7 |
| Produciton Ex. 26 | Copolymer (A-10) | 72.2/0.0/66.6/0.0 | 83.3/0.0/16.7/0.0 | 33.4 | 2.87 | 15800 | 30.2 | 2.5 | note:
Each of "*1" and "*2" means the content (% by mass) of each compound relative to the neutralized copolymer.

The descriptions in Table 2 and 3 are as follows.

AO monomer : in the case of copolymer (A) or comparative copolymer (CA), the unsaturated polyalkylene glycol ether monomer; in the case of polymer (D), the (poly)alkylene glycol mono(meth)acrylic acid ester monomer (d); in the case of polymer (E), the unsaturated (poly)alkylene glycol ether monomer(f)

AO monomer 1: the unsaturated polyalkylene glycol ether monomer (a1)

AO monomer 2: the unsaturated polyalkylene glycol ether monomer (a2)

MA: maleic acid

AA: acrylic acid

HEA: 2-hydroxyethyl acrylate

EXAMPLES 1 TO 14 AND COMPARATIVE EXAMPLES 1 TO 16

<Concrete Test>

Each concrete composition was prepared as follows. In addition, in order to make temperature of the concrete composition to test temperature, 15° C., the temperature of raw materials, the revolving-puddle mixer and the measurement equipments used for the test were controlled under the test temperature atmosphere, and mixing and each measurement were performed at the test temperature atmosphere.

At first, 658 kg/m$^3$ of a fine aggregate (land sand originated in Ohigawa river sand) was mixed for 10 seconds by a forced pan type mixer of 50 L capacity and, then, 580 kg/m$^3$ of cement (produced by Taiheiyo Cement, ordinaly portland cement) was added and mixed again for 10 seconds.

After that, 174 kg/m³ of tap water containing a cement admixture in a proper amount to adjust the initial slump flow value to be 600±50 mm was added and mixed for 150 seconds. Then, 895 kg/m³ of coarse aggregate (crushed stone originated in Oume) was added, and mixing was further performed for 90 seconds to produce each concrete composition. For avoiding the possible influence of bubbles in the concrete composition on the fluidity of the concrete composition, the air content was adjusted to 5.5±0.5% by volume using AE agent ("Binsol W" (trademark, resin soap type, product of Yamaso Chemical Co., Ltd)) and oxyalkylene antifoaming agent ("Surfynol 440" (trademark, acetylene ether derived from acetylene alcohol by addition polymerization of alkylene oxide, product of Nissin Chemical Kogyo Co., Ltd.). In addition, the ratio of water/cement (by mass) was 0.30, the proportion of the fine aggregate (the fine aggregate/(the fine aggregate+the coarse aggregate)) (by volume) was 0.424.

Further, the solid content [nonvolatile component] in each cement admixture was measured by drying an appropriate amount of the cement admixture by heating at 130° C. to remove the volatile matter, and an amount of the admixture was weighed and incorporated in cement so that a predetermined amount of the solid matter component [nonvolatile component] might be contained in the formulation.

The amount of each copolymer (A) (or copolymer (A1)) relative to the cement (% by mass), the amount of each unsaturated polyalkylene glycol ether monomer (a) (or the total amount of monomer (a1) and (a2)) relative to the cement (% by mass), the amount of each non-polymerizable (poly)alkylene glycol (B) having no alkenyl group relative to the cement (% by mass), the amount of each polymer (C) having an oxyalkylene group or a polyoxyalkylene group and a carboxyl group (or copolymer (A2)) relative to the cement (% by mass), the total amount as cement admixture relative to the cement (% by mass), and the amount of each polymer (C) having an oxyalkylene group or a polyoxyalkylene group and a carboxyl group (or copolymer (A2)) relative to the copolymer (A) (or copolymer (A1)) (% by mass) are shown in Table 4.

The amount of each copolymer (A3) (or comparative copolymer (A)) relative to the cement (% by mass), the total amount of each unsaturated (poly)alkylene glycol ether monomer (a1) and unsaturated polyalkylene glycol ether monomer (a2) relative to the cement (% by mass), the amount of each non-polymerizable (poly)alkylene glycol (B) having no alkenyl group relative to the cement (% by mass), and the total amount as cement admixture relative to the cement (% by mass) are shown in Table 5.

Items of the evaluation test and measuring methods thereof are as follows. Results are shown in Table 4 and 5.

1) Change of the slump flow value with the lapse of time: Measured according to JIS (Japanese Industrial Standards)-A-1101. In addition, as the retaining ratio, the ratio (%) of the slump flow value after 120 minutes from the start of mixing relative to that after 5 minutes from the start of mixing are measured.

2) Spreading speed (Test for evaluating effect on viscosity decrease of concrete composition): At the time of measuring the initial slump flow value, the time taken until the flow value reached 500 mm from the time when the slump cone was pulled, and the time was defined as the spreading speed (second). The shorter the time was, the more excellent the viscosity decreasing effect in high share condition was.

3) Air content: Measured according to JIS-A-1128

4) Mixing time: The time taken until the cement composition was mixed uniformly and the change of fluidity came to a standstill seemingly from the time when the tap water containing the cement admixture was added after the cement was added to the fine aggregate and mixing was started, and the time was defined as the mixing time. The shorter the time was, the more excellent the initial dispersing ability was.

TABLE 4

| | Abbreviation of Copolymer (A) or Copolymer (A1) | Abbreviation of Polymer (C) or Copolymer (A2) | Amount of copolymer (A) or (A1) (% by mass)/ cement | Amount of monomer (a) or total amount of (a1) and (a2) (% by mass)/ cement | Amount of polyalkylene glycol (B) (% by mass)/ cement | Amount of polymer (C) or (A2) (% by mass)/ cement |
|---|---|---|---|---|---|---|
| Example 1 | Copolymer(A-1) | Copolymer(A-2) | 0.0719 | 0.0334 | 0.0114 | 0.1233 |
| Example 2 | Copolymer(A-3) | Copolymer(A-4) | 0.0732 | 0.0964 | 0.0078 | 0.1226 |
| Example 3 | Copolymer(A-3) | Copolymer(A-2) | 0.0732 | 0.0524 | 0.0110 | 0.1233 |
| Example 4 | Copolymer(A-1) | Polymer(D-1) | 0.1258 | 0.0103 | 0.0039 | 0.2000 |
| Example 5 | Copolymer(A-3) | Polymer(D-1) | 0.1244 | 0.0423 | 0.0032 | 0.2000 |
| Example 6 | Copolymer(A-2) | Polymer(D-2) | 0.1233 | 0.0275 | 0.0091 | 0.1400 |
| Example 7 | Copolymer(A-4) | Polymer(E-1) | 0.1226 | 0.0715 | 0.0059 | 0.1800 |
| Example 8 | Copolymer(A-5) | Copolymer(A-6) | 0.0866 | 0.0266 | 0.0137 | 0.2031 |
| Example 9 | Copolymer(A-7) | Copolymer(A-8) | 0.0930 | 0.1210 | 0.0092 | 0.1968 |
| Comparative Ex. 1 | Copolymer(A-1) | — | 0.1797 | 0.0147 | 0.0056 | 0.0000 |
| Comparative Ex. 2 | Copolymer(A-2) | — | 0.2467 | 0.0550 | 0.0183 | 0.0000 |
| Comparative Ex. 3 | Copolymer(A-3) | — | 0.1756 | 0.0598 | 0.0046 | 0.0000 |
| Comparative Ex. 4 | Copolymer(A-4) | — | 0.2452 | 0.1431 | 0.0117 | 0.0000 |
| Comparative Ex. 5 | Copolymer(A-5) | — | 0.2164 | 0.0230 | 0.0107 | 0.0000 |
| Comparative Ex. 6 | Copolymer(A-6) | — | 0.3356 | 0.0288 | 0.0157 | 0.0000 |
| Comparative Ex. 7 | Copolymer(A-7) | — | 0.2259 | 0.1065 | 0.0076 | 0.0000 |
| Comparative Ex. 8 | Copolymer(A-8) | — | 0.3234 | 0.1267 | 0.0099 | 0.0000 |
| Comparative Ex. 9 | — | Polymer(D-1) | 0.0000 | 0.0000 | 0.0000 | 0.8000 |
| Comparative Ex. 10 | — | Polymer(D-2) | 0.0000 | 0.0000 | 0.0000 | 0.2000 |
| Comparative Ex. 11 | — | Polymer(E-1) | 0.0000 | 0.0000 | 0.0000 | 0.2500 |
| Comparative Ex. 12 | Comparative Copolymer (CA-1) | Comparative Copolymer (CA-2) | 0.1169 | 0.0524 | 0.0219 | 0.1988 |

TABLE 4-continued

| | Total amount (% by mass) as cement admixture/ cement | Polymer (C) or copolymer (A2) (% by mass)/ copolymer (A) or (A1) | Slump flow value (mm) | | | | Retaining ratio(%) (slump flow value after 120 min/ slump flow value after 5 min) | Spreading speed (sec) |
|---|---|---|---|---|---|---|---|---|
| | | | After 5 min | After 60 min | After 90 min | After 120 min | | |
| Example 1 | 0.240 | 172 | 605 | 580 | 530 | 480 | 79.3 | 10.4 |
| Example 2 | 0.300 | 168 | 590 | 575 | 530 | 450 | 76.3 | 10.8 |
| Example 3 | 0.260 | 169 | 600 | 580 | 540 | 470 | 78.3 | 11.2 |
| Example 4 | 0.340 | 59 | 580 | 575 | 550 | 515 | 88.8 | 12.0 |
| Example 5 | 0.370 | 161 | 585 | 580 | 555 | 525 | 89.7 | 12.5 |
| Example 6 | 0.300 | 114 | 590 | 570 | 540 | 475 | 80.5 | 11.4 |
| Example 7 | 0.380 | 147 | 580 | 570 | 530 | 460 | 79.3 | 11.5 |
| Example 8 | 0.330 | 235 | 600 | 585 | 550 | 530 | 88.3 | 13.2 |
| Example 9 | 0.420 | 212 | 590 | 575 | 535 | 500 | 84.7 | 12.3 |
| Comparative Ex. 1 | 0.200 | — | 640 | 560 | 440 | 290 | 45.3 | 8.3 |
| Comparative Ex. 2 | 0.320 | — | 595 | 580 | 560 | 530 | 89.1 | 14.5 |
| Comparative Ex. 3 | 0.240 | — | 630 | 555 | 445 | 300 | 47.6 | 9.2 |
| Comparative Ex. 4 | 0.400 | — | 580 | 565 | 545 | 510 | 87.9 | 13.6 |
| Comparative Ex. 5 | 0.250 | — | 645 | 570 | 465 | 340 | 52.7 | 13.0 |
| Comparative Ex. 6 | 0.380 | — | 570 | 580 | 570 | 555 | 97.4 | 16.3 |
| Comparative Ex. 7 | 0.340 | — | 635 | 550 | 440 | 295 | 46.5 | 9.8 |
| Comparative Ex. 8 | 0.460 | — | 565 | 575 | 560 | 540 | 95.6 | 16.7 |
| Comparative Ex. 9 | 0.800 | — | 550 | 620 | 610 | 590 | 107.3 | 18.7 |
| Comparative Ex. 10 | 0.200 | — | 620 | 570 | 480 | 350 | 56.5 | 9.8 |
| Comparative Ex. 11 | 0.250 | — | 600 | 575 | 505 | 380 | 63.3 | 10.2 |
| Comparative Ex. 12 | 0.390 | 170 | 610 | 570 | 520 | 450 | 73.8 | 15.4 |

TABLE 5

| | Abbreviation of Copolymer | Amount of copolymer (A3) or (A) (% by mass)/ cement | Total amount of (a1) and (a2) (% by mass)/ cement | Amount of polyalkylene glycol (B) (% by mass)/ cement | Total amount (% by mass) as cement admixture/ cement | Slump flow value (mm) | | | | Retaining ratio(%) (slump flow value after 120 min/ slump flow value after 5 min) | Spreading speed (sec) | Mixing time (sec) |
|---|---|---|---|---|---|---|---|---|---|---|---|---|
| | | | | | | After 5 min | After 60 min | After 90 min | After 120 min | | | |
| Example 10 | Copolymer (A3-1) | 0.2465 | 0.0395 | 0.0140 | 0.300 | 610 | 580 | 540 | 480 | 78.7 | 10.8 | 28 |
| Example 11 | Copolymer (A3-2) | 0.2656 | 0.0210 | 0.0134 | 0.300 | 630 | 595 | 550 | 485 | 77.0 | 10.5 | 25 |
| Example 12 | Copolymer (A3-3) | 0.2473 | 0.0394 | 0.0133 | 0.300 | 595 | 575 | 535 | 475 | 79.8 | 11.3 | 34 |
| Example 13 | Copolymer(A3-4) | 0.2586 | 0.0461 | 0.0152 | 0.320 | 580 | 565 | 530 | 480 | 82.8 | 12.2 | 40 |
| Example 14 | Copolymer(A3-5) | 0.2708 | 0.1191 | 0.0101 | 0.400 | 600 | 560 | 515 | 450 | 75.0 | 12.0 | 38 |
| Comparative Ex. 13 | Copolymer(A-9) | 0.2509 | 0.0125 | 0.0067 | 0.270 | 620 | 360 | 270 | 220 | 35.5 | 8.3 | 15 |
| Comparative Ex. 14 | Copolymer(A-2) | 0.2467 | 0.0550 | 0.0183 | 0.320 | 595 | 580 | 560 | 530 | 89.1 | 14.5 | 50 |
| Comparative Ex. 15 | Copolymer(A-10) | 0.2261 | 0.0683 | 0.0056 | 0.300 | 610 | 430 | 310 | 260 | 42.6 | 9.2 | 22 |
| Comparative Ex. 16 | Copolymer(A-4) | 0.2452 | 0.1431 | 0.0117 | 0.400 | 580 | 565 | 545 | 510 | 87.9 | 13.6 | 45 |

From the results of Table 4, in the case of Comparative Example 1 using the aqueous solution containing Copolymer (A-1) and Comparative Example 3 using the aqueous solution containing Copolymer (A-3), it was found that although the addition amount needed was low and the spreading speed was high, the slump flow value was remarkably changed with the lapse of time. Similarly, in the case of Comparative Example 10 using the aqueous solution containing Polymer (D-2) and Comparative Example 11 using the aqueous solution containing Polymer (E-1), it was found that although the addition amount needed was low and the spreading speed was high, the slump flow value was remarkably changed with the lapse of time. And, in the case of Comparative Example 5 using the aqueous solution containing Copolymer (A-5), it was found that although the addition amount needed was low, the spreading speed was slow and the slump flow value was remarkably changed with the lapse of time. Further, in the case of Comparative Example 7 using the aqueous solution containing Copolymer (A-7), it was found that although the addition amount needed was comparatively low and the spreading speed was high, the slump flow value was remarkably changed with the lapse of time. Meanwhile, in the case of Comparative Example 2 using the aqueous solution containing Copolymer (A-2), Comparative Example 4 using the aqueous solution containing Copolymer (A-4), Comparative Example 6 using the aqueous solution containing Copolymer (A-6), Comparative Example 8 using the aqueous solution containing Copolymer (A-8) and Comparative Example 9 using the aqueous solution containing Polymer (D-1), it was found that although the change of the slump flow value with the lapse of time was slight, the addition amount needed was high and the spreading speed was slow. Further, in the case of Comparative Example 12 using the Copolymer (CA-1) and (CA-2) in combination, which is equivalent to the cement admixture according to WO02/096823, it was found that although the addition amount needed was low and the change of the slump flow value with the lapse of time was slight, the spreading speed was slow.

On the other hand, in any case of using the cement admixtures of the present invention obtained by Example 1 using the aqueous solution containing Copolymer (A-1) and (A-2) in combination, Example 2 using the aqueous solution containing Copolymer (A-3) and (A-4) in combination, Example 3 using the aqueous solution containing Copolymer (A-3) and (A-2) in combination, Example 4 using the aqueous solution containing Copolymer (A-1) and Polymer (D-1) in combination, Example 5 using the aqueous solution containing Copolymer (A-3) and Polymer (D-1) in combination, Example 6 using the aqueous solution containing Copolymer (A-2) and Polymer (D-2) in combination, Example 7 using the aqueous solution containing Copolymer (A-4) and Polymer (E-1) in combination, Example 8 using the aqueous solution containing Copolymer (A-5) and (A-6) in combination, and Example 9 using the aqueous solution containing Copolymer (A-7) and (A-8) in combination, it was found that the addition amount needed was low and sufficient initial dispersing ability was exhibited even under a low temperature environment (15° C.), the spreading speed was high and viscosity decreasing ability was exhibited, and the change of the slump flow value with the lapse of time was slight and high dispersing ability was exhibited.

From the results of Table 5, in the case of Comparative Example 13 using the aqueous solution containing Copolymer (A-9) and Comparative Example 15 using the aqueous solution containing Copolymer (A-10), it was found that although the spreading speed was high and mixing time was short, the slump flow value was remarkably changed with the lapse of time. Meanwhile, in the case of Comparative Example 14 using the aqueous solution containing Copolymer (A-2) and Comparative Example 16 using the aqueous solution containing Copolymer (A-4), it was found that although the change of the slump flow value with the lapse of time was slight, the spreading speed was slow and mixing time was long.

On the other hand, in any case of using the cement admixtures of the present invention obtained by Example 10 using the aqueous solution containing Copolymer (A3-1), Example 11 using the aqueous solution containing Copolymer (A3-2), Example 12 using the aqueous solution containing Copolymer (A3-3), Example 13 using the aqueous solution containing Copolymer (A3-3) and Example 14 using the aqueous solution containing Copolymer (A3-4), it was found that the spreading speed was high and mixing time was short, and the change of the slump flow value with the lapse of time was slight.

The present application claims priority under 35 U.S.C. § 119to Japanese Patent Application No. 2003-104419, filed Apr. 8, 2003, entitled "CEMENT ADMIXTURE AND CEMENT COMPOSITION". The content of this application is incorporated herein by reference in its entirety.

The invention claimed is:

1. An admixture for cement comprising four components of a copolymer (A), an unsaturated (poly)alkylene glycol ether monomer (a), a non-polymerizable (poly)alkylene glycol (B) having no alkenyl group, and a polymer (C) having an oxyalkylene group or a polyoxyalkylene group and a carboxyl group, which is different from the copolymer (A), at ratios of the unsaturated (poly)alkylene glycol ether monomer (a) to the copolymer (A) in a range of 1 to 100% by mass, the non-polymerizable (poly)alkylene glycol (B) having no alkenyl group to the copolymer (A) in a range of 1 to 50% by mass, and the polymer (C), which is different from the copolymer (A), having an oxyalkylene group or a polyoxyalkylene group and a carboxyl group to the copolymer (A) in a range of 1 to 10000% by mass, wherein the copolymer (A) contains a constituent unit (I) derived from the unsaturated (poly)alkylene glycol ether monomer (a) and a constituent unit (II) derived from a maleic acid monomer (b) at ratios of the constituent unit (I) and the constituent unit (II) in a range of 1% by mass or more, respectively, in the entire constituent units, and the unsaturated (poly)alkylene glycol ether monomer (a) is represented by the general formula (1):

$$Y^1O(R^1O)nR \qquad (1)$$

wherein $Y^1$ represents an alkenyl group containing 2 to 4 carbon atoms, $R^2$ represents a hydrogen atom or a hydrocarbon group containing 1 to 30 carbon atoms, $R^1O$ represents one or more species of oxyalkylene groups containing 2 to 18 carbon atoms, and n represents the average molar number of addition of the oxyalkylene groups and is a number of 1 to 500.

2. An admixture for cement comprising five components of a copolymer (A1), a copolymer (A2), an unsaturated (poly)alkylene glycol ether monomer (a1), an unsaturated polyalkylene glycol ether monomer (a2), and a non-polymerizable (poly)alkylene glycol (B) having no alkenyl group at ratios of the total amount of the unsaturated (poly) alkylene glycol ether monomer (a1) and the unsaturated polyalkylene glycol ether monomer (a2) to the total amount of the copolymers (A1) and (A2) in a range of 1 to 100% by mass, the non-polymerizable (poly)alkylene glycol (B) having no alkenyl group to the total amount of the copolymers (A1) and (A2) in a range of it 1 to 50% by mass, and the polymer (A2) to the copolymer (A1) in a range of 1 to 10000% by mass, wherein the copolymer (A1) contains a constituent unit (I') derived from the unsaturated (poly)alkylene glycol ether monomer (a1) and a constituent unit (II) derived from a maleic acid monomer (b) at ratios of the constituent unit (I') and the constituent unit (II) in a range of 1% by mass or more, respectively, in the entire constituent units, the unsaturated (poly)alkylene glycol ether monomer (a1) is represented by the general formula (2):

$$Y^2O(R^3O)m_1R^4 \quad (2)$$

wherein $Y^2$ represents an alkenyl group containing 2 to 4 carbon atoms, $R^4$ represents a hydrogen atom or a hydrocarbon group containing 1 to 30 carbon atoms, $R^3O$ represents one or more species of oxyalkylene groups containing 2 to 18 carbon atoms, and $m_1$ represents the average molar number of addition of the oxyalkylene groups and is a number of 1 to 100, the copolymer (A2) contains a constituent unit (I") derived from the unsaturated polyalkylene glycol ether monomer (a2) and a constituent unit (II) derived from a maleic acid monomer (b) at ratios of the constituent unit (I") and the constituent unit (II) in a range of 1% by mass or more, respectively, in the entire constituent units, and the unsaturated polyalkylene glycol ether monomer (a2) is represented by the general formula (3):

$$Y^3O(R^5O)m_2R^6 \quad (3)$$

wherein $Y^3$ represents an alkenyl group containing 2 to 4 carbon atoms, $R^6$ represents a hydrogen atom or a hydrocarbon group containing 1 to 30 carbon atoms, $R^5O$ represents one or more species of oxyalkylene groups containing 2 to 18 carbon atoms, and $m_2$ represents the average molar number of addition of the oxyalkylene groups and is a number of 6 to 500, in which $m_2 - m_1 \geq 5$.

3. The admixture for cement according to claim 1, wherein the polymer (C) is a polymer (D) containing a constituent unit (IV) derived from a (poly)alkylene glycol mono(meth)acrylic acid ester monomer (d) and a constituent unit (V) derived from an unsaturated mono carboxylic acid monomer (e) at ratios of the constituent units (IV) and (V) in a range of 1% by mass or more, respectively, in the entire constituent units, and the (poly)alkylene glycol mono(meth)acrylic acid ester monomer (d) is represented by the general formula (4):

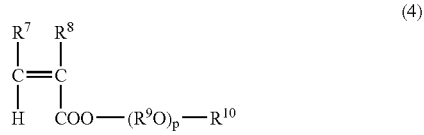

wherein $R^7$ and $R^8$ are the same or different and each represents a hydrogen atom or a methyl group, $R^{10}$ represents a hydrogen atom or a hydrocarbon group containing 1 to 30 carbon atoms, $R^9O$ represents one or more species of oxyalkylene groups containing 2 to 18 carbon atoms, and p represents the average molar number of addition of the oxyalkylene groups and is a number of 1 to 500.

4. The admixture for cement according to claim 1, wherein the polymer (C) is a polymer (B) containing a constituent unit (VI) derived from an unsaturated (poly) alkylene glycol ether monomer (f) and a constituent unit (II) derived from a maleic acid monomer (b) at ratios of the constituent units (VI) and (II) in a range of 1% by mass or more, respectively, in the entire constituent units, and the unsaturated (poly)alkylene glycol ether monomer (f) is represented by the general formula (5):

$$Y^4O(R^{11}O)qR^{12} \quad (5)$$

wherein $Y^4$ represents an alkenyl group containing 5 to 8 carbon atoms, $R^{12}$ represents a hydrogen atom or a hydrocarbon group containing 1 to 30 carbon atoms, $R^{11}O$ represents one or more species of oxyalkylene groups containing 2 to 18 carbon atoms, and q represents the average molar number of addition of the oxyalkylene groups and is a number of 1 to 500.

5. The admixture for cement according to claim 1, wherein the polymer (C) is a copolymer (A') containing a constitutent unit (I) derived from an unsaturated (poly) alkylene glycol ether monomer (a) and a constituent unit (II) derived from a maleic acid monomer (b) at ratios of the constituent unit (I) and the constituent unit (II) in a range of 1% by mass or more, respectively, in the entire constituent units, and the unsaturated (poly)alkylene glycol ether monomer (a) is represented by the above-mentioned formula (1), and a number of milliequivalents of carboxyl groups contained in each gram of copolymer (A') (meq/g) as determined on the unneutralized basis is 0.1 or more larger than the number of the copolymer (A).

6. The admixture for cement according to claim 1, wherein the oxyalkylene group of the non-polymerizable (poly)alkylene glycol (B) having no alkenyl group is one or more species of oxyalkylene groups containing 2 to 18 carbon atoms, and the terminal group of the non-polymerizable (poly)alkylene glycol (B) having no alkenyl group is a hydrogen atom, an alkyl group or an (alkyl)phenyl group containing 1 to 30 carbon atoms.

7. The admixture for cement according to claim 2, wherein the oxyalkylene group of the non-polymerizable (poly)alkylene glycol (B) having no alkenyl group is one or more species of oxyalkylene groups containing 2 to 8 carbon atoms, and the terminal group of the non-polymerizable (poly)alkylene glycol (B) having no alkenyl group is a hydrogen atom, an alkyl group or an (alkyl)phenyl group containing 1 to 30 carbon atoms.

8. The admixture for cement according to claim 3, wherein the oxyalkylene group of the non-polymerizable (poly)alkylene glycol (B) having no alkenyl group is one or more species of oxyalkylene groups containing 2 to 8 carbon atoms, and the terminal group of the non-polymerizable (poly)alkylene glycol (B) having no alkenyl group is a hydrogen atom, an alkyl group or an (alkyl)phenyl group containing 1 to 30 carbon atoms.

9. The admixture for cement according to claim 4, wherein the oxyalkylene group of the non-polymerizable (poly)alkylene glycol (B) having no alkenyl group is one or more species of oxyalkylene groups containing 2 to 8 carbon atoms, and the terminal group of the non-polymerizable (poly)alkylene glycol (B) having no alkenyl group is a hydrogen atom, an alkyl group or an (alkyl)phenyl group containing 1 to 30 carbon atoms.

10. The admixture for cement according to claim 1 wherein the oxyalkylene group of the non-polymerizable (poly)alkylene glycol (B) having no alkenyl group is one or more species of oxyalkylene groups containing 2 to 8 carbon atoms, and the oxyalkylene group comprises the oxyethylene group accounting for at least 50 mole percent, and the terminal group of the non-polymerizable (poly)alkylene glycol (B) having no alkenyl group is a hydrogen atom or an alkyl group containing 1 to 4 carbon atoms.

11. The admixture for cement according to claim 2
wherein the oxyalkylene group of the non-polymerizable (poly)alkylene glycol (B) having no alkenyl group is one or more species of oxyalkylene groups containing 2 to 8 carbon atoms, and the oxyalkylene group comprises the oxyethylene group accounting for at least 50 mole percent, and the terminal group of the non-polymerizable (poly)alkylene glycol (B) having no alkenyl group is a hydrogen atom or an alkyl group containing 1 to 4 carbon atoms.

12. The admixture for cement according to claim 3
wherein the oxyalkylene group of the non-polymerizalbe (poly)alkylene glycol (B) having no alkenyl group is one or more species of oxyalkylene groups containing 2 to 8 carbon atoms, and the oxyalkylene group comprises the oxyethylene group accounting for at least 50 mole percent, and the terminal group of the non-polymerizable (poly)alkylene glycol (B) having no alkenyl group is a hydrogen atom or an alkyl group containing 1 to 4 carbon atoms.

13. The admixture for cement according to claim 10,
wherein the oxyalkylene group of the non-polymerizable (poly)alkylene glycol (B) having no alkenyl group, comprises the oxyethylene group accounting for at least 90 mole percent, and the terminal group of the non-polymerizable (poly)alkylene glycol (B) having no alkenyl group is a hydrogen atom.

14. The admixture for cement according to claim 11,
wherein the oxyalkylene group of the non-polymerizable (poly)alkylene glycol(B) having no alkenyl group, comprises the oxyethylene group accounting for at least 90 mole percent, and the terminal group of the non-polymerizable (poly)alkylene glycol (B) having no alkenyl group is a hydrogen atom.

15. The admixture for cement according to claim 12,
wherein the oxyalkylene group of the non-polymerizable (poly)alkylene glycol (B) having no alkenyl group, comprises the oxyethylene group accounting for at least 90 mole percent, and the terminal group of the non-polymerizable (poly)alkylene glycol (B) having no alkenyl group is a hydrogen atom.

16. The admixture for cement according to claim 1, wherein $R^2$ in the formula (1) is a hydrogen atom.

17. The admixture for cement according to claim 2, wherein $R^2$ in the formula (1) is a hydrogen atom.

18. The admixture for cement according to claim 3, wherein $R^2$ in the formula (1) is a hydrogen atom.

19. A cement composition comprising the admixture for cement according to claim 1, cement and water.

20. A cement composition comprising the admixture for cement according to claim 2, cement and water.

21. A cement composition comprising the admixture for cement according to claim 3, cement and water.

22. A cement composition comprising the admixture for cement according to claim 4, cement and water.

* * * * *